(12) United States Patent
Lee et al.

(10) Patent No.: US 10,534,458 B2
(45) Date of Patent: Jan. 14, 2020

(54) REVERSIBLE DISPLAY MODULE INCLUDING TRANSPARENT DISPLAY PANEL AND DISPLAY SYSTEM INCLUDING THE DISPLAY MODULE

(71) Applicant: SAMSUNG ELECTRONICS CO., LTD., Suwon-si (KR)

(72) Inventors: Joo-yeon Lee, San Jose, CA (US); Sang Chul Lee, Yongin-si (KR); Jong Seo Lee, Hwaseong-si (KR); Se Yong Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/159,163

(22) Filed: Oct. 12, 2018

(65) Prior Publication Data

US 2019/0042015 A1 Feb. 7, 2019

Related U.S. Application Data

(63) Continuation of application No. 15/075,877, filed on Mar. 21, 2016, now Pat. No. 10,126,849, which is a
(Continued)

(30) Foreign Application Priority Data

Apr. 28, 2011 (KR) .................. 10-2011-0040408

(51) Int. Cl.
*G06F 3/041* (2006.01)
*G06F 1/16* (2006.01)
(Continued)

(52) U.S. Cl.
CPC .............. *G06F 3/041* (2013.01); *A47F 3/001* (2013.01); *A47F 11/06* (2013.01); *G06F 1/1637* (2013.01);
(Continued)

(58) Field of Classification Search
CPC .... G06F 1/1626; G06F 1/1628; G06F 1/1632; G06F 1/1633; G06F 1/1637;
(Continued)

(56) References Cited

U.S. PATENT DOCUMENTS 2,131,680 A 9/1938 Zahodiakin
4,412,292 A 10/1983 Sedam et al.
(Continued)

FOREIGN PATENT DOCUMENTS

CL 101726155 A 6/2010
CN 1236377 C 1/2002
(Continued)

OTHER PUBLICATIONS

"Window of Opportunity: Touch screens will enable shoppers to find information", Nov. 4, 1998, Professional Engineering 11, 20 p. 22.
(Continued)

*Primary Examiner* — Darlene M Ritchie
(74) *Attorney, Agent, or Firm* — Sughrue Mion, PLLC

(57) ABSTRACT

Provided is an electric device including: a main body comprising a storage chamber with an opening; a door coupled to the main body and comprising a transparent display panel such that the transparent display panel covers at least a part of the opening when the door is closed; a movement detector being configured to detect a movement of the transparent display panel and output a movement detection signal corresponding to the movement; and a controller configured to identify a position of the transparent display panel based on the movement detection signal, and control the transparent display panel to reverse an image displayed on the transparent display panel based on the identified position of the transparent display panel being changed from a first position to a second position.

17 Claims, 40 Drawing Sheets

Related U.S. Application Data continuation of application No. 13/278,504, filed on Oct. 21, 2011, now Pat. No. 9,311,834.

(60) Provisional application No. 61/407,449, filed on Oct. 28, 2010.

(51) Int. Cl.

| | |
|---|---|
| *A47F 11/06* | (2006.01) |
| *G09F 23/06* | (2006.01) |
| *G09F 23/04* | (2006.01) |
| *G09F 9/35* | (2006.01) |
| *G09F 27/00* | (2006.01) |
| *G02F 1/1333* | (2006.01) |
| *G09F 13/12* | (2006.01) |
| *G09F 23/00* | (2006.01) |
| *A47F 3/00* | (2006.01) |
| *G07F 9/02* | (2006.01) |
| *G07F 9/10* | (2006.01) |
| *G09F 13/04* | (2006.01) |
| *A47F 3/04* | (2006.01) |
| *G07F 11/00* | (2006.01) |

(52) U.S. Cl.
CPC ............. *G07F 9/023* (2013.01); *G07F 9/105* (2013.01); *G09F 9/35* (2013.01); *G09F 13/0413* (2013.01); *G09F 23/04* (2013.01); *G09F 23/065* (2013.01); *G09F 27/00* (2013.01); *A47F 3/043* (2013.01); *A47F 3/0404* (2013.01); *A47F 3/0434* (2013.01); *G02F 2001/133388* (2013.01); *G06F 1/1626* (2013.01); *G06F 1/1647* (2013.01); *G07F 11/00* (2013.01); *G09F 13/12* (2013.01); *G09F 23/0058* (2013.01); *G09F 2023/0033* (2013.01); *G09F 2027/001* (2013.01); *G09G 2380/06* (2013.01); *G09G 2380/16* (2013.01)

(58) Field of Classification Search
CPC .... G06F 1/1647; G06F 1/1654; G06F 1/1656; G06F 1/181; G06F 3/041; G06F 3/0412; G07F 11/00; G07F 9/10; G07F 9/105; G07F 9/023; G09F 9/35; G09F 13/00; G09F 13/0413; G09F 13/08; G09F 13/10; G09F 13/12; G09F 23/00; G09F 23/0058; G09F 27/00; G09F 2027/001; G09G 9/00; G09G 9/30; G09G 9/35; G09G 9/302; G09G 9/37; G09G 2300/026; G09G 2300/04; G09G 2300/023; G09G 2380/16; G09G 2380/06; H04N 5/645; H04N 5/7475

See application file for complete search history.

(56) References Cited

U.S. PATENT DOCUMENTS

| | | | | |
|---|---|---|---|---|
| 4,970,870 A * | 11/1990 | Midlang | .................. | F25D 29/00 236/94 |
| 5,589,958 A | 12/1996 | Lieb | | |
| 6,182,050 B1 * | 1/2001 | Ballard | .................. | G06Q 30/02 705/14.61 |
| 6,208,976 B1 * | 3/2001 | Kinebuchi | ........... | G06Q 10/087 705/15 |
| 6,359,270 B1 * | 3/2002 | Bridson | .................. | G06Q 10/107 219/679 |
| 6,377,228 B1 * | 4/2002 | Jenkin | ................... | G06F 3/0488 345/1.3 |
| 6,427,772 B1 | 8/2002 | Oden et al. | | |
| 6,466,202 B1 * | 10/2002 | Suso | ..................... | G06F 1/1616 345/169 |
| 6,504,580 B1 | 1/2003 | Thompson et al. | | |
| 6,843,011 B2 * | 1/2005 | Hillstrom | ............ | G09F 13/0413 40/568 |
| 6,950,095 B2 * | 9/2005 | Kim | ........................ | F25D 29/00 345/173 |
| 7,391,397 B2 | 6/2008 | Sato et al. | | |
| 7,596,899 B1 | 10/2009 | Michael et al. | | |
| 8,149,225 B2 * | 4/2012 | Lee | ........................ | F25D 29/005 345/173 |
| 8,219,152 B2 | 7/2012 | Oh et al. | | |
| 8,290,595 B2 | 10/2012 | Kieval et al. | | |
| 8,400,607 B2 | 3/2013 | Cappaert et al. | | |
| 8,493,364 B2 | 7/2013 | Charlier et al. | | |
| 8,582,282 B2 | 11/2013 | Kim et al. | | |
| 8,654,515 B2 * | 2/2014 | Krische | ................. | D06F 39/005 219/492 |
| 8,890,771 B2 * | 11/2014 | Pance | .................... | G06F 1/1647 345/4 |
| 9,164,581 B2 * | 10/2015 | Robinson | ................ | G06F 3/013 |
| 9,514,661 B2 * | 12/2016 | Riegel | ........................ | G09F 9/33 |
| 2002/0003531 A1 * | 1/2002 | Kim | ........................ | F25D 29/00 345/173 |
| 2002/0198571 A1 | 12/2002 | Puskas | | |
| 2003/0030412 A1 * | 2/2003 | Matsuda | ................. | G06F 1/263 320/127 |
| 2003/0071941 A1 | 4/2003 | Mizuno | | |
| 2003/0103023 A1 * | 6/2003 | Ootsuka | ................. | F25D 29/005 345/87 |
| 2003/0214619 A1 | 11/2003 | Masuda et al. | | |
| 2003/0223025 A1 | 12/2003 | Fujishiro | | |
| 2003/0229897 A1 | 12/2003 | Frisco et al. | | |
| 2004/0017365 A1 | 1/2004 | Hatano et al. | | |
| 2004/0073334 A1 | 4/2004 | Terranova | | |
| 2004/0160388 A1 | 8/2004 | O'Keeffe | | |
| 2005/0004836 A1 | 1/2005 | Ruttenberg | | |
| 2005/0166220 A1 | 7/2005 | McKay | | |
| 2005/0168399 A1 | 8/2005 | Palmquist | | |
| 2005/0178131 A1 | 8/2005 | Ryu et al. | | |
| 2005/0259084 A1 | 11/2005 | Popovich et al. | | |
| 2006/0044286 A1 | 3/2006 | Kohlhaas | | |
| 2006/0152618 A1 | 7/2006 | Yamasaki | | |
| 2006/0192767 A1 | 8/2006 | Murakami | | |
| 2007/0016478 A1 | 1/2007 | Hill | | |
| 2007/0081344 A1 | 4/2007 | Cappaert et al. | | |
| 2007/0189042 A1 * | 8/2007 | Pai | ..................... | G02F 1/133603 362/632 |
| 2007/0291015 A1 | 12/2007 | Mori | | |
| 2008/0048954 A1 * | 2/2008 | Lee | ........................ | F25D 29/00 345/82 |
| 2008/0230497 A1 | 9/2008 | Strickland et al. | | |
| 2008/0278408 A1 | 11/2008 | Strickland | | |
| 2009/0036208 A1 | 2/2009 | Pennington et al. | | |
| 2009/0046212 A1 | 2/2009 | Tsubata et al. | | |
| 2009/0052206 A1 | 2/2009 | Matsui et al. | | |
| 2009/0109324 A1 * | 4/2009 | Kaplan | .................. | G03B 17/18 348/372 |
| 2009/0121970 A1 | 5/2009 | Ozbek | | |
| 2009/0276319 A1 | 11/2009 | Lungu et al. | | |
| 2009/0278766 A1 * | 11/2009 | Sako | ..................... | G02B 27/017 345/8 |
| 2009/0279240 A1 | 11/2009 | Karppanen | | |
| 2009/0289874 A1 | 11/2009 | Ha | | |
| 2009/0295731 A1 | 12/2009 | Kim et al. | | |
| 2009/0295753 A1 | 12/2009 | King et al. | | |
| 2010/0056220 A1 | 3/2010 | Oh et al. | | |
| 2010/0093401 A1 * | 4/2010 | Moran | .................. | G06F 1/1626 455/566 |
| 2010/0097469 A1 | 4/2010 | Blank et al. | | |
| 2010/0141689 A1 | 6/2010 | Johnson | | |
| 2010/0152892 A1 | 6/2010 | Gavra et al. | | |
| 2010/0157063 A1 | 6/2010 | Basso et al. | | |
| 2010/0206204 A1 | 8/2010 | Shimizu et al. | | |
| 2010/0227650 A1 | 9/2010 | Kim et al. | | |
| 2010/0240988 A1 | 9/2010 | Varga et al. | | |
| 2010/0252825 A1 | 10/2010 | Yamazaki et al. | | |
| 2010/0253541 A1 | 10/2010 | Seder et al. | | |
| 2011/0041368 A1 | 2/2011 | Chua et al. | | |
| 2011/0098849 A1 | 4/2011 | Hudis et al. | | |

(56) References Cited

U.S. PATENT DOCUMENTS

| | | | |
|---|---|---|---|
| 2011/0131610 A1 | 6/2011 | Lee et al. | |
| 2011/0159932 A1 | 6/2011 | Richardson | |
| 2011/0163986 A1 | 7/2011 | Lee et al. | |
| 2011/0173082 A1 | 7/2011 | Breitenbach et al. | |
| 2011/0181792 A1 | 7/2011 | Hammonds | |
| 2011/0184862 A1 | 7/2011 | Lanier et al. | |
| 2011/0261518 A1 | 10/2011 | Krische | |
| 2012/0030726 A1 | 2/2012 | Winter et al. | |
| 2012/0062475 A1 | 3/2012 | Locker et al. | |
| 2012/0086877 A1* | 4/2012 | Kaoh | H04N 21/42201 348/836 |
| 2012/0102438 A1 | 4/2012 | Robinson | |
| 2012/0105424 A1 | 5/2012 | Lee et al. | |
| 2012/0163021 A1 | 6/2012 | Bohn | |
| 2012/0242698 A1 | 9/2012 | Haddick et al. | |
| 2012/0242865 A1* | 9/2012 | Vartanian | H04N 5/23206 348/239 |
| 2014/0039730 A1 | 2/2014 | Loubiere | |
| 2016/0179367 A1* | 6/2016 | Gimpl | G06F 1/1616 715/761 |

FOREIGN PATENT DOCUMENTS

| | | | |
|---|---|---|---|
| CN | 1329234 A | 1/2002 | |
| CN | 1556664 A | 12/2004 | |
| CN | 1657853 A | 8/2005 | |
| CN | 101557533 A | 10/2009 | |
| CN | 101594403 A | 12/2009 | |
| CN | 201476445 U | 5/2010 | |
| CN | 101846434 A | 9/2010 | |
| EP | 2681730 | 9/2012 | |
| JP | 7244492 A | 9/1995 | |
| JP | 2000146 A | 1/2000 | |
| JP | 2001356714 A | 12/2001 | |
| JP | 2003125904 A | 5/2003 | |
| JP | 2003241680 A | 8/2003 | |
| JP | 2004159964 A | 6/2004 | |
| JP | 2005172301 A | 6/2005 | |
| JP | 2006343374 A | 12/2006 | |
| JP | 200761446 A | 3/2007 | |
| JP | 2009237493 A | 10/2009 | |
| JP | 5071041 B2 | 11/2012 | |
| KR | 1020100003913 A | 1/2010 | |
| KR | 10-1081617 B1 | 11/2011 | |
| RU | 2183864 C2 | 6/2002 | |
| TW | M334925 U | 6/2008 | |
| WO | 02101188 A1 | 12/2002 | |
| WO | 2012119109 A1 | 11/2012 | |

OTHER PUBLICATIONS

"Futuristic Smart Fridge: Input Ingredients, Receive Recipes!", Jun. 2, 2010, Dornob. https://web-beta.archive.org/web/20100602233622/http://dornob.com/futuristic-smart-fridge-input-ingredients-receive-recipes/. Retrieved Apr. 21, 2017.
Second Notice of Allowance issued in parent U.S. Appl. No. 15/075,877 dated Jan. 25, 2018.
First Notice of Allowance issued in parent U.S. Appl. No. 15/075,877 dated Sep. 8, 2017.
Office Action issued in parent U.S. Appl. No. 15/075,877 dated May 4, 2017.
Office Action issued in parent U.S. Appl. No. 15/075,877 dated Nov. 7, 2016.
Communication dated Apr. 15, 2015 issued by the Australian Patent Office in counterpart Australian Patent Application No. 2011321257.
Communication dated Aug. 21, 2014, issued by the Australian Paten Office in counterpart Australian Application No. 2011321257.
Communication dated Feb. 17, 2015 issued by the Russian Patent Office in counterpart Russian Application No. 2013119740/12.
Communication dated Sep. 15, 2015 from the Japanese Patent Office in a counterpart Japanese Application No. 2013-536496.
Communication dated Jul. 3, 2015 from the Russian Patent Office in a counterpart Russian Application No. 2013119740.
Communication dated Oct. 22, 2014 issued by the European Patent Office in counterpart European Application No. 11836549.3.
Communication dated Dec. 3, 2014 issued by the State Intellectual Property Office of P.R. China in counterpart Chinese Application No. 201180063571.4.
International Search Report dated Mar. 23, 2012 in counterpart International Application No. PCT/KR2011/007347.
Techfresh.net, "Samsung uVending Machines", Internet citation, Jan. 8, 2014, XP 002664085, Retrieved from the Internet: URL: http://web.archive.org/web/20100206151319/http://www.techfresh.net/samsung-uvending-machines/, Retrieved on Nov. 22, 2011.
Notice of Allowance issued in prior U.S. Appl. No. 13/278,504 dated Dec. 4, 2015.
Office Action issued in prior U.S. Appl. No. 13/278,504 dated Apr. 25, 2014.
Office Action issued in prior U.S. Appl. No. 13/278,504 dated Aug. 15, 2013.
Office Action issued in prior U.S. Appl. No. 13/278,504 dated Feb. 5, 2015.
Office Action issued in prior U.S. Appl. No. 13/278,504 dated Jul. 1, 2015.
Office Action issued in prior U.S. Appl. No. 13/278,504 dated Sep. 25, 2014.
Communication dated Sep. 4, 2018, issued by the Japanese Patent Office in counterpart Japanese Application No. 2016-217438.
Communication dated Aug. 28, 2018, issued by the Canadian Patent Office in counterpart Canadian Application No. 2,815,355.
Communication dated Dec. 5, 2017, issued by the Japanese patent office in counterpart Japanese Application No. 2016-217438.
Communication dated Dec. 7, 2017, issued by the Indonesian Patent Office in counterpart Indonesian application No. W-00201302143.
Communication dated Dec. 28, 2017, issued by the Korean Patent Office in counterpart Korean Application No. 10-2011-0040408.
Communication dated Jun. 9, 2017, from the European Patent Office in counterpart European Application No. 11836549.3.
Communication dated May 18, 2017 from the Indonesian Patent Office, in counterpart Indonesian Application No. W0/0201302143.
Communication dated Jun. 16, 2017, issued by the Korean Intellectual Property Office in corresponding Korean Application No. 10-2011-0040408.
Communication dated May 3, 2018, from the State Intellectual Property Office of People's Republic of China in counterpart Chinese Application No. 201610833709.9.
Communication dated Jan. 4, 2019 issued by the State Intellectual Property Office in P.R. China in counterpart Chinese Patent Application No. 201610833709.9.
Communication dated Jan. 29, 2019 issued by the Intellectual Property Office of India in counterpart Indian Patent Application No. 3747/DELNP/2013.
Communication dated Dec. 11, 2018, issued by the European Patent Office in counterpart European Application No. 16848784.1.
Communication dated Apr. 2, 2019 issued by the Japanese Patent Office in counterpart Japanese Application No. 2016-217438.
Communication dated May 9, 2019, issued by the State Intellectual Property Office of P.R. China in counterpart Chinese Application No. 201610833709.9.

* cited by examiner

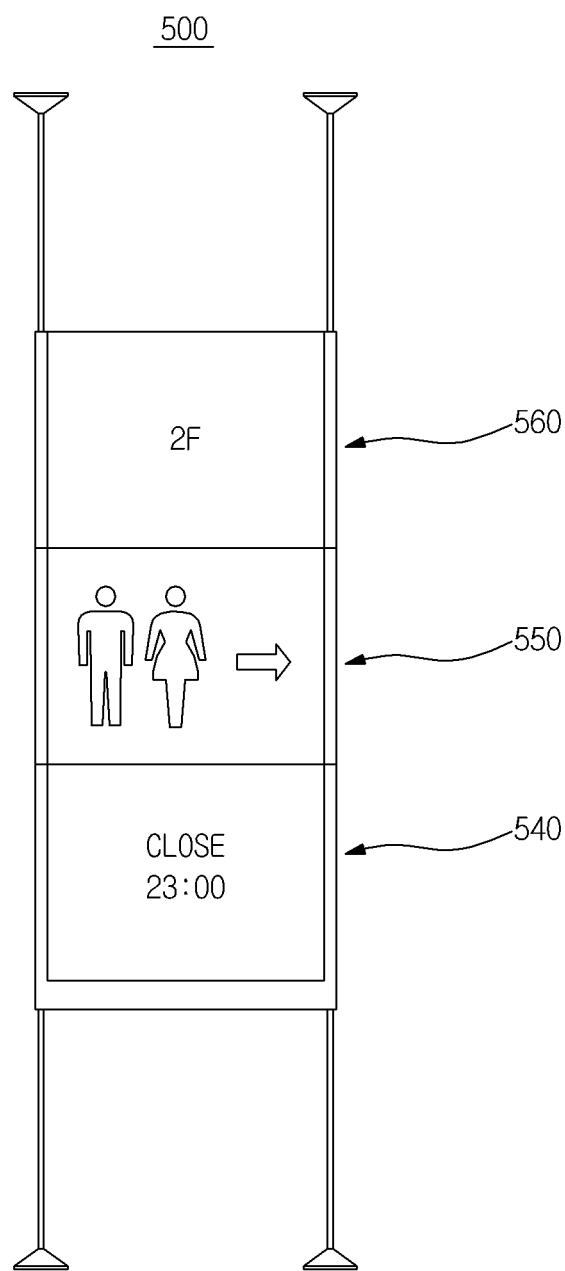

REVERSIBLE DISPLAY MODULE INCLUDING TRANSPARENT DISPLAY PANEL AND DISPLAY SYSTEM INCLUDING THE DISPLAY MODULE

CROSS-REFERENCE TO RELATED APPLICATION

This is a continuation of U.S. application Ser. No. 15/075,877, filed Mar. 21, 2016, which is a continuation of U.S. application Ser. No. 13/278,504 filed Oct. 21, 2011, which issued as U.S. Pat. No. 9,311,834 and claims the benefit of Korean Patent Application No. 10-2011-0040408, filed on Apr. 28, 2011 in the Korean Intellectual Property Office, and U.S. Provisional Application Ser. No. 61/407,449, filed on Oct. 28, 2010 in the U.S. Patent and Trademark Office, the disclosures of which are incorporated herein by reference.

BACKGROUND

Field

Exemplary embodiments of the present invention relate to a display module and a display system that maximize visual and spatial utilization using a transparent display panel.

Description of the Related Art

Display devices that provide information to humans have been very rapidly developed from an early cathode ray tube (CRT) type monochrome display device, which has a large volume, to a recent thin film type large-area full color display device.

Also, the display devices have been rapidly developed from a device that displays only a simple message and image to a more sophisticated device that displays beauty.

The display devices have a clearly visible form. When the display devices are installed in houses or public places, therefore, the display devices occupy large spaces with the result that spatial utilization is low. Also, the display devices may function as visual obstacles with the result that an aesthetically pleasing space is not provided and use of the display devices is limited.

SUMMARY

Exemplary embodiments of the present inventive concept may overcome the above disadvantages and other disadvantages not described above. Also, the present inventive concept is not required to overcome the disadvantages described above, and an exemplary embodiment of the present inventive concept may not overcome any of the problems described above.

An aspect of the present invention provides a display module which may include: a transparent display panel; and a frame which fixes a side of the transparent display panel, wherein the frame has a communication unit which may be operable to receive data, a controller which may be operable to process the received data and to output a drive command based on the processed data and a display drive unit which may be operable to drive the transparent display panel in response to the drive command from the controller.

The transparent display panel may have a greater surface area than the frame and a smaller thickness than the frame.

The transparent display panel may be partially fitted in the frame.

The display module may further include a storage unit provided in the frame to store at least one data, wherein the controller may be operable to control the data stored in the storage unit to be displayed.

The controller may include a first signal processing unit to process the data received by the communication unit and a second signal processing unit to process the data stored in the storage unit.

The display module may further include an input unit provided in the frame to allow the data received by the communication unit or the data stored in the storage unit to be selected, wherein the controller controls the selected data to be displayed.

If a plurality of data is stored in the storage unit, the input unit may allow one of the data stored in the storage unit to be selected.

The input unit may allow one of modes to be selected and the controller controls an image corresponding to the selected mode to be displayed.

The storage unit may store data for each time and the controller may confirm a current time, determine whether data corresponding to the confirmed time are present and control retrieved data to be displayed when the retrieved data are present.

The communication unit may be operable to perform wireless communication and the controller and to process data received through the wireless communication.

The frame may have a hole and a power supply unit connected to an external power source through the hole to receive power and to convert the received power into drive power to drive the display module.

The power supply unit may include a rechargeable power supply unit.

The display module may further include a blocking member operable to block light, wherein the blocking member may be provided at an edge of the transparent display panel.

The display module may further include an anti-reflective coating film operable to prevent light from being reflected by the transparent display panel, wherein the reflective coating film may be provided adjacent to the transparent display panel.

The display module may further include a heat insulation sheet operable to block heat generated from transparent display panel from being discharged, wherein the heat insulation sheet may be adjacent to the transparent display panel.

The communication unit may receive a broadcast signal.

The transparent display panel may be operable to display images together with another transparent display panel in a multi display performance mode in response to a command from a server.

The frame may have a recognition unit operable to recognize a tag and the controller may be further operable to read the recognized tag and control an image corresponding to the read data to be displayed on the transparent display panel.

Another aspect of the present invention provides a display system which may include: a system body having a first power supply unit; and a display module detachably mounted in the system body, wherein the display module may include a transparent display panel, a frame which fixes the transparent display panel, and a drive module provided in the frame operable to convert power from the first power supply unit into drive power and operable to control driving of the transparent display panel.

The drive module may include at least one printed circuit board.

The drive module may include a communication unit to receive data transmitted from a server, a controller to process the received data and to output a drive command corresponding to the processed data, a display drive unit to drive the transparent display panel in response to a command from the controller so that the data are displayed on the transparent display panel and a second power supply unit to convert power from the first power supply unit into drive power of the communication unit, drive power of the controller and drive power of the display drive unit.

At least two selected from a group including the communication unit, the controller, the display drive unit and the second power supply unit may be provided in the at least one printed circuit board.

The first power supply unit may be connected to a commercial power source and the second power supply unit may be connected to the first power supply unit via a cable to receive power.

The display system may further include a first hole provided at the system body and a second hole provided at the frame of the display module, wherein the cable extends from the system body to the frame through the first hole and the second hole.

The display system may further include: a storage unit provided in the drive module to store at least one data; and an input unit provided in the frame and electrically connected to the controller to allow the data received by the communication unit or the data stored in the storage unit to be selected, wherein the controller may confirm the data selected through the input unit and control the confirmed data to be displayed.

If a plurality of data is stored in the storage unit, the input unit may allow one of the data stored in the storage unit to be selected.

The input unit may allow one of modes to be selected and the controller controls an image corresponding to the selected mode to be displayed.

The display system may further include a blocking member operable to block light, wherein the blocking member is provided at the remainder of the transparent display panel wherein the blocking member may be disposed at an edge of the transparent display panel.

The system body comprises a showcase including a main body, an opening at one side of the main body and a storage chamber in the main body, wherein the display module may be mounted in the opening of the showcase.

The display system may further include an anti-reflective coating film operable to reduce external light reflected by the transparent display panel, wherein the anti-reflective coating film may be adjacent to the transparent display panel.

The display system may further include a heat insulation sheet operable to reduce heat discharged from transparent display panel to the storage chamber, wherein the heat insulation sheet may be at a side of the transparent display panel facing the storage chamber.

The showcase may further include a door mounted at the opening and the display module may be mounted at the door of the showcase.

The display system may further include a detection unit, which may be provided in the frame and electrically connected to the controller, and which may be operable to detect at least one of opening and closing of the door of the showcase and to output a door signal, wherein the controller may be further operable to determine whether the door is open based on a door signal and to control an image displayed on the transparent display panel to be reversed upon determining that the door is open.

The controller may count door open time upon determining that the door is open and may control the door to be closed if the counted time exceeds reference time.

The controller may confirm an opening angle of the door based on the door opening and closing signal, compare the opening angle of the door with a reference angle and control an image displayed on the transparent display panel to be reversed upon determining that the opening angle of the door exceeds the reference angle.

The display system may further include a detection unit, which may be provided in the main body, and which may be operable to detect a temperature of the storage chamber, wherein the controller may be operable to determine whether the door is open based on a change in the temperature of the storage chamber and may be operable to control an image displayed on the transparent display panel to be reversed upon determining that the door is open.

The display system may further include a detection unit, which may be provided in the frame and electrically connected to the controller, and which may be operable to detect a human body and to output a human body detection signal, wherein the controller may be further operable to adjust a transparency of the transparent display panel based upon the human body detection signal.

The display system may further include a recognition unit, which may be provided in the frame and electrically connected to the controller, and which may be to recognize a tag, wherein the controller may control tailored information of a customer possessing the tag to be displayed based upon data of the recognized tag.

The communication unit may communicate with a customer terminal and the controller may confirm information regarding a customer and controls the confirmed tailored information of the customer to be displayed.

The controller may request the tailored information of the customer from a server and may receive the tailored information of the customer from the server.

The display system may further include a recognition unit to recognize a code printed on an article to be stored in the storage chamber of the show case, wherein the controller may read the recognized code and stores the read data.

Another aspect of the present invention provides a display system which may include: a system body having a first power supply unit; and a plurality of display modules detachably mounted in the system body, wherein each of the display modules may include a transparent display panel, a frame which fixes the transparent display panel and a drive module in the frame operable to convert power from the first power supply unit into drive power and operable to control driving of the transparent display panel.

The display system may further include a server to communicate with the display modules and to control driving of the display modules, wherein the server may process data input by a user or data received from an outside and may distribute and transmit the processed data to the display modules.

The server may transmit the same data so that the same image is displayed on the display modules.

The server may control different images to be displayed on the display modules.

The server may transmit the same data to some of the display modules and different data to the remainder of the display modules.

The display modules may be slidably mounted in the system body.

Each of the display modules may have a second power supply unit to convert power from the first power supply unit to drive power.

BRIEF DESCRIPTION OF THE DRAWINGS

These and/or other aspects of the invention will become apparent and more readily appreciated from the following description of the exemplary embodiments, taken in conjunction with the accompanying drawings of which:

FIG. 29 is a view illustrating application of the information board according to the exemplary embodiment of the present invention;

DETAILED DESCRIPTION

Figure 1:
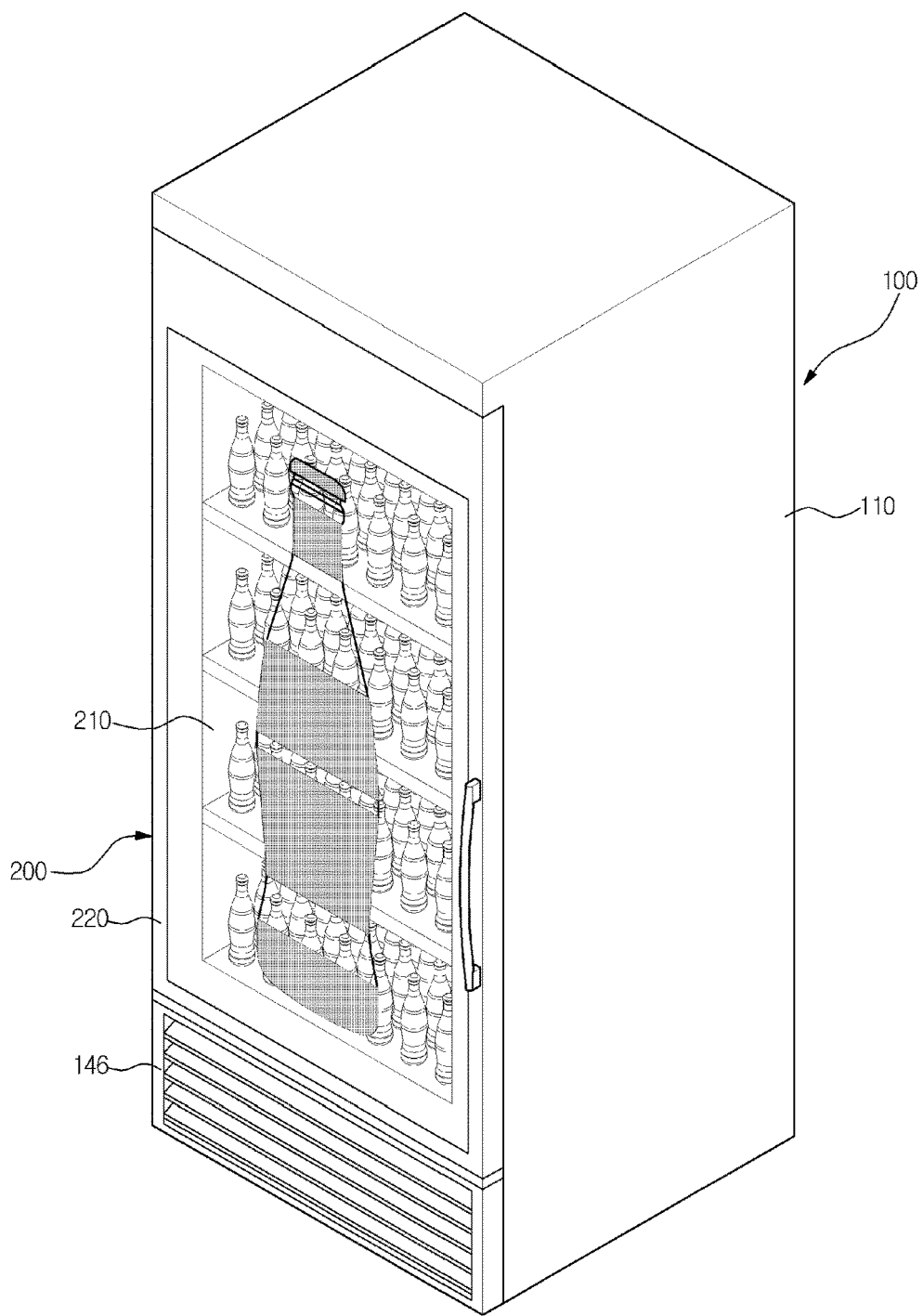
FIG. 1 is a perspective view of a display system according to an exemplary embodiment of the present invention.

Reference will now be made in detail to the exemplary embodiments of the present invention, examples of which are illustrated in the accompanying drawings, wherein like reference numerals refer to like elements throughout.

A display system includes a main body and a display module detachably mounted in the main body.

The display module includes a transparent display panel, a frame to fix the transparent display panel and a drive module mounted in the frame to control driving of the transparent display panel.

The main body may be a cooking device, such as a showcase, a refrigerator, a Kimchi refrigerator, a microwave oven or a gas oven. The display module may be fixed to an opening of the showcase, the refrigerator or the Kimchi refrigerator. Also, the display module may be used as a door.

The showcase stores and displays articles, such as ornaments, food, flowers, drugs, clothes, bowls, books or works of art. The showcase includes a display module provided at an opening of the main body to display an image.

Therefore, people may view the image to recognize articles in the showcase. The display module may be formed partially or wholly at the opening.

Hereinafter, the display system will be described in detail with reference to the drawings.

Figure 2:
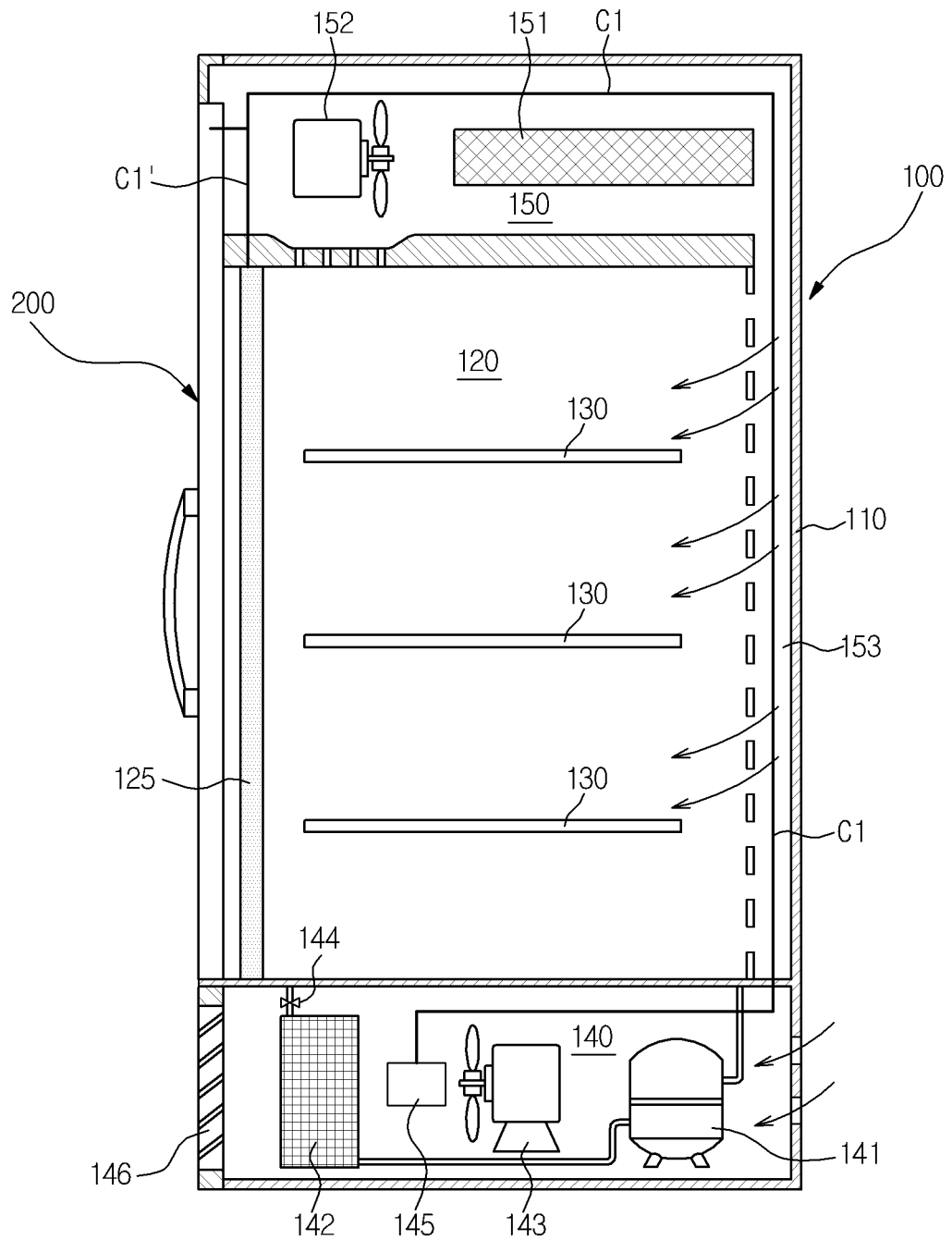
FIG. 2 is a view illustrating the interior of the display system according to the exemplary embodiment of the present invention.
Figure 3:
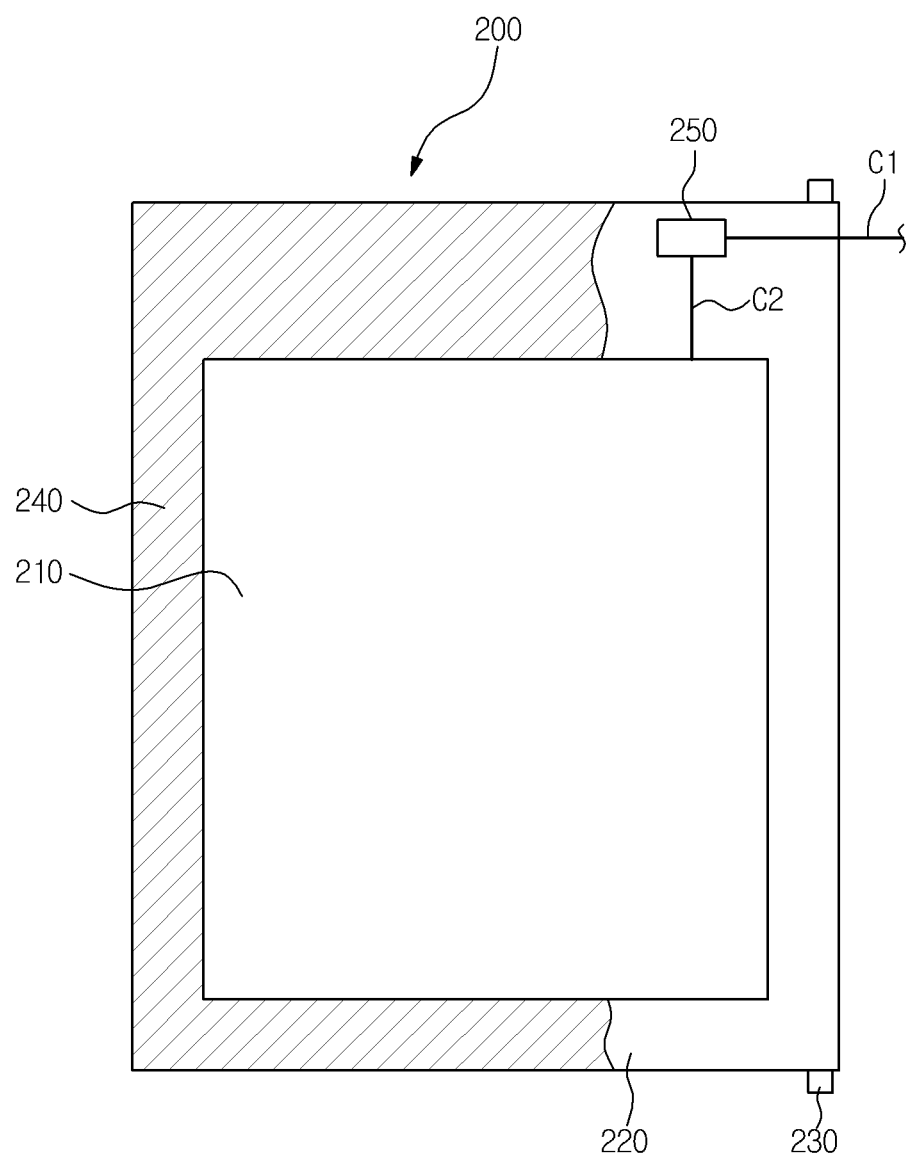
FIG. 3 is a view illustrating the interior of a display module provided in the display system according to the exemplary embodiment of the present invention.
Figure 4A:
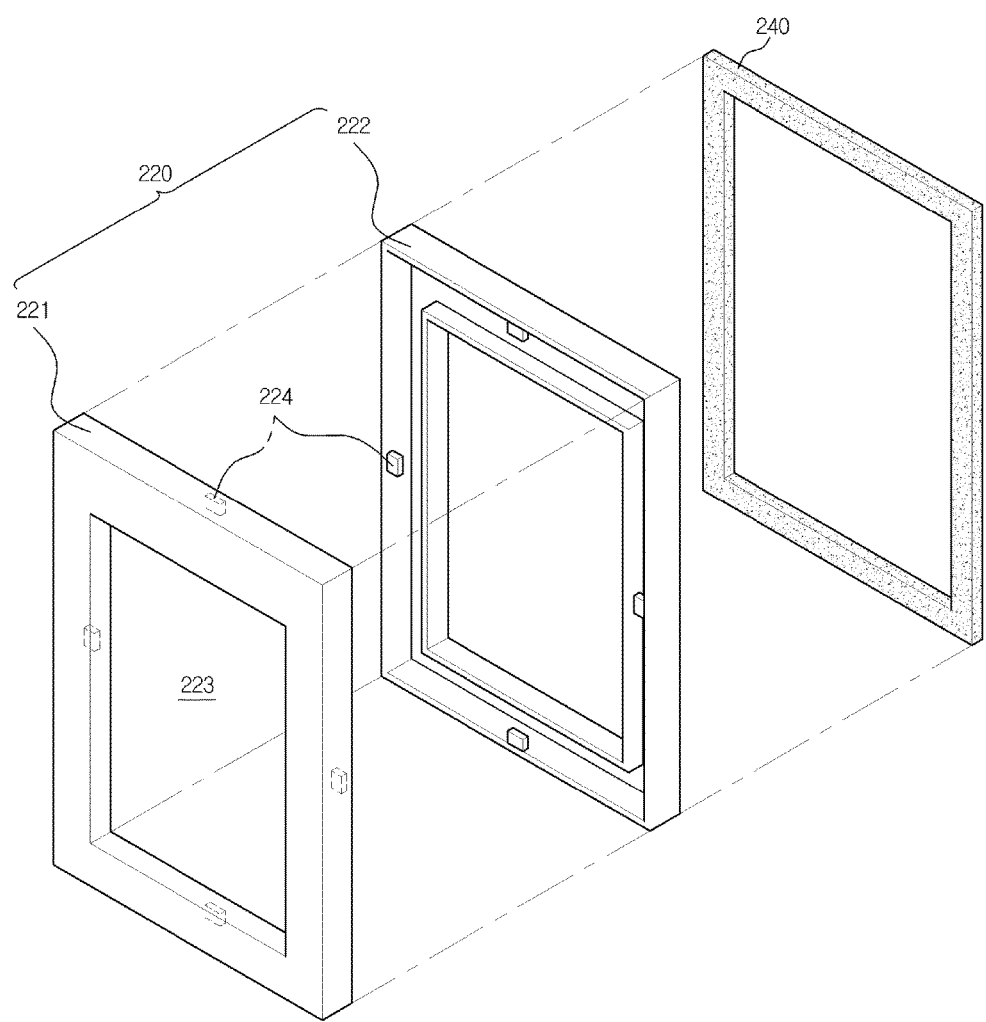
FIGS. 4A to 4D are views illustrating the structure of a transparent display panel provided in the display system according to the exemplary embodiment of the present invention.
Figure 4B:
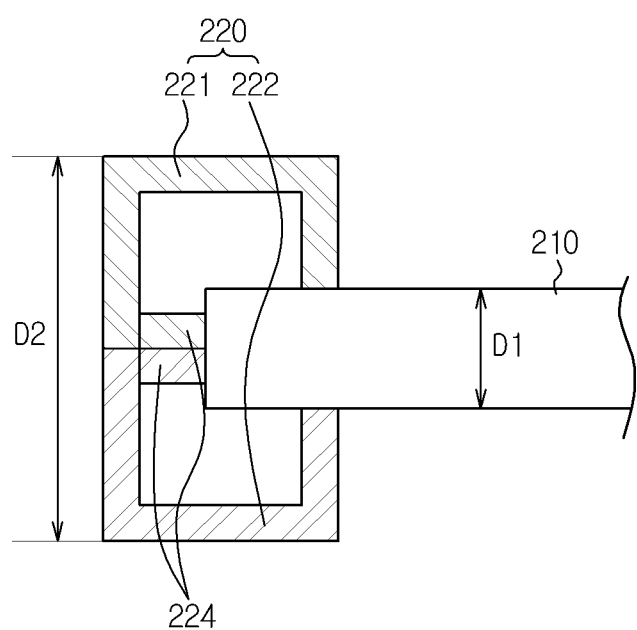
Figure 4C:
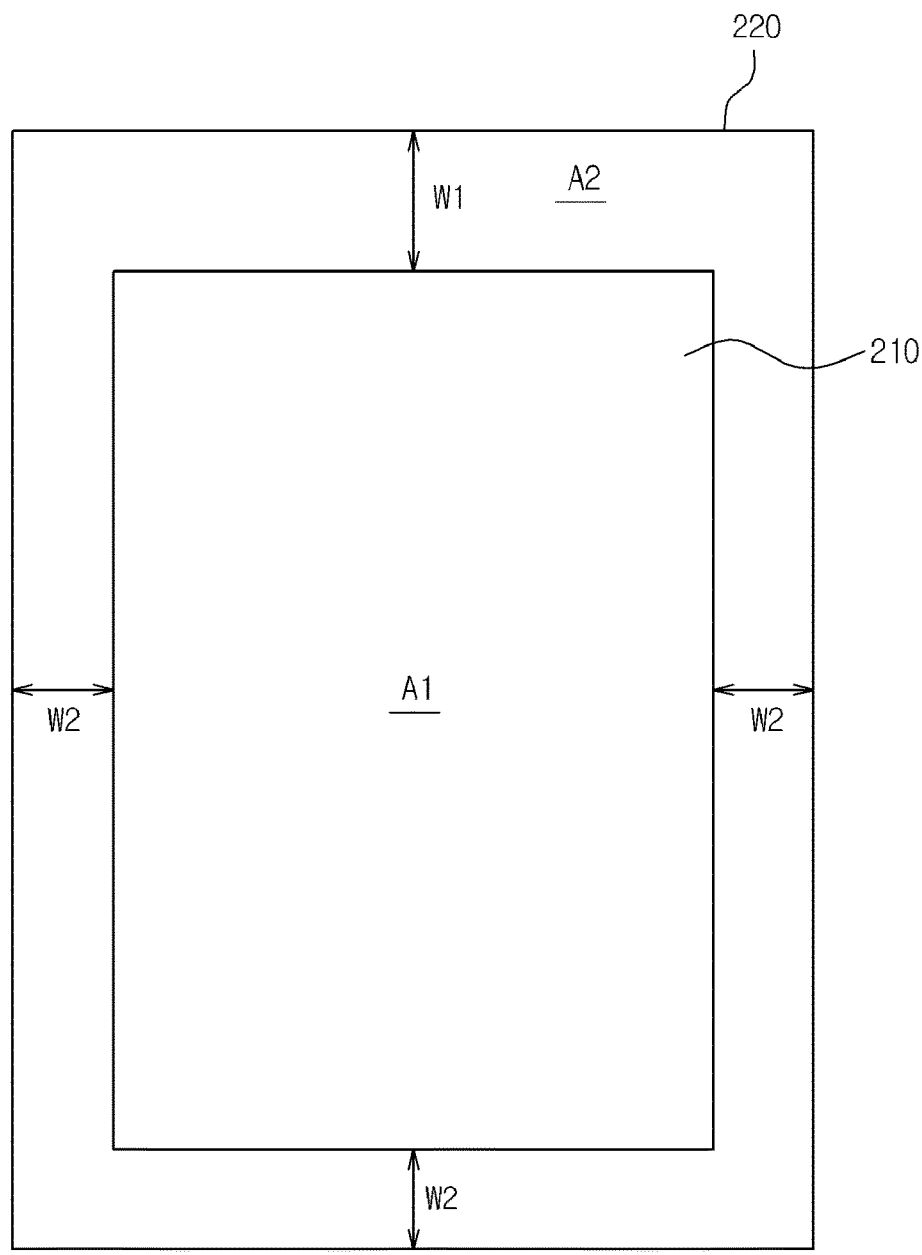
Figure 4D:
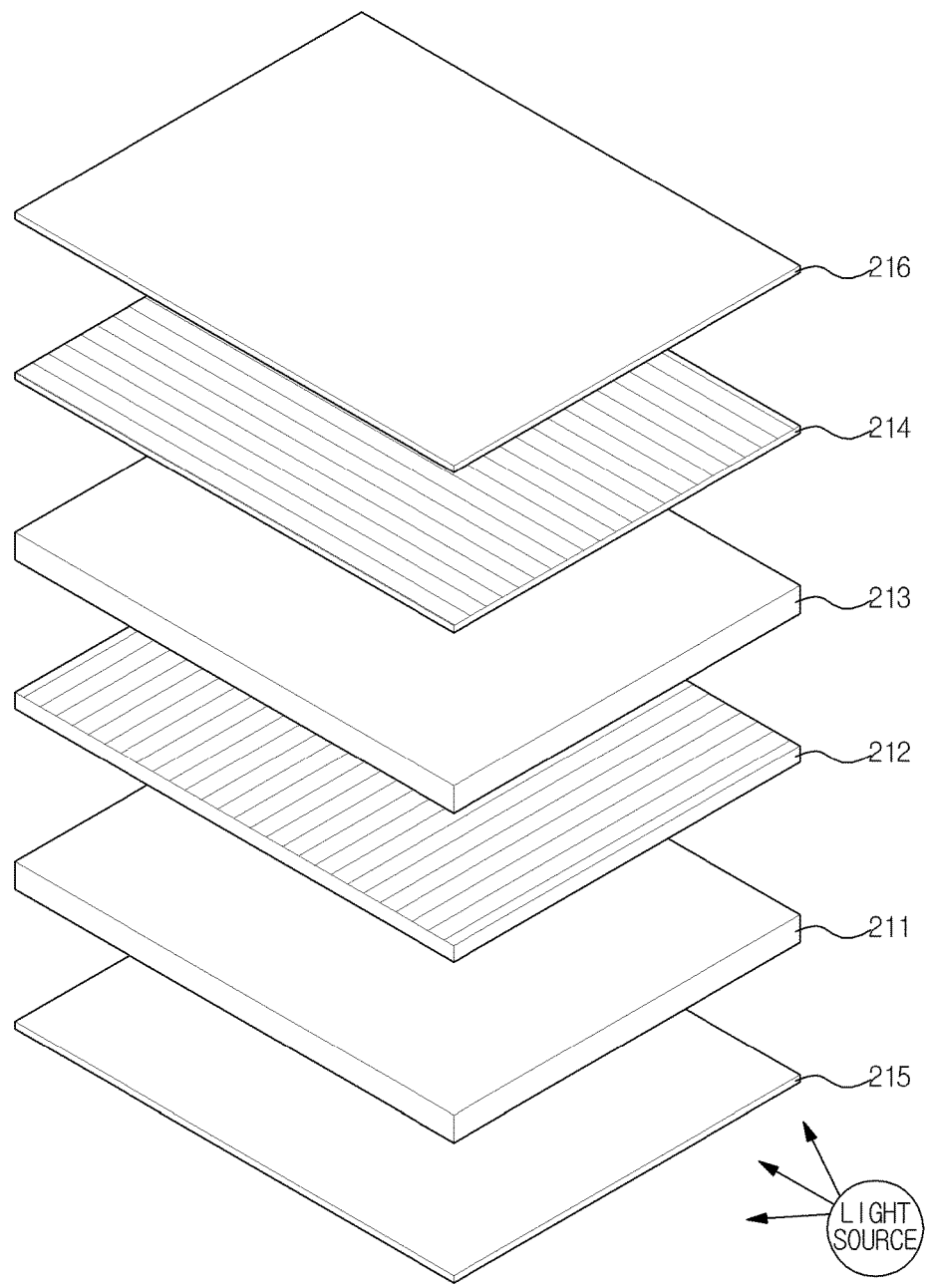
Figure 5:
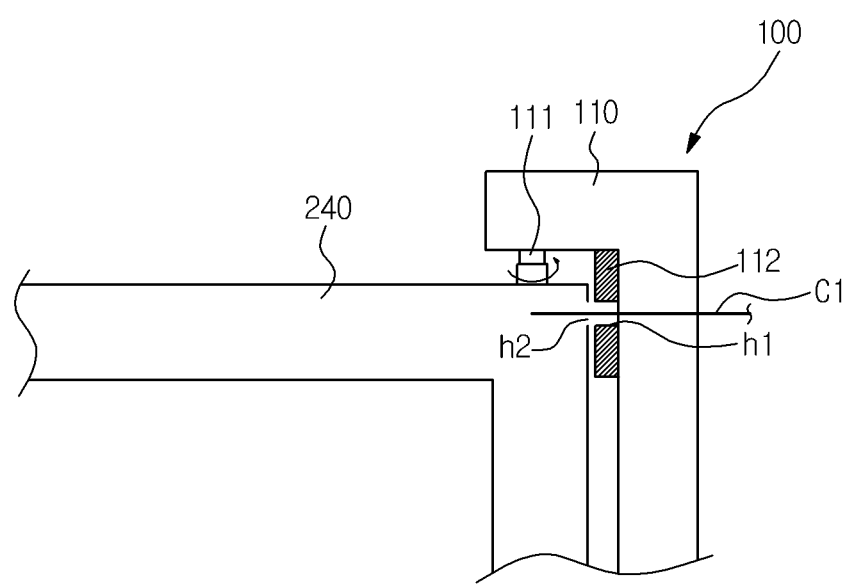
FIGS. 5 and 6 are views illustrating extension of a cable between a main body of the display system according to the exemplary embodiment of the present invention and the display module.
Figure 6:
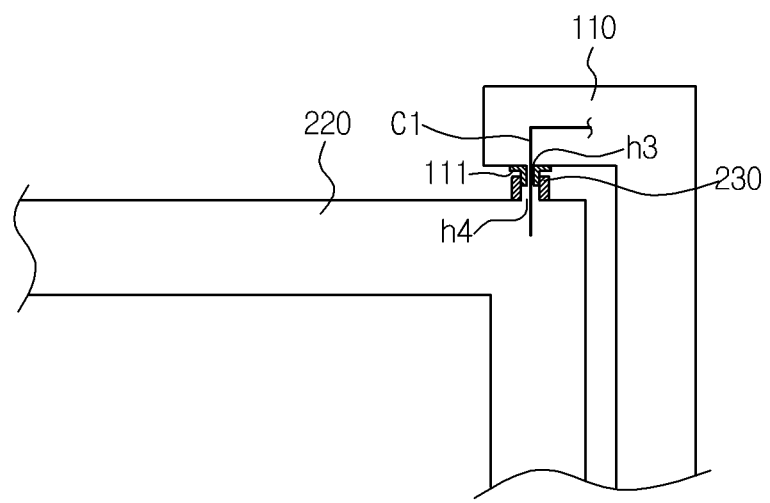
Figure 7:
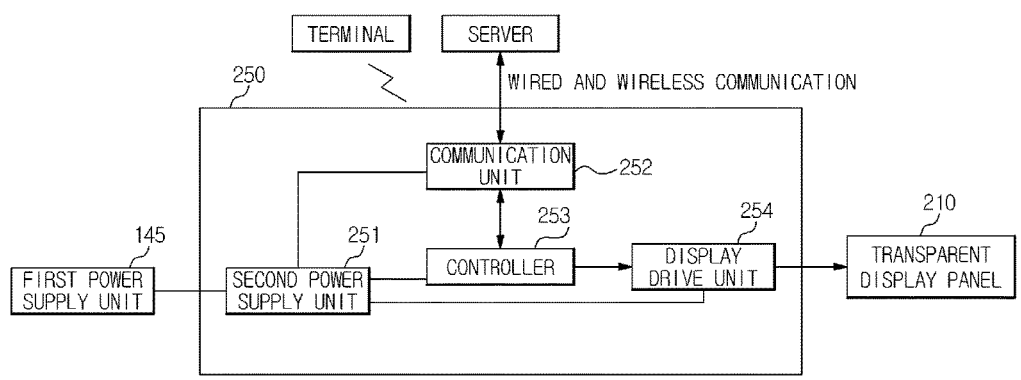
FIG. 7 is a control block diagram of the display system according to the exemplary embodiment of the present invention.

FIG. 1 is a perspective view of a display system according to an exemplary embodiment of the present invention, FIG. 2 is a view illustrating the interior of the display system according to the exemplary embodiment of the present invention, FIG. 3 is a view illustrating the interior of a display module provided in the display system according to the exemplary embodiment of the present invention, FIGS. 4A to 4D are views illustrating the structure of a transparent display panel provided in the display system according to the exemplary embodiment of the present invention, FIGS. 5 and 6 are views illustrating extension of a cable between a main body of the display system according to the exemplary embodiment of the present invention and the display module, and FIG. 7 is a control block diagram of the display system according to the exemplary embodiment of the present invention.

In this exemplary embodiment, the display system includes a refrigerating showcase, as a system body 100, to keep food fresh and a door, as a display module 200, mounted at an opening of the main body of the showcase.

As shown in FIGS. 1 and 2, the refrigerating showcase, as the system body 100, includes a main body 110, a storage chamber 120, shelves 130, a machine compartment 140, and a cool air generating compartment 150.

The main body 110 forms the external appearance of the showcase.

The storage chamber 120 to store food is defined in the main body 110. The main body 110 is provided at the front thereof with a mounting member 111 and a protective member 112. Also, an opening 113 is formed at the front of the main body 110.

Hinges 230 of the door 200 are hingedly mounted at the mounting member 111.

The protective member 112 includes a first hole h1. The protective member 112 protects a first cable C1 extending through the first hole h1. The protective member 112 contacts the door 200.

A lighting device 125 to adjust brightness in the showcase is provided in the storage chamber 120. The shelves 130, on which food is placed, are provided in the storage chamber 120.

Power from a branch cable C1' of the first cable C1 is supplied to the lighting device 125.

The shelves 130 divide the storage chamber 120 into a plurality of regions. Consequently, food may be placed in the respective regions of the storage chamber 120.

The machine compartment 140 is located below the storage chamber 120.

In the machine compartment 140 are provided a compressor 141 to compress a refrigerant, a condenser 142 to condense the high-temperature, high-pressure refrigerant, compressed by the compressor 141, a cooling fan 143 to cool hot air generated from the compressor 141 and the condenser 142 and enable air around the condenser 142 to be heat-exchanged, a valve 144 disposed between the condenser 142 and an evaporator 151 so as to be opened or closed based on temperature of the storage chamber 120, a first power supply unit 145 connected to an external commercial power source to convert power from the commercial power source into drive power to be used by components and to supply the converted power to the components, and a cover 146 to cover the machine compartment 140.

The cool air generating compartment 150 is located above the storage chamber 120.

In the cool air generating compartment 150 are provided an evaporator 151 to perform heat exchange with air in the storage chamber 120 and a blowing fan 152 to blow cool air, heat-exchanged by the evaporator 151, to the storage chamber 120.

When the valve 144 is opened, the refrigerant from the condenser 142 is supplied to the evaporator 151. At this time, the low-temperature liquid refrigerant is changed into a gaseous refrigerant, thus absorbing latent heat. That is, the evaporator 151 performs a cooling operation. As a result, ambient air and air in the storage chamber 120 are cooled. That is, the evaporator 151 lowers the temperature in the storage chamber 120.

The cool air generating compartment 150 further includes a duct 153 along which cool air flows.

The duct 153 is provided at the rear of the main body 110. In addition, the evaporator 151 and the blowing fan 152 may be mounted in the duct 153 provided at the rear of the main body 110.

A plurality of holes is formed at a wall between the duct 153 and the storage chamber 120. Cool air flows between the duct 153 and the storage chamber 120 through the holes.

The door 200, as the display module, is hingedly mounted at a front opening 113 of the main body 110, corresponding to the storage chamber 120, to isolate the storage chamber 120 from the outside, thereby potentially preventing leakage of cool air from the storage chamber 120.

The door 200 opens and closes the storage chamber 120. That is, an administrator, a user or a customer may open the door 200 to put or draw food into or from the storage chamber 120.

As shown in FIG. 3, the door 200, as the display module, includes a transparent display panel 210, a frame 220 to fix the transparent display panel 210 and a drive module 250 mounted in a predetermined space between the frame 220 and a packing 240 to control driving of the transparent display panel 210.

The transparent display panel 210 is mounted in the frame 220. The transparent display panel 210 may be partially or wholly mounted in the frame 220.

The door 200, as the display module, further includes hinges 230 provided at the upper and lower ends of one side of the frame 220 so that the hinges 230 are mounted in the mounting member 111 of the main body 110 to hingedly fix one side of the door 220 to the main body 110 and a packing 240 mounted in the frame 220 at a side contacting the front of the main body to absorb impact generated between the door and the main body 110 and improve a seal between the door and the storage chamber 120 when the door 200 is closed. That is, the drive module 250 is protected from external impact by the frame 220 and the packing 240.

The door 200, as the display module, will be described in detail with reference to FIGS. 4A to 4D, 5 and 6.

As shown in FIG. 4A, the frame 220 includes a plurality of frame members 221 and 222. The frame members 221 and 222 are separately coupled to each other.

The packing 240 is detachably mounted to one of the frame members 221 and 222, i.e. the frame member 222 contacting the showcase 100, as the system body.

Each of the frame members 221 and 222 has a hole 223. The transparent display panel 210 is disposed in the holes 223. That is, the frame 220 is disposed at the outside of the transparent display panel 210 to constitute the edge of the door, as the display module.

In each of the frame members 221 and 222 is provided a plurality of support members 224 to support the transparent display panel 210.

More specifically, the transparent display panel 210 is fitted between the frame members 221 and 222, and the frame members 221 and 222 are coupled to fix the transparent display panel 210 to the frame 220. At this time, the support members 224 support sides of the transparent display panel 210. Also, the frame members 221 and 222 are coupled to each other by the support members 224.

As shown in FIG. 4B, the transparent display panel 210 is fitted in the frame 220. Consequently, the thickness D1 of the transparent display panel 210 of the door, as the display module, is less than the thickness D2 of the frame 220.

As shown in FIG. 4C, the surface area of the front of the door 200, as the display module, includes the surface area A1 of the transparent display panel 210 and the surface area A2 of the frame 220. The surface area A1 of the transparent display panel 210 is greater than the surface area A2 of the frame 220.

The width W1 of the frame at one side where the drive module 250 is mounted may be greater than the width W2 of the frame at the other sides to easily and safely mount the drive module 250 in the frame.

The transparent display panel 210 may be a liquid crystal display (LCD) or an organic light emitting diodes (OLED). Hereinafter, the LCD, as the transparent display panel 210, will be described.

As shown in FIG. 4D, the transparent display panel 210 includes a light guide plate 211, a first polarizing plate 212, a liquid crystal panel 213, a second polarizing plate 214, a first sheet 215 and a second sheet 216.

A light source is disposed at one side of the light guide plate 211.

The light source may be a cold cathode fluorescent lamp (CCFL), an external electrode fluorescence lamp (EEFL), a light emitting diode array, the light device 125 in the storage chamber 120 or natural light.

Light emitted from the light source is circular polarized light including a left circular polarized light component and a right circular polarized light component.

The light guide plate 211 enables light emitted from the light source to be incident upon the first polarizing plate 212. The light guide plate 211 includes first and second refraction layers (not shown). The second refraction layer is made of a medium having a greater refractive index than the first refraction layer. Consequently, light emitted from the light source is fully reflected by the light guide plate 211, and the fully reflected light is incident upon the first polarizing plate 212.

The light guide plate 211 enables natural light to be incident upon the liquid crystal panel 213 through the first refraction layer and the second refraction layer.

The first and second polarizing plates 212 and 214 include cholesteric liquid crystals (not shown). The cholesteric liquid crystals of the first and second polarizing plates 212 and 214 include a plurality of cholesteric liquid crystal molecules.

The cholesteric liquid crystal molecules have a left-handed helix structure and a right-handed helix structure. The left circular polarized light component is transmitted and the right circular polarized light component is reflected by the cholesteric liquid crystal molecules of the left-handed helix structure.

Also, the left circular polarized light component is reflected, and the right circular polarized light component is transmitted, by the cholesteric liquid crystal molecules of the right-handed helix structure.

Consequently, polarized light transmitted by the first polarizing plate 212 becomes a P wave and polarized light reflected by the first polarizing plate 212 becomes an S wave.

Meanwhile, the S wave, reflected by the first polarizing plate 212, is incident upon the light guide plate 211 and is reflected by the second refraction layer of the light guide plate 211. At this time, the reflected light is converted into a P wave, which may be transmitted by the first polarizing plate 212. Therefore, the first polarizing plate 212 may function as a reflection plate.

The liquid crystal panel 213 includes a thin film transistor, as a switching element, a first substrate having a pixel electrode electrically connected to the thin film transistor, black matrices arranged at a predetermined interval to block light incident from the light source, a color filter pattern formed between the black matrices, a second substrate having an overcoat layer formed on the color filter pattern and a liquid crystal layer disposed between the first substrate and the second substrate.

The liquid crystal panel 213 adjusts light transmissivity of liquid crystal cells based on image information transmitted from a controller 253 to form an image.

The liquid crystal panel 213 may transmit the P wave incident from the first polarizing plate 212 according to the driving of the liquid crystal cells. That is, the amount of light transmitted is adjusted according to the driving of the liquid crystal cells of the liquid crystal panel 213 to display an image having gradation.

More specifically, the phase of the P wave varies according to the driving of the liquid crystal panel. When the phase of the P wave is changed to 90 degrees, the maximum amount of light is transmitted by the second polarizing plate 214 to achieve white gradation. When the phase of the P wave is changed to 45 degrees, less light is transmitted by the second polarizing plate 214 to achieve middle gradation.

Consequently, the displacement of the liquid crystals varies based on the intensity of an electric field applied to the liquid crystal cells of the liquid crystal panel 213, and the phase of the P wave varies from 0 degrees to 90 degrees based on such displacement to achieve desired gradation.

The second polarizing plate 214 is provided at one side of the liquid crystal panel 213. The second polarizing plate 214 has an optical axis perpendicular to the first polarizing plate 212. Therefore, the amount of light transmitted is adjusted based on the phase of the polarized light of the first polarizing plate 212 varied according to the driving of the liquid crystal cells of the liquid crystal panel 213.

Consequently, a user or a customer may view food placed in the storage chamber 120 while viewing advertisement or food information regarding the transparent display panel 210.

The first sheet 215 is a heat insulation sheet provided at the side of the transparent display panel 210 adjacent to the storage chamber 120, i.e. one side of the light guide plate 211. The first sheet 215 prevents temperature in the storage chamber 120 from being increased by heat generated during driving of the transparent display panel 210.

The second sheet 216 is an anti-reflective coating film provided at the exposed side of the transparent display panel 210, i.e. one side of the second polarizing plate 214. The second sheet 216 prevents light from being reflected so that the interior of the storage chamber 120 and the image on the transparent display panel 210 are easily visible from the side of the showcase even on a bright day.

Another example of the transparent display panel will be briefly described.

In this example, a first polarizing plate of the transparent display panel is provided at one side of a light guide plate. The transparent display panel includes a first polarizing plate to polarize light emitted from the light source, a light guide plate provided at one side of the first polarizing plate to discharge the polarized light incident through the first polarizing plate to the front, a liquid crystal panel provided at the front of the light guide plate to display an image based on light incident from the light guide plate, and a second polarizing plate provided at the front of the liquid crystal panel.

The first polarizing plate is located at one side of the light guide plate adjacent to the light incident plane of the light guide plate. The first polarizing plate transmits only the first polarized light of the light including the first and second polarized lights.

The second polarizing plate has an optical axis perpendicular to the first polarizing plate. Therefore, the amount of light transmitted is adjusted based on the phase of the first polarized light of the first polarizing plate varied according to the driving of liquid crystal cells of the liquid crystal panel. For example, when the phase of the first polarized light is 0 degrees, the first polarized light is not transmitted by the second polarizing plate. As the phase of the first polarized light is increased, a larger amount of the first polarized light is transmitted by the second polarizing plate. That is, greater gradation is achieved as the phase of the first polarized light is increased.

Both first and second polarized lights of natural light are incident upon the liquid crystal panel.

When the liquid crystal cells of the liquid crystal panel are not driven, therefore, the second polarized light of the natural light is transmitted through the liquid crystal panel. When the liquid crystal cells of the liquid crystal panel are driven, the first polarized light of the natural light is transmitted through the liquid crystal panel.

Consequently, the liquid crystal panel is kept transparent by the natural light irrespective of whether the liquid crystal panel is driven or not.

That is, the transparent display panel 210 remains transparent to the natural light irrespective of a display driving command. Consequently, a user or a customer may view food placed in the storage chamber 120 at any time.

The transparent display panel 210 displays advertisements, food information and user-tailored information in response to a command from the controller 253 provided in the drive module 250.

The drive module 250 is at least one printed circuit board (PCB). In the drive module 250 are provided a second power supply unit 252 to convert power from the first power supply unit 145 into drive power of a communication unit, drive power of the controller and drive power of a display drive unit, a communication unit 252 to receive data transmitted from a server, a controller 253 to process the received data and output a drive command corresponding to the processed data and a display drive unit 254 to drive the transparent display panel in response to the command from the controller so that data are displayed on the transparent display panel.

The second power supply unit 252 is connected to the first power supply unit 145 of the main body 110 via the first cable C1 to receive power from the first power supply unit 145.

The first cable C1 is located at the system body 100 and the door 200. That is, the first cable C1 extends from the system body 100 to the door 200.

Extension of the cable between the main body 110 and the door 200 will be described with reference to FIGS. 5 and 6.

As shown in FIG. 5, the packing 240 of the door 200 includes a second hole h2.

The second hole h2 of the packing 240 is located at a position where the protective member 112 of the main body 110 contacts the packing 240. Also, the main body 110 includes a hole formed at a position corresponding to the hole h1 of the protective member 112.

In this structure, the cable C1, connected to the first power supply unit 145, extends to the second power supply unit 251 of the door 200 through the first hole h1 of the protective member 112 of the main body 110 and the second hole h2 of the packing 240 of the door 200.

In addition, the second hole h2 formed at the packing 240 of the door 200 may be formed at the frame 220 of the door 200.

Another example is shown in FIG. 6.

As shown in FIG. 6, the hinge 230 is provided at each of the upper and lower ends of the frame 220 of the door 200. The hinge 230 is hingedly mounted at the mounting member 111 of the main body 110 so that one side of the door 200 is hingedly fixed to the main body 110.

That is, the door 200 is hingedly mounted to the main body 110 by the hinges 230.

A first hole h3 is formed at the mounting member 111 of the main body 110, and a second hole h4 is formed at the hinge 230 of the door 200. The second hole h4 extends to the frame 220 of the door 200.

In addition, the main body 110 includes a hole corresponding to the first hole h3 of the mounting member 111, and the frame 220 of the door 200 includes a hole corresponding to the second hole h4 of the hinge 230.

In this structure, the cable C1, connected to the first power supply unit 145, extends to the second power supply unit 251 of the door 200 through the first hole h3 of the mounting member 111 of the main body 110 and the second hole h4 of the hinge 230 of the door 200.

FIG. 7 is a control block diagram of the display module provided in the display system according to the exemplary embodiment of the present invention. The display module includes a second power supply unit 251, a communication unit 252, a controller 253 and a display drive unit 254.

The second power supply unit 251, the communication unit 252, the controller 253 and the display drive unit 254 are provided in the drive module 250 disposed in the frame 220 of the door 200, as the display module.

The second power supply unit 251 is connected to the first power supply unit 145 of the main body 110 via the first cable C1 to receive power from the first power supply unit 145, to covert the received power into drive power of the controller, drive power of the controller and drive power of the display drive unit, and to supply the converted power to the communication unit 252, the controller 253 and the display drive unit 254.

The second power supply unit 251 performs AC/DC conversion and DC/DC conversion.

The communication unit 252 receives data from a server or a terminal and transmits the received data to the controller 253. The communication unit 252 performs wired and/or wireless communication.

Data may include advertisement image data, food data, such as date of manufacture, expiry date, nutritional information and place of origin, event information, discount coupon image data and image data related to the surroundings of the showcase. Such image data may include pictures, photographs, words and video.

In addition, the server communicates with the communication unit 252 through wired and/or wireless communication. The terminal communicates with the communication unit 252 through wireless communication, such as WiFi or Bluetooth.

Also, the terminal may be an administrator terminal which directly controls driving of the transparent display panel 210.

If the terminal is a smart phone, an application to control the display of the showcase is installed in the smart phone. This application may be downloaded from an app store, which is an application store, or the server. Also, the application may be upgraded and updated.

The controller 253 processes the received data and outputs a drive command corresponding to the processed data to the display drive unit 254. At this time, the controller 253 receives data in a predetermined format and decodes the received data.

The display drive unit 254 drives the transparent display panel in response to a command from the controller so that data are displayed on the transparent display panel.

The display drive unit 254 drives the liquid crystal cells of the liquid crystal panel 213 in response to the command from the controller 253 so that an image is displayed on the transparent display panel 210 and the transparency of the transparent display panel is adjusted.

The display module may further include a storage unit to store data and an input unit to allow data received by the communication unit or stored in the storage unit to be selected.

At this time, the controller confirms the data selected through the input unit, processes the confirmed data, and transmits a drive command corresponding to the processed data to the display drive unit 254.

In a case in which a plurality of data is stored in the storage unit, the controller 253 may control one of the data to be displayed or the data to be sequentially displayed at a predetermined interval.

The data stored in the storage unit are transmitted from the server and/or the terminal. The data may be stored in a compressed file format.

Figure 8:
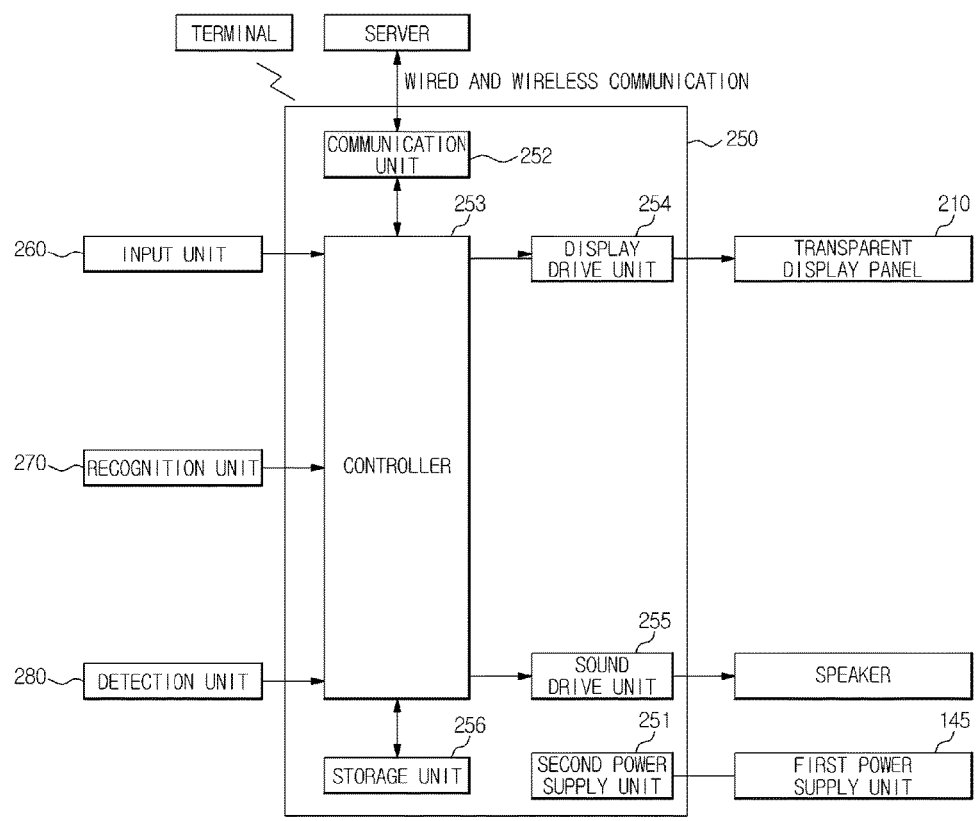
FIG. 8 is a control block diagram of a display system according to another exemplary embodiment of the present invention.

FIG. 8 is a control block diagram of a display system according to another exemplary embodiment of the present invention. The display system includes a second power supply unit 251, a communication unit 252, a controller 253, a display drive unit 254, a sound drive unit 255, a storage unit 256, an input unit 260, a recognition unit 270 and a detection unit 280.

The second power supply unit 251, the communication unit 252, the controller 253, the display drive unit 254, the sound drive unit 255 and the storage unit 256 may be provided in a drive module.

The input unit 260, the recognition unit 270 and the detection unit 280 may also be provided in the drive module 250. Alternatively, the input unit 260, the recognition unit 270 and the detection unit 280 may be provided in a frame and may be then electrically connected to the controller 253 of the drive module 250.

The second power supply unit 251 is connected to the first power supply unit 145 of the main body 110 via the first cable C1 to receive power from the first power supply unit 145, to covert the received power into drive power to be used by components and to supply the converted power to the communication unit 252, the controller 253, the display drive unit 254, the sound drive unit 255, the storage unit 256, the input unit 260, the recognition unit 270 and the detection unit 280.

The second power supply unit 251 performs AC/DC conversion and DC/DC conversion.

The communication unit 252 communicates with a server or a terminal, such as a smart phone, receives image data and/or sound data from the server or the terminal and transmits the received data to the controller 253. The communication unit 252 performs wired and/or wireless communication.

In addition, the server communicates with the communication unit 252 through wired and/or wireless communication. The terminal communicates with the communication unit 252 through wireless communication, such as WiFi or Bluetooth.

Also, the terminal may be an administrator terminal which directly controls driving of the transparent display panel 210.

If the terminal is a smart phone, an application to control the display of the showcase is installed in the smart phone. This application may be downloaded from an app store, which is an application store, or the server. Also, the application may be upgraded and updated.

The communication unit 252 may communicate with a customer terminal through wireless communication such as WiFi or Bluetooth. At this time, the communication unit 252 transmits the name and identification of a customer received from the customer terminal to the controller 253. Also, the communication unit 252 transmits a tailored information display approval signal received from the customer terminal to the controller 253.

The controller 253 processes data received by the communication unit 252 and outputs a drive command corresponding to the processed data to the display drive unit 254. At this time, the controller 253 receives data in a predetermined format and decodes the received data.

Also, the controller 253 processes data stored in the storage unit 256 and outputs a drive command corresponding to the processed data to the display drive unit 254.

Figure 9:
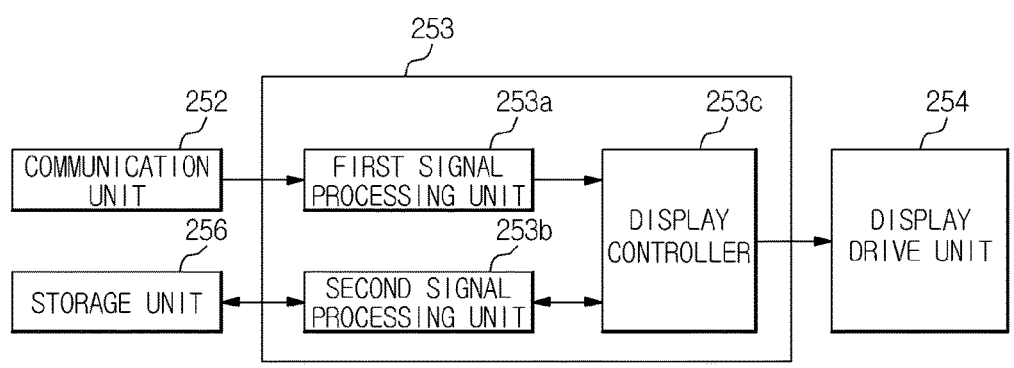
FIG. 9 is a detailed control block diagram of the display system according to the exemplary embodiment of the present invention.

As shown in FIG. 9, the controller 253 includes a first signal processing unit 253*a* to process the data received by the communication unit 252, a second signal processing unit 253*b* to process the data stored in the storage unit, and a display controller 253*c* to create and output a drive command to display the data processed by the first signal processing unit and the second signal processing unit.

The first signal processing unit may include a signal processing unit to process data received through wired communication and a signal processing unit to process data received through wireless communication.

The second signal processing unit 253*b* may encode data when the data are stored in the storage unit.

In addition, the controller 253 and the first and second signal processing units may be separately provided. In this case, the first signal processing unit and the second signal processing unit transmit processed data to the controller 253.

The display drive unit 254 drives the transparent display panel in response to a command from the controller so that data are displayed on the transparent display panel.

The display drive unit 254 drives the liquid crystal cells of the liquid crystal panel 213 in response to the command from the controller 253 so that an image is displayed on the transparent display panel 210 and the transparency of the transparent display panel is adjusted.

Also, display drive unit 254 outputs reversed data in response to the command from the controller 253 so that a reversed image is displayed on the transparent display panel 210.

The sound drive unit 255 outputs sound corresponding to an image displayed on the transparent display panel 210 through a speaker in response to a command from the controller 253.

For example, when an advertisement image is displayed on the transparent display panel 210, the sound drive unit 255 outputs sound corresponding to the advertisement or sound requesting that the door be closed through a speaker.

The storage unit 256 stores data transmitted from the server or the terminal. At this time, the data may be stored in a compressed file format.

The storage unit 256 stores customer information corresponding to name and identification for each customer. The customer information includes tailored information, such as date of purchase, purchase quantity for each article, purchase content and consumption patterns, identification, customer terminal information and customer personal information. The tailored information is transmitted from the terminal.

The storage unit 256 stores information regarding food stored in the storage chamber 120. The food information includes date of manufacture, expiry date, place of origin, calories, nutritional information, company name and an advertisement image.

The controller 253 controls driving of the display drive unit 254 and the sound drive unit 255 based on a signal input from the input unit 260, the recognition unit 270 or the detection unit 280.

A control configuration between the controller 253 and the input unit 260 will be described in more detail.

The input unit 260 includes a power mode button to turn power on and off, a first mode button to display an advertisement image, a second mode button to display an information regarding food stored in the storage chamber 120, a third mode button to adjust the transparency of the transparent display panel, and an update mode button (not shown) to update image information stored in the storage unit 256.

The input unit 260 transmits a button signal input by a user to the controller 253.

The controller 253 controls driving of the display drive unit 254 based on the button signal transmitted from the input unit 260.

More specifically, when an input signal of the power mode button is transmitted while power is supplied to the transparent display panel, the controller 253 controls an image not to be displayed on the transparent display panel so that the transparent display panel is kept transparent. When an input signal of the power mode button is transmitted while supply of power to the transparent display panel is interrupted, the controller 253 controls an image to be displayed on the transparent display panel so that advertisement or food information is displayed on the transparent display panel. At this time, a mode before power is turned off is performed or a predetermined mode is performed when power is turned on.

When an input signal of the first mode button is transmitted, the controller 253 controls an advertisement image to be displayed on the transparent display panel. When an input signal of the second mode button is transmitted, the controller 253 controls a food information image to be displayed on the transparent display panel. When an input signal of the third mode button is transmitted, the controller 253 adjusts transparency of the transparent display panel.

In addition, the storage unit 256 stores image information for each mode.

A control configuration between the controller 253 and the recognition unit 270 will be described in more detail.

The recognition unit includes a tag recognition unit to recognize tags and/or a code recognition unit to recognize a bar code or a quick response (QR) code.

The tag recognition unit is a radio frequency identification (RFID) recognition unit to recognize data stored in RFID tags using radio frequency. The tag recognition unit recognizes data in a tag (not shown) attached to a customer membership card and transmits the recognized data to the controller 253.

The code recognition unit scans a bar code or a QR code provided on food and transmits the scanned data to the controller 253.

The controller 253 confirms name and identification (ID) of a customer based on the data of the tag transmitted from the recognition unit 270 and controls the display drive unit 254 to display the tailored information of the customer.

More specifically, the controller 253 confirms the name and ID of the customer in the tag and controls an image, such as a welcome message, as well as the name or nickname of the customer to be displayed on the transparent display panel, retrieves customer information coinciding with the confirmed ID from the storage unit 256, and controls tailored information of the retrieved customer to be displayed on the transparent display panel.

The tailored information of the customer includes date of purchase, purchase content, purchase quantity for each article and consumption patterns during a predetermined period of time, which are provided to improve customer satisfaction.

In addition, the controller 253 may communicate with the customer terminal based on the data in the tag, and, when a tailored information display approval signal is transmitted from the customer terminal, may control the tailored information to be displayed on the transparent display panel.

During communication with the customer terminal, the controller 253 may retrieve customer terminal information stored in the storage unit 256 based on the customer ID and may communicate with the customer terminal based on the retrieved information.

Also, the controller 253 may communicate with the customer terminal to transmit the tailored information to the customer terminal.

Also, the controller 253 may communicate with the customer terminal to acquire the name and ID of the customer and control driving of the display drive unit 254 based on the acquired name and ID of the customer.

The controller 253 confirms information regarding corresponding food based on the scanned date of the bar code or the QR code and determines whether the confirmed food information is stored in the storage unit 256. When the information regarding the corresponding food is stored in the storage unit 256, the controller 253 transmits the information regarding the corresponding food to the storage unit 256 so that the information regarding the food is stored in the storage unit 256.

Also, when the information regarding the corresponding food is stored in the storage unit 256, the controller 253 updates the information regarding the corresponding food stored in the storage unit 256. In addition, when the information regarding the food stored in the storage unit 256 coincides with the scanned information, the controller 253 may control the information regarding the food stored in the storage unit 256 to be maintained.

When additional food is placed in the showcase, information regarding the additionally placed food is updated using the code recognition unit, thereby potentially allowing the managing of information regarding food placed in the showcase.

Also, the controller 253 determines whether an advertisement image of corresponding food is stored in the storage unit 256 based on the scanned data of the food. When the advertisement image of the corresponding food is stored in the storage unit 256, the controller 253 controls the advertisement image of the corresponding food to be displayed.

An advertisement image display sequence of the additionally placed food is decided in consideration of a predetermined advertisement sequence. Alternatively, the advertisement image display sequence of the additionally placed food may be decided by an administrator.

Also, the controller 253 may determine whether image information of corresponding food is present in the scanned data of the food. When the image information regarding the corresponding food is present in the scanned data of the food, the controller 253 may control the image information to be displayed as an advertisement image of the corresponding food.

A control configuration between the controller 253 and the detection unit 280 will be described in more detail.

The detection unit 280 includes a human body detection unit to detect a human body and/or a door opening and closing detection unit to detect opening and closing of the door.

The controller 253 adjusts transparency and/or brightness of the transparent display panel based on the determination as to whether the human body has been detected, controls reversal of an image based on the determination as to whether the door has been opened or closed, and controls change of the image based on time for which the door is open.

A control configuration between the human body detection unit and the controller will now be described.

The human body detection unit detects whether a human body is present. The human body detection unit may include a thermal infrared sensor to detect heat generated from a human body, a motion sensor to detect motion of a human body, a load sensor to detect weight applied to a human body. Hereinafter, the thermal infrared sensor, as the human body detection unit, will be described.

The thermal infrared sensor detects thermal infrared radiation around the showcase and transmits the detected heat to the controller 253.

The controller 253 determines whether a person is adjacent to the showcase based on the thermal infrared rays. Upon determining that a person is adjacent to the showcase, the controller 253 controls the display drive unit 254 to adjust transparency or brightness of the transparent display panel 210.

For example, when a person is adjacent to the showcase, the transparency of the transparent display panel 210 is increased so that the food placed in the storage chamber 120 is more visible. Otherwise, the brightness of the transparent display panel 210 is increased so that an image displayed on the transparent display panel 210 is more clearly visible. On the other hand, the brightness of the transparent display panel 210 may be decreased, when no person is adjacent to the showcase, to reduce power consumption.

Also, upon determining that a person is adjacent to the showcase, the controller 253 may control an image displayed on the transparent display panel 210 to be changed.

For example, only an unmovable image may be displayed on the transparent display panel 210, and, upon determining that a person is adjacent to the showcase, video may be displayed to draw person's attention.

A control configuration between the door opening and closing detection unit and the controller will be described.

The door opening and closing detection unit detects whether the door has been opened or closed. The door opening and closing detection unit may include a temperature sensor, an infrared sensor, an ultrasonic sensor, a hall sensor or a micro switch.

When the door 200 is opened, the controller 253 controls reverse driving of the display driving unit 254 so that an image displayed on the closed door is viewed by a customer, counts an open time of the door 200, and controls the display drive unit 254 to display a message indicating that it is difficult to keep food fresh due to discharge of cool air or a message requesting that the door 200 be closed when the counted open time of the door exceeds a reference time.

The controller 253 may determine whether a message is present in the currently displayed image based on the currently displayed image information and may not perform reverse control when no message is present in the currently displayed image.

The storage unit 256 stores image information for each mode and reverse image information of each image, a reference open time of the door 200 to efficiently control cool air in the storage chamber for freshness of food, and image information including a message requesting that the door be closed based on an elapsed door open time.

Figure 10:
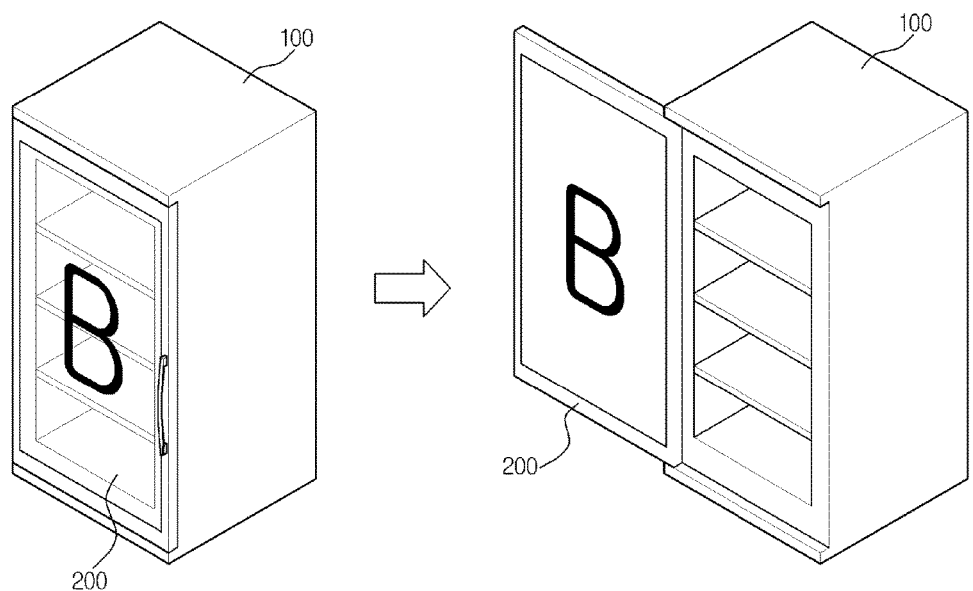
FIG. 10 is a view illustrating a reversed state of a display module provided in the display system according to the exemplary embodiment of the present invention.

As shown in FIG. 10, a user or a customer may correctly view a written image 'B' from the outside of the door when the door 200 is closed. Also, when the door 200 is opened, the written image displayed on the door 200 is reversed so that the user or the customer may correctly view the written image 'B' from the inside of the door.

An example of door opening and closing detection using the temperature sensor and display control of the transparent display panel will be described.

The temperature sensor detects temperature in the storage chamber 120 and transmits the detected temperature to the controller 253.

The controller 253 monitors temperature in the storage chamber 120 and calculates a change rate of the temperature in the storage chamber 120. When the change rate of the temperature in the storage chamber 120 exceeds a reference change rate, the controller 253 determines that the door 200 is open. Upon determining that the door 200 is open, the controller 253 may control the image displayed on the transparent display panel 210 to be reversed.

The controller 253 may estimate a door open time based on the change of the temperature in the storage chamber 120.

While the door remains open, the temperature in the storage chamber 120 is maintained within a reference temperature range. When the door is closed, heat exchange is not performed between cool air in the storage chamber and external air with the result that the temperature in the storage chamber 120 is lowered below the reference temperature range.

The reference temperature range is an average temperature range in the storage chamber when the door is opened.

The controller 253 may compare a door open time with a reference time and, when the door open time exceeds the reference time, may control the image displayed on the transparent display panel 210 to be changed.

For example, the transparent display panel 210 may display an image requesting that the door be closed, and the speaker may output sound requesting that the door be closed.

An example of door opening and closing detection using the infrared sensor and display control of the transparent display panel will be described.

The infrared sensor includes a light emitting unit provided at the main body 110 and a light receiving unit provided in the door 200. When the door is opened, the infrared sensor drives the light emitting unit in response to a command from the controller 253, detects light emitted from the light emitting unit through the light receiving unit, and transmits the detected light to the controller 253. When the door is closed, the light emitting unit is not driven with the result that light is not detected.

The amount of light detected by the light receiving unit decreases as the distance between the door 200 and the main body 110 is increased as the result of opening of the door 200 and increases as the distance between the door 200 and the main body 110 is decreased as the result of closing the door 200. That is, a door opening angle may be estimated based on the amount of light. Also, a door open time may be estimated based on a light amount detection time.

The controller 253 confirms a door opening angle based on the amount of light detected by the infrared sensor and determines whether the door opening angle exceeds a reference angle. When the door opening angle exceeds the reference angle, the controller 253 controls an image displayed on the transparent display panel 210 to be reversed.

Also, the controller 253 counts a door open time based on a light detection time. When the counted door open time exceeds a reference time, the controller 253 controls the image displayed on the transparent display panel 210 to be changed. The changed image requests that the door be closed.

An example of door opening and closing detection using the ultrasonic sensor and display control of the transparent display panel will be described.

The ultrasonic sensor includes an oscillation unit provided in the main body 110 and a receiving unit provided in the door 200. When the door is opened, the ultrasonic sensor drives the oscillation unit in response to a command from the controller 253, detects ultrasonic waves oscillated from the oscillation unit through the receiving unit, and transmits the detected ultrasonic waves to the controller 253. When the door is closed, the oscillation unit is not driven with the result that ultrasonic waves are not detected.

Arrival time of ultrasonic waves detected by the receiving unit increases as the distance between the door 200 and the main body 110 is increased as the result of opening of the door 200 and decreases as the distance between the door 200 and the main body 110 is decreased as the result of closing the door 200. That is, a door opening angle may be estimated based on the arrival time of ultrasonic waves. Also, a door open time may be estimated based on determination as to whether ultrasonic waves are detected.

The controller 253 compares an ultrasonic wave oscillation time with a detection time to calculate an ultrasonic wave arrival time, confirms a door opening angle based on the calculated ultrasonic wave arrival time and determines whether the door opening angle exceeds a reference angle. When the door opening angle exceeds the reference angle, the controller 253 controls an image displayed on the transparent display panel 210 to be reversed.

Also, the controller 253 counts a door open time based on determination as to whether ultrasonic waves are detected. When the counted door open time exceeds a reference time, the controller 253 controls the image displayed on the transparent display panel 210 to be changed. The changed image requests that the door be closed.

An example of door opening and closing detection using the hall sensor and display control of the transparent display panel will be described.

The hall sensor 191 detects voltage generated based on the intensity of a magnetic field. The hall sensor is provided in the main body 110 around the hinge 230. When a drive command is transmitted from the controller 253 when the door is opened, the hall sensor 191 detects voltage generated by protrusions 231 to 235 of the hinge 230 and transmits the detected voltage to the controller 253.

Figure 11A:
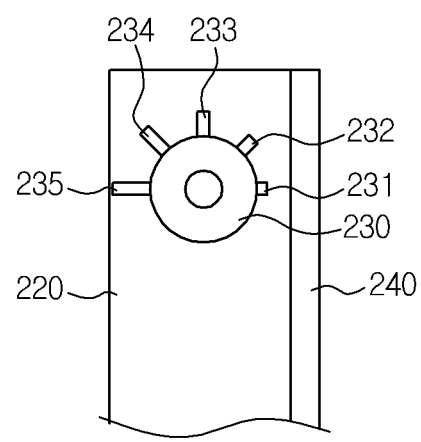
FIGS. 11A to 11C are views illustrating prediction of door opening angles of a showcase according to another exemplary embodiment of the present invention.

As shown in FIG. 11(a), the hinge 230 includes a plurality of protrusions 231 to 235. The protrusions 231 to 235 have different sizes.

When the door is opened, the hinge fixed to the frame of the door is rotated. At this time, the protrusions of the hinge are also rotated.

That is, the protrusions adjacent to the hall sensor 191 are changed as the door 200 is rotated. At this time, the distances between the respective protrusions and the hall sensor 191 differ with the result that different voltages for the respective protrusions are detected by the hall sensor.

At this time, the hall sensor detects voltage proportional to the intensity of a magnetic field generated at each protrusion and transmits the detected voltage to the controller 253.

When the door 200 is formed so as to be rotated in the clockwise direction and the protrusions 231 to 235 of the hinge 230 are formed so that the size of the protrusions 231 to 235 decreases in the clockwise direction, as shown in FIG. 11(a), the size of the protrusions facing the hall sensor 191 provided in the main body 110 gradually increases as the opening angle of the door 200 is increased. At this time, the distance between the hall sensor 191 and the protrusion is decreased with the result that the intensity of a magnetic field is increased, and therefore, voltage is also increased.

Figure 11B:
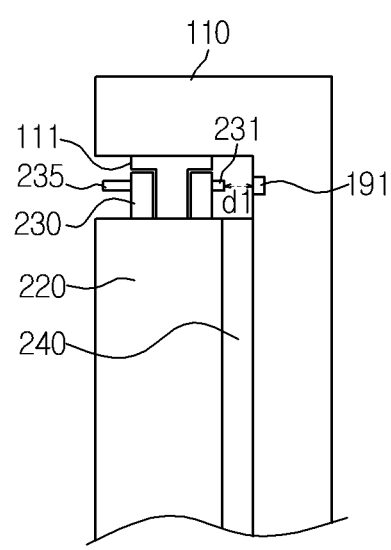
Figure 11C:
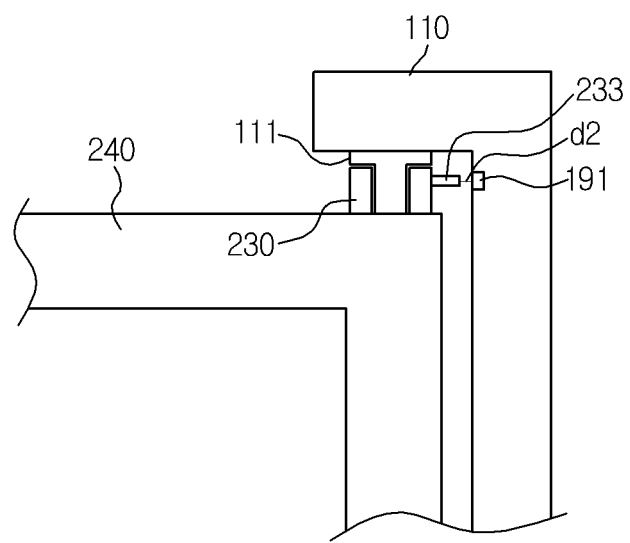

FIG. 11(b) illustrates the distance d1 between the hall sensor 191 and the protrusion 231 when the door is closed, and FIG. 11(c) illustrates the distance d2 between the hall sensor 191 and the protrusion 233 when the door is opened 135 degrees. That is, the distance between the hall sensor and the protrusion is decreased when the door is opened.

The controller 253 confirms a door opening angle corresponding to the voltage detected by the hall sensor 191 based on the voltage for each protrusion pre-stored in the controller 253 and estimates a door open time based on the detected voltage.

The controller 253 compares a door opening angle with a reference angle. When the door opening angle exceeds the reference angle, the controller 253 controls an image displayed on the transparent display panel 210 to be reversed.

Also, the controller 253 determines whether the door is closed based on the detected voltage. Upon determining that the door is closed, the controller 253 controls the hall sensor 191 not to be driven. When the door is opened, the controller 253 counts a door open time. When the counted door open time exceeds a reference time, the controller 253 controls an image displayed on the transparent display panel 210 to be changed. The changed image requests that the door be closed.

When the door is closed, the micro switch is turned on. When the door is opened, the micro switch is turned off.

That is, an off signal is transmitted from the micro switch, the controller 253 determines that the door is opened and counts an off time of the micro switch to estimate a door open time.

When the door is opened, the controller 253 controls an image displayed on the transparent display panel 210 to be reversed and compares the door open time with a reference time. When the door open time exceeds the reference time, the controller 253 controls an image requesting that the door be closed to be displayed.

Figure 12:
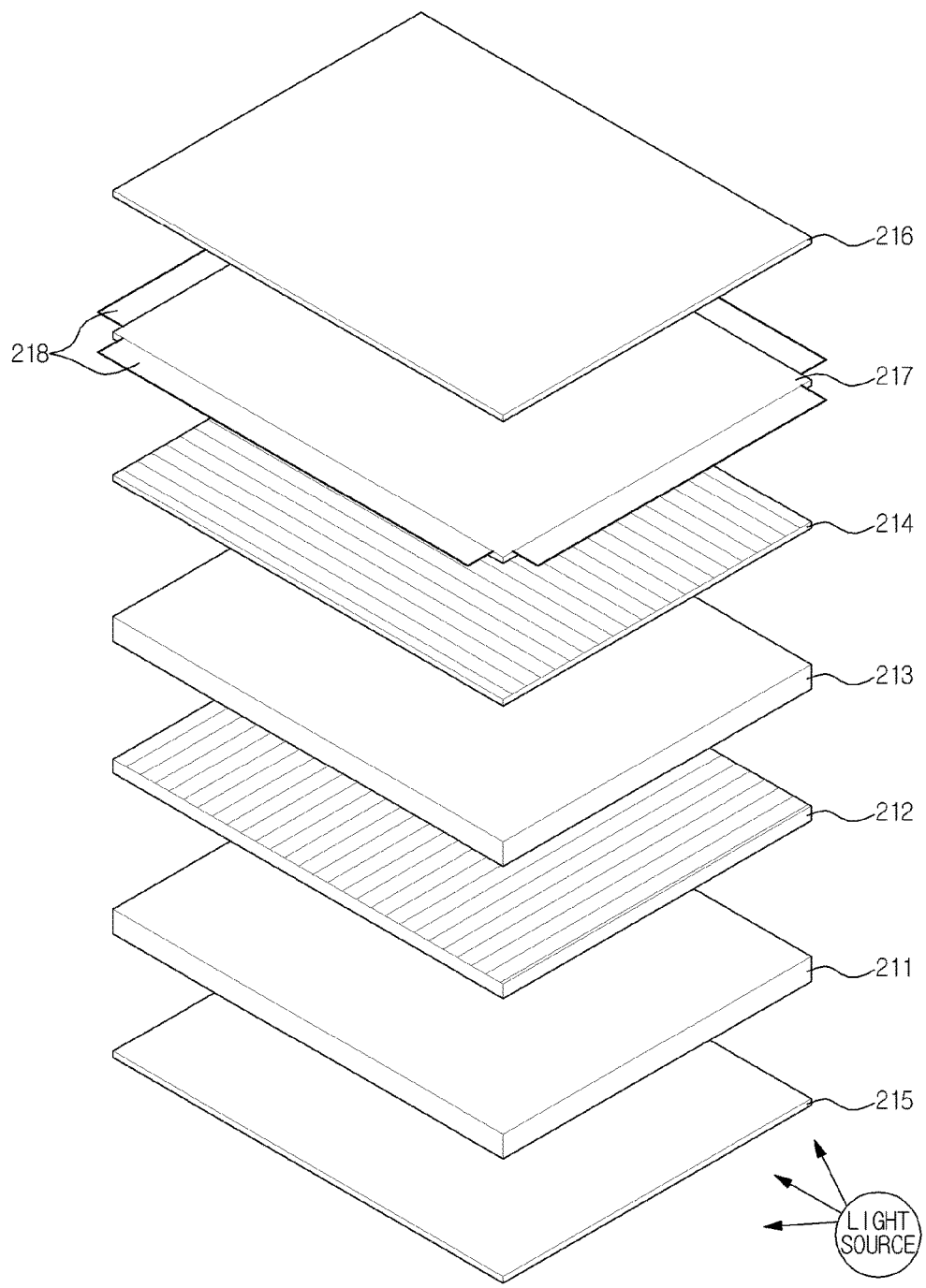
FIG. 12 is a view illustrating the structure of a touch display panel provided in a display system according to another exemplary embodiment of the present invention.

FIG. 12 is a view illustrating the structure of a transparent display panel of a display module provided in a display system according to another exemplary embodiment of the present invention. In this exemplary embodiment, a showcase further includes a transparent touch display panel unlike the showcase according to the previous exemplary embodiment.

The transparent touch display panel is a combination of a transparent display panel and a touch panel. The transparent touch display panel includes a light source, a light guide plate 211, a first polarizing plate 212, a liquid crystal panel 213, a second polarizing plate 214, a first sheet 215, a second sheet 216, a touch panel 217 and light emitting element and light receiving element arrays 218.

Components of the showcase according to this exemplary embodiment are identical to those of the showcase according to the previous exemplary embodiment excluding the transparent touch display panel and a drive module, and therefore, a description thereof will be omitted.

The light source, the light guide plate 211, the first polarizing plate 212, the liquid crystal panel 213 and the second polarizing plate 214 of the transparent touch display panel 210 shown in FIG. 12 are identical to those shown in FIG. 7, and therefore, a description thereof will be omitted.

The first sheet 215 is a heat insulation sheet provided at the side of the transparent touch display panel 210 adjacent to the storage chamber 120, i.e. one side of the light guide plate 211. The first sheet 215 prevents temperature in the storage chamber 120 from being increased by heat generated during driving of the transparent touch display panel 210.

The second sheet 216 is an anti-reflective coating film provided at the exposed side of the transparent touch display panel 210, i.e. one side of the touch panel 217. The second sheet 216 prevents light from being reflected so that the interior of the storage chamber 120 and an image on the transparent display panel 210 are easily visible from the side of the showcase even on a bright day.

The touch panel 217 may include a resistive touch panel, a capacitive touch panel, an ultrasonic touch panel and an infrared touch panel. In this exemplary embodiment, an infrared touch panel will be described.

The touch panel 217 is transparent. The touch panel 217 transmits an image displayed on the liquid crystal panel. Consequently, a person may view the image displayed on the liquid crystal panel through the touch panel 217.

The touch panel 217 is flexible. When a finger of a person or an input unit, such as a pen, contacts the touch panel 217, therefore, the touch panel 217 may be flexibly depressed.

The touch panel 217 is hexahedral. The light emitting element and light receiving element arrays 218 are provided at sides of the touch panel.

One of the light emitting element arrays is disposed in the X-axis direction, and the other light emitting element array is disposed in the Y-axis direction. One of the light receiving element arrays is disposed in the X-axis direction, and the other light receiving element array is disposed in the Y-axis direction.

Each of the light emitting element arrays includes a plurality of light emitting elements, which emits light in response to a command from a light drive part of a touch drive unit 257. Each of the light receiving element arrays includes a plurality of light receiving elements, which transmits a light receiving signal to a position detection part of the touch drive unit 257.

When a hand of a person or an input unit, such as a pen, contacts a certain point of the touch panel 217, light passing through the touch panel 217 is blocked at at least one light emitting element of the light emitting element arrays, and at least one light receiving element corresponding to the at least one light emitting element does not detect light. That is, the light receiving elements, having detected light, output a light detection signal to the position detection part of the touch drive unit 257, and the light receiving elements, having not detected light, output a light non-detection signal to the position detection part of the touch drive unit 257.

The touch panel 217 may be a multi-touch panel.

Figure 13:
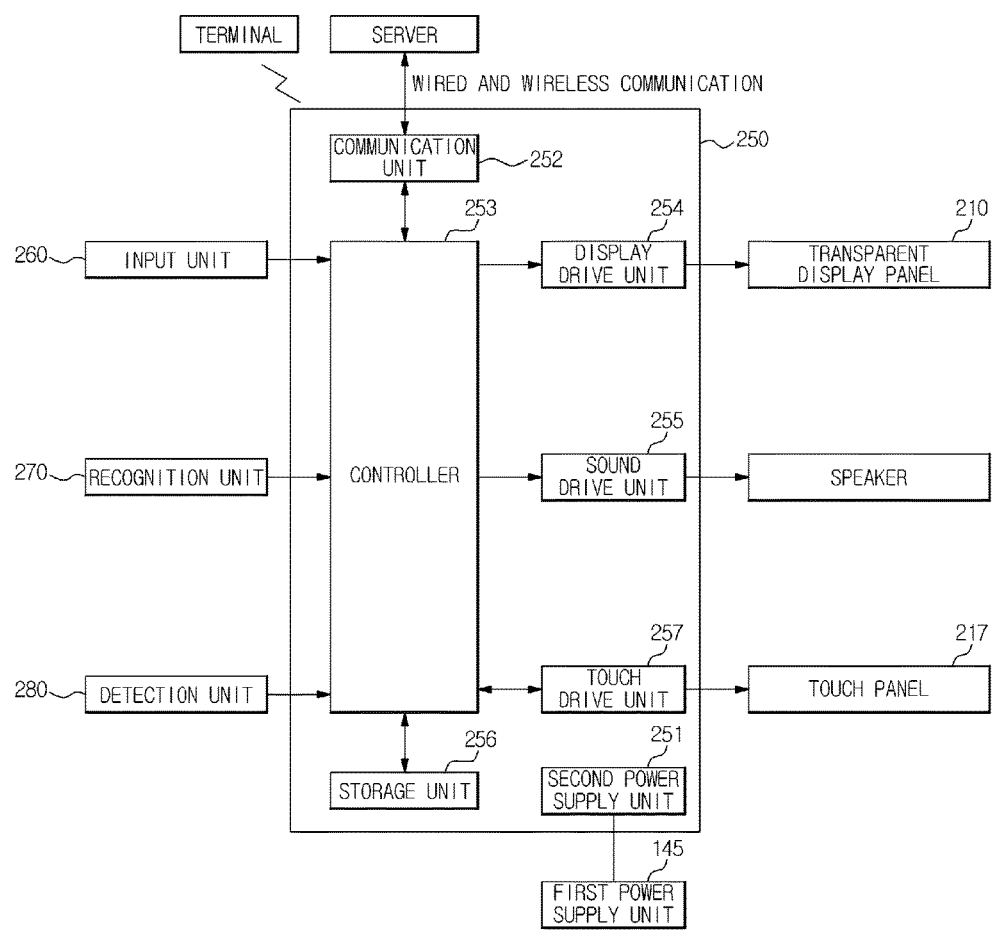
FIG. 13 is a control block diagram of a display system according to another exemplary embodiment of the present invention.

FIG. 13 is a control block diagram of a display system according to another exemplary embodiment of the present invention. The display system includes a second power supply unit 251, a communication unit 252, a controller 253, a display drive unit 254, a sound drive unit 255, a storage unit 256, a touch drive unit 257, an input unit 260, a recognition unit 270 and a detection unit 280.

The second power supply unit 251, the communication unit 252, the controller 253, the display drive unit 254, the sound drive unit 255, the storage unit 256 and the touch drive unit 257 may be provided in a drive module.

The input unit 260, the recognition unit 270 and the detection unit 280 may also be provided in the drive module 250. Alternatively, the input unit 260, the recognition unit 270 and the detection unit 280 may be provided in a frame and may then be electrically connected to the controller 253 of the drive module 250.

The second power supply unit 251 is connected to the first power supply unit 145 of the main body 110 via the first cable C1 to receive power from the first power supply unit 145, to covert the received power into drive power to be used by components and to supply the converted power to the communication unit 252, the controller 253, the display drive unit 254, the sound drive unit 255, the storage unit 256, the touch drive unit 257, the input unit 260, the recognition unit 270 and the detection unit 280.

The second power supply unit 251 performs AC/DC conversion and DC/DC conversion.

The communication unit 252 communicates with a server or a terminal, such as a smart phone, receives image data and/or sound data from the server or the terminal and transmits the received data to the controller 253. The communication unit 252 performs wired and/or wireless communication.

In addition, the server communicates with the communication unit 252 through wired and/or wireless communication. The terminal communicates with the communication unit 252 through wireless communication, such as WiFi or Bluetooth.

The controller 253 processes data received by the communication unit 252 and outputs a drive command corresponding to the processed data to the display drive unit 254. At this time, the controller 253 receives data in a predetermined format and decodes the received data.

Also, the controller 253 processes data stored in the storage unit 256 and outputs a drive command corresponding to the processed data to the display drive unit 254.

The controller 253 controls driving of the display drive unit 254 based on the position of a touch point detected by the position detection part of the touch drive unit 257.

The controller 253 may control driving of the display drive unit 254 based on position information of multi-touch points transmitted from the position detection part.

More specifically, when position information of the touch point is transmitted, the controller 253 confirms the currently displayed image information, confirms a button present at the position of the touch point among buttons included in the confirmed image, and controls a sub image corresponding to the confirmed button to be displayed or performs a function corresponding to the confirmed button.

For example, when an advertisement image having a detailed view button (not shown) and a mode change button is displayed on the transparent touch display panel 210 and a touch point touched by a customer corresponds to the detailed view button, the controller 253 controls image information corresponding to the detailed view button to be displayed.

At this time, the transparent touch display panel displays an image of an advertising object together with the currently displayed advertisement image or converts the currently displayed advertisement image into an image of an advertising object and displays the image of the advertising object.

The image of the advertising object may include price of the advertising object, positions of stores that sell the advertising object, discount information of the advertising object and information regarding the place of origin.

The controller 253 controls a menu button, a mode change button and an update button to be basically displayed irrespective of type of images displayed on the transparent touch display panel.

Alternatively, the controller 253 may control the menu button, the mode change button and the update button not to be displayed on the transparent touch display panel and may control the menu button, the mode change button and the update button to be displayed on the transparent touch display panel when a certain position is touched by a user.

The controller 253 controls basic buttons, such as the menu button, the mode change button and the update button, to be displayed at different positions than a main image so that the menu button, the mode change button and the update button do not overlap the main image.

When the menu button is touched, the controller 253 controls a sub button of the menu to be displayed. When the update button is touched, the controller 253 controls communication with a terminal to update data stored in the current storage unit 256. When the mode change button is touched, the controller 253 controls a mode to be changed from the current mode to another mode.

For example, when the current mode is an advertisement image display mode, the controller 253 controls a mode to be changed from the advertisement image display mode to an article information image display mode.

When the showcase is installed in a large-scale supermarket, the showcase further includes an event information button, a discount coupon button and an information map button as basic buttons displayed on the transparent touch display panel.

When the event information button is touched, the controller 253 controls an event information image to be displayed. When the discount coupon button is touched, the controller 253 controls a discount coupon image to be displayed. When the information map button is touched, the controller 253 controls an information map image related to the surroundings of the showcase to be displayed.

In addition, when the discount coupon image is displayed, a customer may acquire the discount coupon image using his/her terminal and show the coupon stored in the terminal to a salesperson when the customer wishes to buy a corresponding article to get a discount with respect to the corresponding article.

The display drive unit 254 and the sound drive unit 255 are identical in construction to those of the previous exemplary embodiments, and therefore, a description thereof will be omitted.

The storage unit 256 stores image information for each mode and reverse image information of each image, functions of buttons included in a plurality of pieces of image information, positions of buttons for each piece of image information, and positions of the respective light receiving elements of the light receiving element arrays.

The storage unit 256 stores position information of the menu button, the mode change button, the update button, the event information button, the discount coupon button, and the information map button. Also, the storage unit 256 stores a sub image of each button.

The storage unit 256 stores data transmitted from the server or the terminal. At this time, the data may be stored in a compressed file format.

The storage unit 256 stores customer information corresponding to name and identification for each customer. The customer information includes tailored information, such as date of purchase, purchase quantity for each article, purchase content and consumption patterns, identification, customer terminal information and customer personal information. The tailored information is transmitted from the terminal.

The storage unit 256 stores information regarding food stored in the storage chamber 120. The food information includes date of manufacture, expiry date, the place of origin, calories, nutritional information, company name and an advertisement image.

The controller 253 controls driving of the display drive unit 254 and the sound drive unit 255 based on a signal input from the input unit 260, the recognition unit 270 or the detection unit 280.

The touch drive unit includes a light drive part and a position detection part.

The light drive part drives the light emitting element arrays to emit light in response to a command from the controller 253.

The position detection part recognizes light receiving elements having transmitted a light detection signal as 1 and a light receiving element having transmitted a light non-detection signal as 0. The position detection part confirms the position of the light receiving element recognized as 0, detects the position of a touch point and transmits the position of the detected touch point to the controller 253.

The position detection part may be capable of multi-touch detection. That is, when a plurality of points is touched, the position detection part detects positions of the multiple touch points and transmits the positions of the detected multiple touch points to the controller 253.

In addition, the controller 253 may control driving of the transparent touch display panel based on a drive command transmitted from an administrator terminal. A control configuration between the controller 253 and the detection unit 270 of this exemplary embodiment is identical to that of the previous exemplary embodiments, and therefore, a description thereof will be omitted.

A control configuration between the controller 253 and the input unit 260 will be described.

The input unit 260 includes a power mode button (not shown) to turn power on and off. The input unit 260 transmits a button signal input by a user to the controller 253.

A control configuration between the controller 253 and the recognition unit 270 will be described.

The recognition unit includes a tag recognition unit and/or a code recognition unit.

The tag recognition unit is a radio frequency identification (RFID) recognition unit to recognize data stored in RFID tags using radio frequency. The tag recognition unit reads data in a tag (not shown) attached to a customer membership card and transmits the read data to the controller 253.

The code recognition unit may be a bar code recognition unit or a QR code recognition unit. The code recognition unit scans a code provided on food and transmits the scanned data to the controller 253.

The controller 253 confirms name and ID of a customer based on the data of the tag transmitted from the tag recognition unit and controls the display drive unit 254 to display the tailored information of the customer.

More specifically, the controller 253 confirms the name and ID of the customer in the tag and controls an image, such as a welcome message, as well as the name or nickname of the customer to be displayed on the transparent display panel, and controls the display drive unit 254 to display a message asking a question as to whether tailored information is to be displayed and yes and no buttons.

The controller 253 confirms the position of a touch point touched by a customer. When the position of the touch point corresponds to the 'yes' button, the controller 253 controls the tailored information to be displayed. When the position of the touch point corresponds to the 'no' button, the controller 253 controls the tailored information not to be displayed. When the touch point is not recognized within a predetermined time after the question is asked, a corresponding operation is ended.

Also, the controller 253 may communicate with the customer terminal to acquire the name and ID of the customer and control driving of the display drive unit 254 based on the acquired name and ID of the customer.

The code recognition unit recognizes a bar code or a QR code provided on food and transmits the recognized data to the controller 253.

The controller 253 confirms information regarding corresponding food based on the scanned food data and determines whether information regarding the confirmed food is stored in the storage unit 256. When the information regarding the corresponding food is not stored in the storage unit 256, the controller 253 transmits the information regarding the corresponding food to the storage unit 256 so that the information regarding the food is stored in the storage unit 256.

When the information regarding the corresponding food is stored in the storage unit 256, the controller 253 controls the display drive unit to display a message asking a question as to whether information regarding the corresponding food is to be updated and yes and no buttons.

The controller 253 confirms the position of a touch point touched by an administrator. When the position of the touch point corresponds to the 'yes' button, the controller 253 updates information regarding the corresponding food stored in the storage unit 256. When the position of the touch point corresponds to the 'no' button, the controller 253 maintains information regarding the corresponding food stored in the storage unit 256. When the touch point is not recognized within a predetermined time after the question is asked, the controller 253 updates information regarding the corresponding food stored in the storage unit 256.

When additional food is placed in the showcase, information regarding the additionally placed food is updated using the code recognition unit, thereby potentially allowing the managing of information regarding food placed in the showcase.

Also, the controller 253 determines whether an advertisement image of corresponding food is stored in the storage unit 256 based on the scanned data of the food. When the advertisement image of the corresponding food is stored in the storage unit 256, the controller 253 controls the advertisement image of the corresponding food to be displayed.

Also, the controller 253 may determine whether image information of corresponding food is present in the scanned data of the food. When the image information of the corresponding food is present in the scanned data of the food, the controller 253 may control the image information to be displayed as an advertisement image of the corresponding food.

In addition, when a human body detection signal is transmitted, the controller 253 may control the supply of drive power to the light emitting element arrays and the light receiving element arrays of the touch panel.

Figure 14:
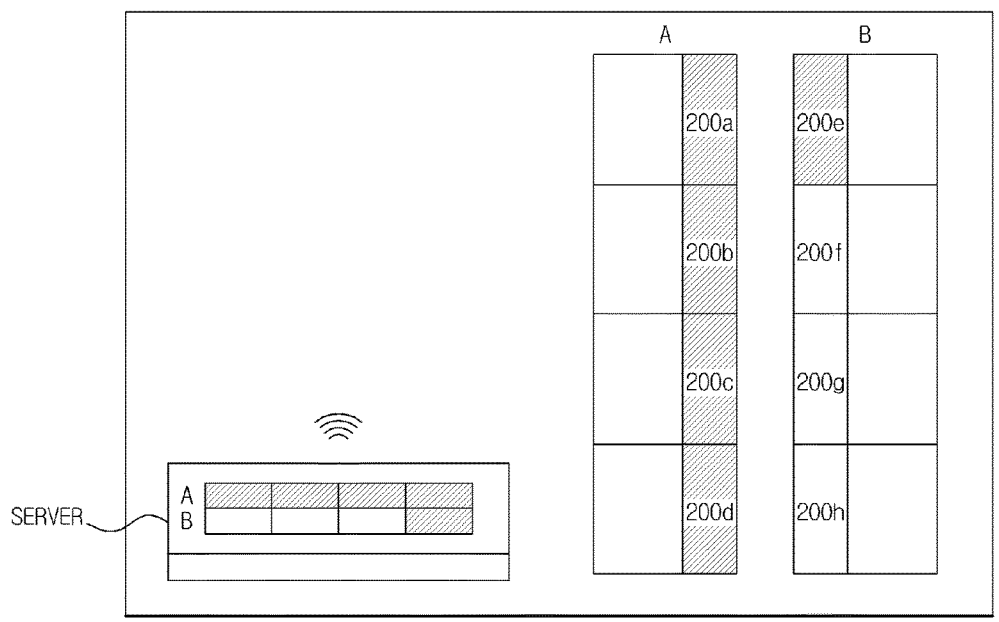
FIG. 14 is a view illustrating multi display performance of a display system according to another exemplary embodiment of the present invention.

FIG. 14 is a view illustrating a display system according to another exemplary embodiment of the present invention.

In this exemplary embodiment, the display system includes a plurality of system bodies and a display module mounted in each of the system bodies.

The display modules 200a to 200h are divided into a plurality of groups A and B. That is, each of the groups includes a plurality of display modules.

Specifically, group A includes the display modules 200a to 200d and group B includes the display modules 200e to 200h.

The display modules receive commands from a server or a terminal and display images in a multi display performance mode for each group based on the received commands. Some of the display modules may display images in the multi display performance mode and the remainder of the display modules may display an image in a single display performance mode.

Images are displayed in the multi display performance mode using the display modules, thereby potentially providing a large-scale display.

The display modules mounted in the showcases may display video when displaying images in the multi display performance mode.

Alternatively, all the display modules may display an image in the single display performance mode.

The server includes an input unit, a controller, a display unit, a storage unit and a communication unit. The server may include a computing device.

The input unit allows one of the groups to be selected. Also, the input unit allows the display module provided in at least one of the showcases provided in one of the groups to be selected.

That is, one display module is selected for single display performance and at least two display modules are selected for multi display performance.

The input unit allows a user to select an image to be displayed.

Also, the input unit allows the user to select display condition information for each image, such as display start time, display end time and display duration.

The input unit may include an input device, such as a keyboard and a mouse.

The controller stores data input by the user and/or data transmitted from the outside, processes data to be transmitted to at least one of the display modules, distributes the processed data, and transmits the distributed data to the display modules.

The controller may transmit the same data to the display modules so that the same image is displayed on all of the display modules. Alternatively, the controller may transmit different data to the display modules so that different images are displayed on the display modules.

Also, the controller may transmit the same data to some of the display modules and different data to some of the display modules.

Also, the controller may control multi display performance through the display modules.

When a single display command is input to the showcase, the controller transmits the single display command to the corresponding display module. At this time, the controller transmits image information selected by a user to the corresponding display module. The image information includes an image to be displayed and display condition information, such as display start time, display end time and display duration.

When a multi display command of the display modules of the showcases is input, the controller transmits the multi display command to the display modules. Image information includes divided images and display condition information, such as display start time, display end time and display duration.

More specifically, the controller divides an image selected by a user so as to correspond to the number of the display modules and transmits the divided images to the showcases considering the sequence of the divided images and arrangement order of the display modules.

For example, when the display modules 200b and 200c of group A display '13' in the multi display performance mode, the left display module 200b displays '1' and the right display module 200c displays '3'. Consequently, '13' are displayed through the display modules 200b and 200c in the multi display performance mode.

The display unit displays the display modules for each group disposed at a plurality of regions and arrangement information of the display modules for each group. The display modules performing display are distinguished from the display modules not performing display.

Also, the display unit simulates an image to be displayed on the showcase during single or multi display performance.

The storage unit stores display module information for each region, group information for each display module and various image information.

The communication unit communicates with the showcases through wired and/or wireless communication. The communication unit transmits various information or a drive command to the showcases in response to a command from the controller.

Figure 15:
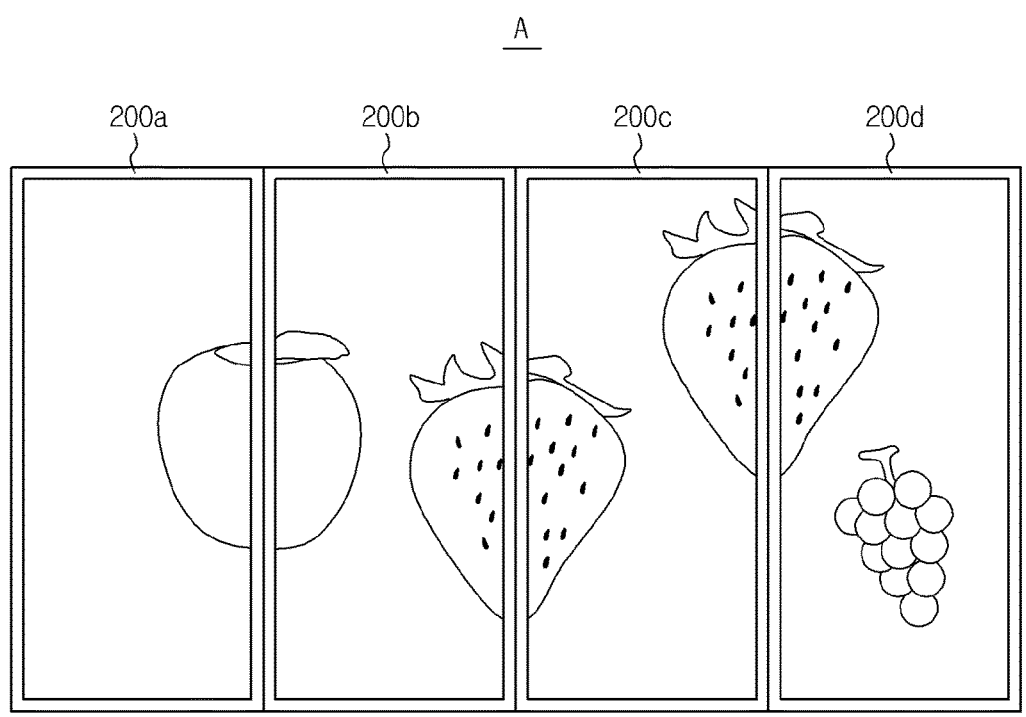
FIG. 15 is a view illustrating multi display performance of a display system according to another exemplary embodiment of the present invention.

FIG. 15 is a view illustrating multi display performance. Advertisement images are displayed through four display modules 200a, 200b, 200c and 200d included in group A in the multi display performance mode.

At this time, the showcases displaying images in the multi display performance mode do not reverse the images when the doors are opened.

In this way, the images are displayed in the multi display performance mode through the display modules having transparent display panels adjacent to each other, thereby providing a potentially aesthetically pleasing appearance and drawing customer's attention. As a result, an advertisement effect is improved.

Figure 16:
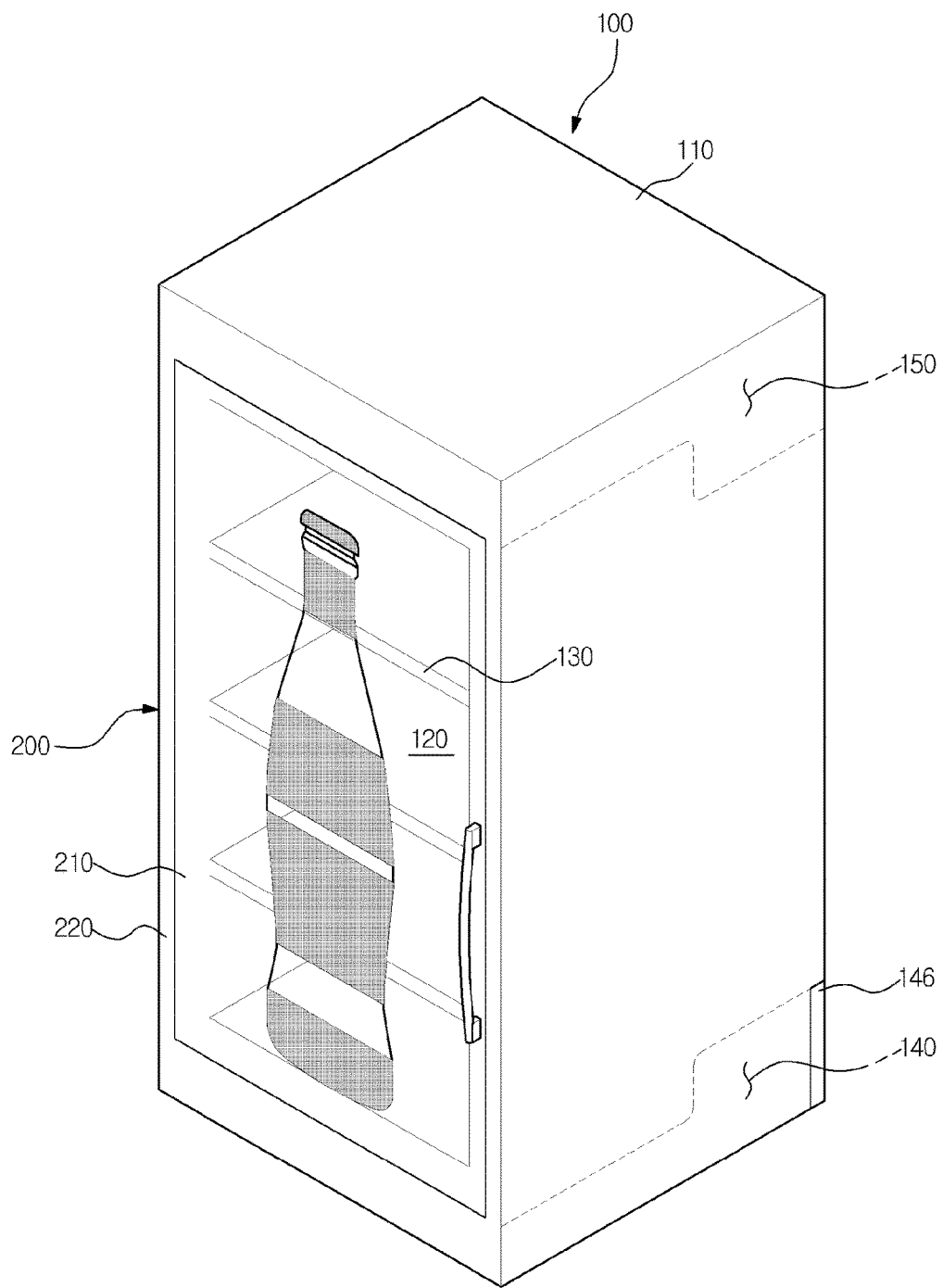
FIG. 16 is a perspective view of a display system according to another exemplary embodiment of the present invention.

FIG. 16 is a perspective view of a display system according to another exemplary embodiment of the present invention.

In the display system according to this exemplary embodiment, a showcase, as a system body, includes a main body 110, a storage chamber 120, shelves 130, a machine compartment 140 and a cool air generating compartment 150. Components of the showcase according to this exemplary embodiment are identical in construction to those of the previous exemplary embodiment excluding the machine compartment and the cool air generating compartment, and therefore, a description thereof will be omitted.

The main body 110 forms the external appearance of the showcase. The storage chamber 120 is defined in the main body 110. An opening 113 is formed at the front of the main body 110. The machine compartment 140 and the cool air generating compartment 150 are disposed at the rear of the main body 110. In addition, a cover 146 to cover the machine compartment is mounted at the rear of the main body 110.

Since the machine compartment 140 and the cool air generating compartment 150 are disposed at the rear of the main body 110, the size of the opening 113 formed at the front of the main body 110 is maximized.

A door 200, as a display module, has a size equivalent to the front opening 113 of the main body 110. The door 200 is hingedly mounted at the front opening 113 to isolate the storage chamber 120 from the outside, thereby potentially preventing leakage of cool air from the storage chamber 120.

The door 200 is wholly formed at the front of the showcase. Alternatively, as in the previous exemplary embodiment, the door may be partially formed at the front of the showcase. The whole front of the showcase has a size excluding the external structure constituting the main body.

Also, a transparent display panel may be wholly or partially mounted in a frame 220.

Figure 17:
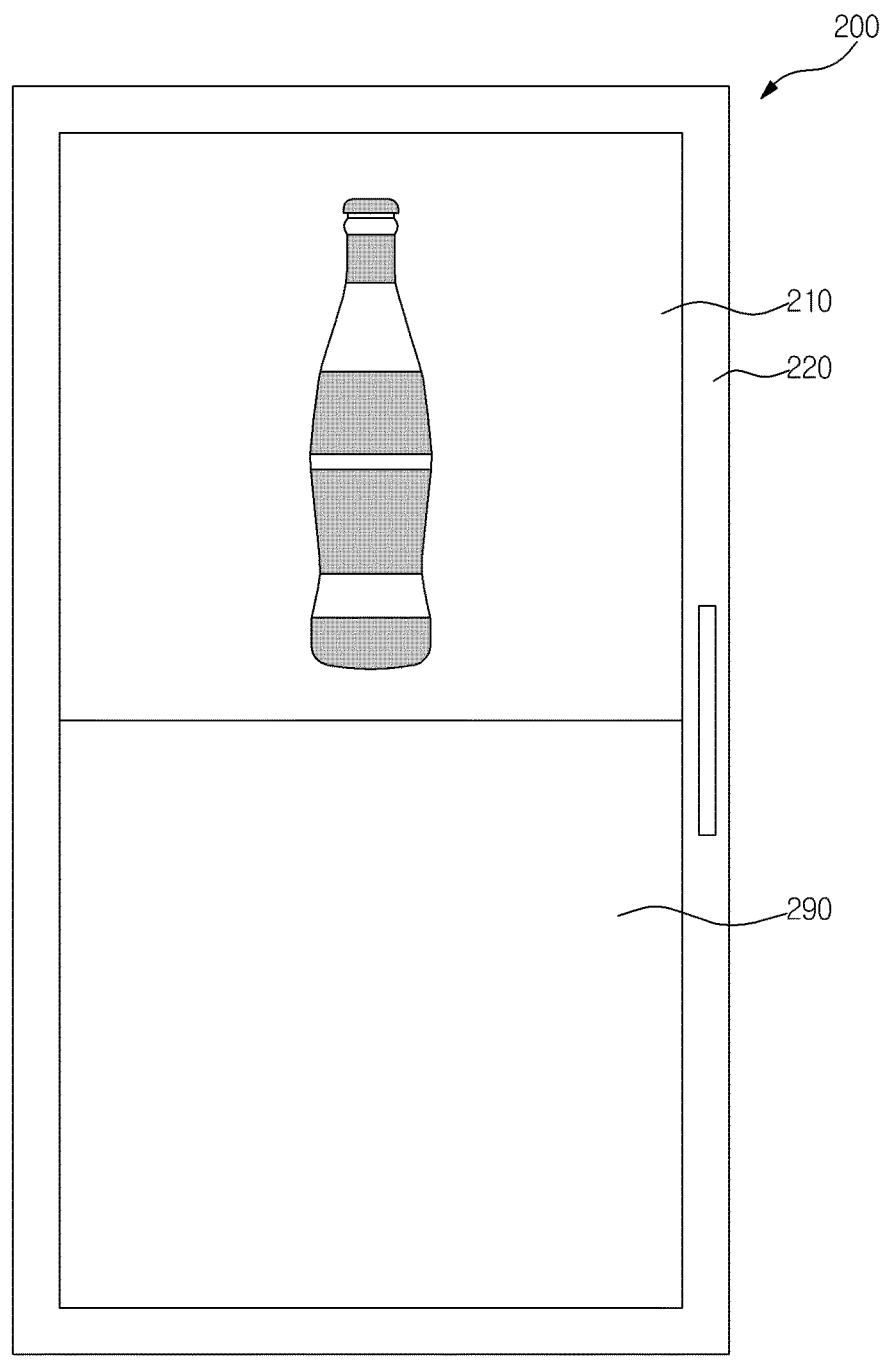
FIG. 17 is a view illustrating installation of a display module of the display system according to the exemplary embodiment of the present invention.

As shown in FIG. 17, the transparent display panel 210 may be partially mounted in the frame 220. In this case, the transparent display panel 210 is mounted in a portion of the frame 220, and a transparent member 290, such as transparent glass or transparent plastic, is mounted in the remaining portion of the frame 220. Consequently, the size of the transparent display panel 210 is reduced, thereby potentially reducing manufacturing cost of the showcase and providing an advertisement effect through the transparent display panel 210.

Figure 18:
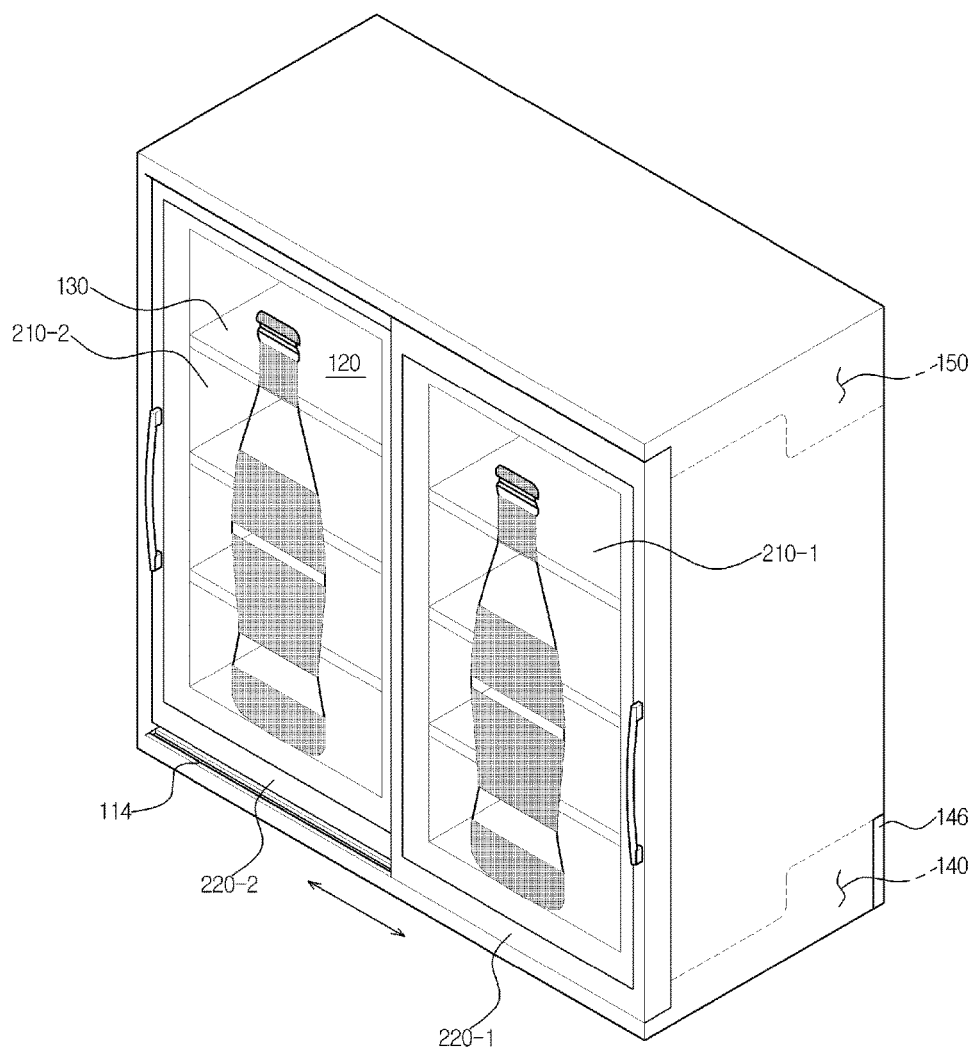
FIGS. 18 and 19 are perspective views of a display system according to another exemplary embodiment of the present invention.
Figure 19:
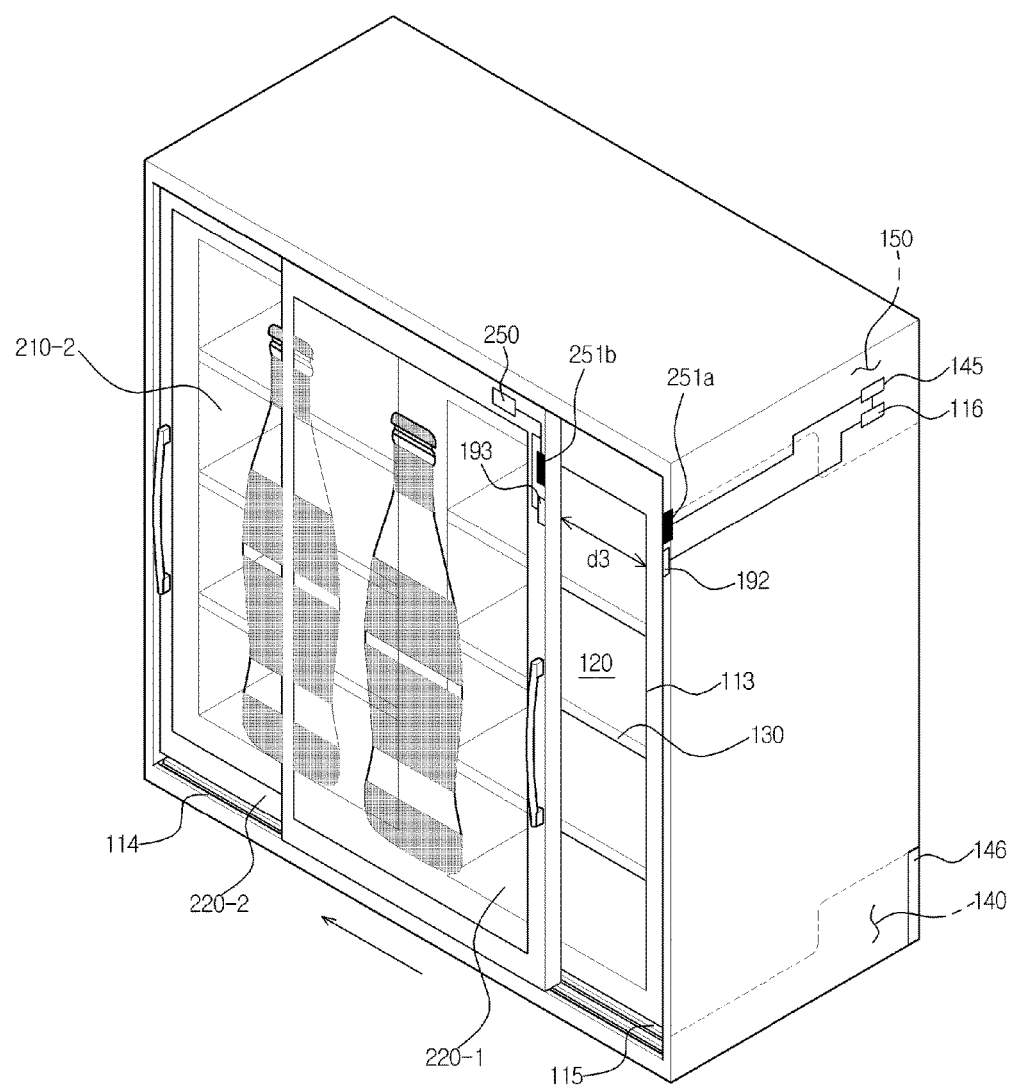

FIGS. 18 and 19 are perspective views of a display system according to another exemplary embodiment of the present invention. The display system includes a showcase, as a system body, and a plurality of doors, as display modules.

In the display system according to this exemplary embodiment, the showcase, as the system body, includes a main body 110, a storage chamber 120, shelves 130, a machine compartment 140 and a cool air generating compartment 150. Components of the showcase according to this exemplary embodiment are identical in construction to those of the previous exemplary embodiment excluding the storage chamber, the machine compartment and the cool air generating compartment, and therefore, a description thereof will be omitted.

The main body 110 forms the external appearance of the showcase. The storage chamber 120 is defined in the main body 110. An opening 113 is formed at the front of the main body 110. The machine compartment 140 and the cool air generating compartment 150 are disposed at the rear of the main body 110.

Rails 114 and 115 are formed at the upper and lower ends of the front of the main body 110. A cover to cover the machine compartment 140 is mounted at the rear of the main body 110.

In addition, the main body 110 further includes a control board 116 to control a refrigeration cycle of the showcase. The control board 116 may determine a charged state of a second power supply unit in a drive module 250 and control the second power supply unit not to be charged upon determining that the second power supply unit is fully charged.

The main body 110 is provided with a first charging terminal 251a to supply power to the second power supply unit in the drive module.

The doors 200, as the display modules, include two doors 200-1 and 200-2. The two doors 200-1 and 200-2 are slidably mounted at the main body 110 to open and close the storage chamber 120.

The doors 200-1 and 200-2 are mounted on the rails 114 and 115 in the front opening 113 of the main body 110 so that the doors 200-1 and 200-2 are slid from side to side along the rails 114 and 115.

That is, the two doors 200-1 and 200-2 isolate the storage chamber 120 from the outside, thereby potentially preventing leakage of cool air from the storage chamber 120. Two or more doors may be provided.

The doors 200-1 and 200-2 include transparent display panels 210-1 and 210-2 and frames 220-1 and 220-2 to fix the transparent display panels 210-1 and 210-2, respectively.

The frames 220-1 and 220-2 constitute edges of the respective doors.

In each of the frames 220-1 and 220-2 is mounted the drive module 250 to supply drive power to components and control an image to be displayed on the transparent display panel.

The second power supply unit provided in the drive module 250 may be rechargeable. The second power supply unit includes a battery.

The battery has a second charging terminal 251b contacting the first charging terminal 251a provided in the main body 110 to receive power from a first power supply unit 145 of the main body 110.

That is, when the door is closed, the second power supply unit provided in the drive module 250 comes into contact with the first charging terminal 251a provided in the main body 110 to receive power from the first power supply unit 145 of the main body 110, converts the received power into drive power to be used by components of the display module and supplies the converted power to the respective components of the display module.

When the door is opened, the second power supply unit provided in the drive module 250 is separated from the first charging terminal 251a of the main body 110 so that the second power supply unit is not charged, converts power stored therein into drive power to be used by the respective components of the display module and supplies the converted power to the respective components of the display module.

Power may be supplied from the first power supply unit 145 of the main body 110 using a cable provided in the frame 220-1.

A controller in the drive module 250 receives drive power from the second power supply unit and controls driving of the transparent display panel 210 based on image information stored in the storage unit or image information received through a communication unit.

The controller in the drive module 250 may control multi display performance or single display performance through the transparent display panels 210-1 and 210-2.

In addition, the display system further includes door opening and closing detection units 192 and 193.

Hereinafter, one of the doors, i.e. the door 200-1, will be described in detail as an example.

The main body 110 and the frame 220-1 include the door opening and closing detection units 192 and 193, respectively. The control board 116 of the main body 110 controls driving of the door opening and closing detection unit 192.

The door opening and closing detection unit may include a temperature sensor, an infrared sensor, an ultrasonic sensor, a hall sensor or a micro switch.

An example of door opening and closing detection using the infrared sensor will be described.

The infrared sensor includes a light emitting unit 192 provided at the main body 110 and a light receiving unit 193 provided in the door 200-1. The infrared sensor drives the light emitting unit 192 in response to a command from the control board 116 of the main body, detects light emitted from the light emitting unit 192 through the light receiving unit 193, and transmits the detected light to the controller 253.

The amount of light detected by the light receiving unit 193 decreases as the distance between the door 200-1 and the main body 110 is increased as the result of opening of the door 200-1 and increases as the distance between the door 200-1 and the main body 110 is decreased as the result of closing the door 200-1. That is, a door opening angle may be estimated based on the amount of light. Also, a door open time may be estimated based on a light amount detection time.

The controller in the drive module 250 confirms a door open degree based on the amount of light detected by the light receiving unit 193 of the infrared sensor and determines whether the door opening angle exceeds a reference open degree. When the door open degree exceeds the reference degree, the controller controls an information message indicating that the leakage amount of cool air is large, and therefore, the door must be closed to be displayed on the transparent display panel 210.

Also, the controller in the drive module 250 counts a door open time based on a light detection time. When the counted door open time exceeds a reference time, the controller 253 controls the image displayed on the transparent display panel 210 to be changed. The changed image requests that the door be closed.

An example of door opening and closing detection using the hall sensor will be described.

Protrusions of different lengths are formed at the main body 110, and the hall sensor is mounted in the door so that the hall sensor faces different protrusions as the door is slid. That is, the hall sensor detects the intensity of a magnetic field of the protrusions which the hall sensor faces during sliding of the door, converts the detected intensity of the magnetic field into voltage, and transmits the converted voltage to the controller 253.

At this time, the controller in the drive module 250 confirms opening of the door based on the voltage detected by the hall sensor and counts a door open time. When the counted door open time exceeds a reference time, the controller controls the image displayed on the transparent display panel 210 to be changed. The changed image requests that the door be closed.

Alternatively, the controller in the drive module 250 may estimate a door open degree based on the voltage detected by the hall sensor, estimate the leakage amount of cool air corresponding to the door open degree and display how freshness of food in the storage chamber is affected by the estimated leakage amount of cool air. Also, the controller in the drive module 250 may display power consumption due to leakage of cool air.

An example of door opening and closing detection using the micro switch (not shown) will now be described.

When the door is closed, the micro switch is turned on. When the door is opened, the micro switch is turned off.

That is, an off signal is transmitted from the micro switch, the controller in the drive module 250 determines that the door is opened and counts an off time of the micro switch to estimate a door open time.

The controller in the drive module 250 compares the door open time with a reference time. When the door open time exceeds the reference time, the controller 253 controls an image requesting that the door be closed to be output.

FIGS. 20 to 34 are views illustrating display modules according to other exemplary embodiments of the present invention.

The display modules are installed in indoor and outdoor structures to provide aesthetically pleasing indoor and outdoor environments and to provide various information to people. The display modules may include a television, a bus shelter, an information drive module, a show window, a window, a mural and a floor mat.

Figure 20:
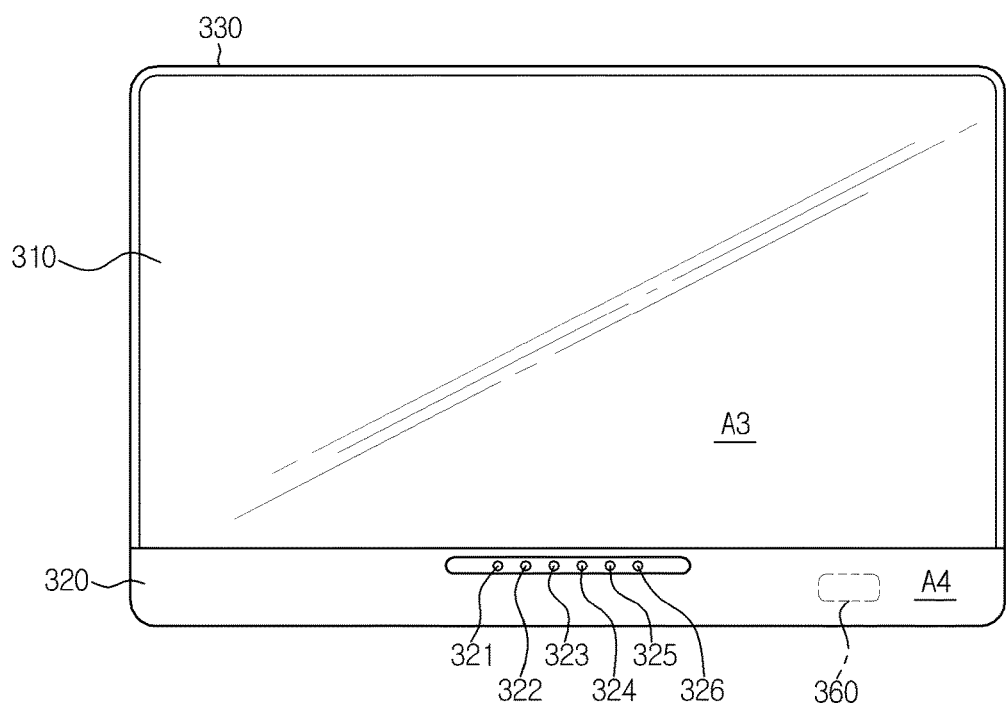
FIG. 20 is a front perspective view of a television, as a display module, according to another exemplary embodiment of the present invention.
Figure 21:
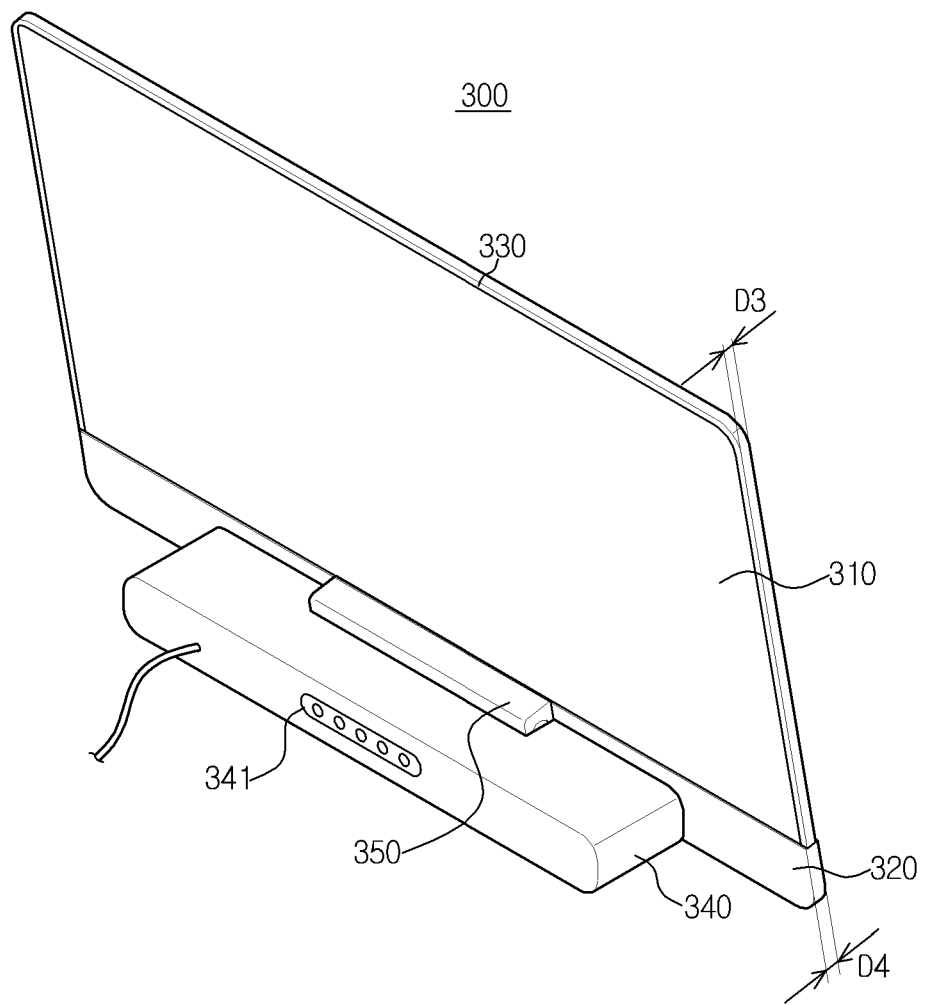
FIG. 21 is a rear perspective view of the television according to the exemplary embodiment of the present invention.
Figure 22:
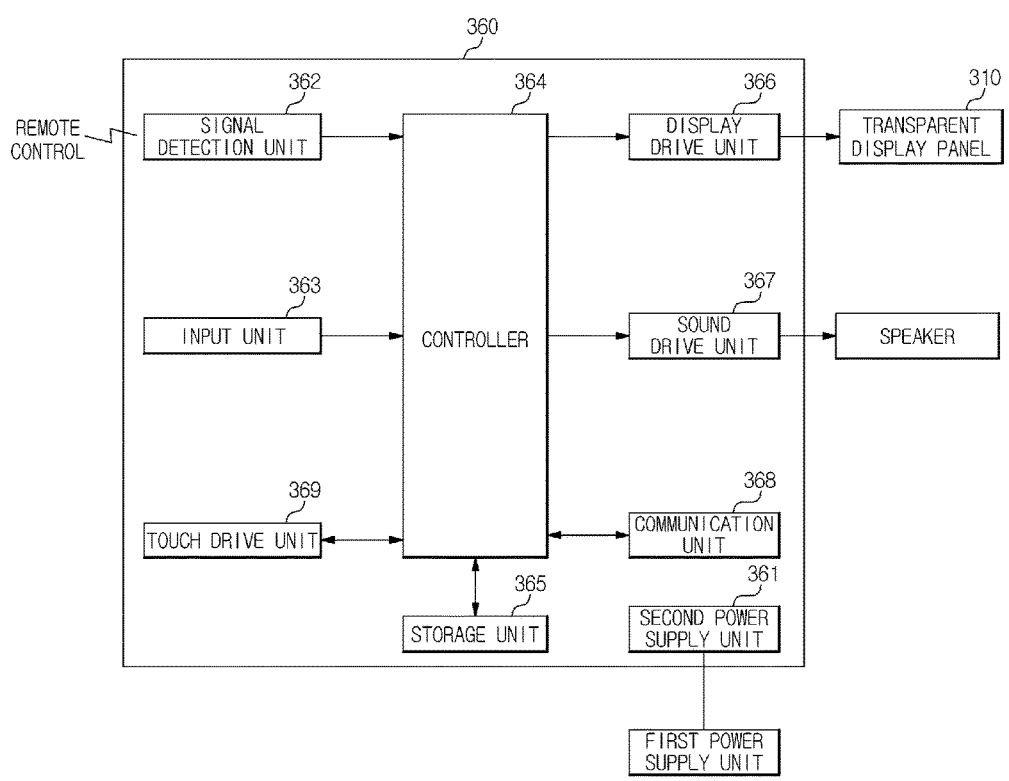
FIG. 22 is a control block diagram of the television according to the exemplary embodiment of the present invention.

FIG. 20 is a front perspective view of a television, as a display module, according to another exemplary embodiment of the present invention, FIG. 21 is a rear perspective view of the television according to the exemplary embodiment of the present invention, and FIG. 22 is a control block diagram of the television according to the exemplary embodiment of the present invention.

A television 300 is installed in a house or a public place by a mount holder to receive an analog broadcasting signal transmitted from broadcasting stations, to convert the received broadcasting signal into a digital signal, thereby allowing the reproducing of an image and sound. The mount holder may be of a wall type, a ceiling type or a table type.

The television may perform two-way communication.

The television 300 requests content from a content server (not shown) through the Internet, receives requested content from the content server and reproduces the received content, thereby potentially providing various Internet services.

That is, the television provides various content and supplementary services, such as audio on demand (AOD), video on demand (VOD), multicast, local music file playback, Internet browsing using a remote control, home shopping, home banking and online games, through the Internet. In addition, the television provides a broadcast desired by a user at time desired by the user unlike general over-the-air broadcasting, cable broadcasting or satellite broadcasting.

Also, the television allows image communication to be performed through the Internet and may be used as a picture frame or a schedule display device when the television is not watched or the Internet is not used.

As shown in FIGS. 20 and 21, the television 300, as the display module, includes a transparent display panel 310, a frame 320, a blocking member 330, a support member 340 and a fixing member 350. In this exemplary embodiment, a television installed in the table type mount holder will be described as an example.

The transparent display panel 310 displays at least one image selected from a group consisting of a broadcast image, a content image, a communication image and a picture in response to a command from a controller provided in a drive module 360.

The transparent display panel 310 may be an LCD or an OLED. Hereinafter, the LCD, as the transparent display panel, will be described.

The transparent display panel 310 includes a light source, a first polarizing plate, a light guide plate, a liquid crystal panel and a second polarizing plate. The light source, the first polarizing plate, the light guide plate, the liquid crystal panel and the second polarizing plate constituting the transparent display panel 310 are identical in arrangement, transparency control and image display to those shown in FIG. 4, and therefore, a description thereof will be omitted.

The transparent display panel may be a transparent touch display panel.

The transparent touch display panel includes a light source, a first polarizing plate, a light guide plate, a liquid crystal panel, a second polarizing plate, a touch panel, light emitting element arrays and light receiving element arrays. The light source, the first polarizing plate, the light guide plate, the liquid crystal panel, the second polarizing plate, the touch panel, the light emitting element arrays and the light receiving element arrays constituting the transparent touch display panel are identical in arrangement, transparency control and image display to those shown in FIG. 12, and therefore, a description thereof will be omitted.

In addition, a first sheet and a second sheet may be disposed at opposite sides of the transparent touch display panel 310.

The first sheet is a heat insulation sheet provided at the rear of the transparent touch display panel 310. The second sheet is an anti-reflective coating film provided at the front of the transparent touch display panel 310 to prevent light reflection.

The frame 320 fixedly supports one side of the transparent touch display panel 310. That is, the transparent touch display panel 310 is fitted in the frame 320. Consequently, the thickness D3 of the transparent display panel 310 of the display module is less than the thickness D4 of the frame 320.

The surface area A3 of the transparent display panel 310 is greater than the surface area A4 of the frame 220.

In the frame 320 are provided a power button 321 to turn power on and off, a signal detection unit 322 to receive a signal from a remote control, a camera 323 and a microphone 324 for image communication, a transparency adjustment button 325 to adjust transparency of the transparent display panel and a speaker 326 to output sound.

In the frame 320 is further provided a drive module 360 to control driving of the transparent display panel 310.

The blocking member 330 is provided at the edge of the transparent display panel 310 to fix the first polarizing plate, the light guide plate, the liquid crystal panel and the second polarizing plate constituting the transparent display panel 310 and to prevent light in the transparent display panel 310 from scattering to the outside.

The bottom of the support member 340 contacts a table and the side of the support member 340 contacts the rear of the frame 320 to support a main body. The support member 340 may be integrally formed at the frame 320.

As shown in FIG. 21, the support member 340 supports the frame 320 and the transparent display panel 310 at a predetermined angle.

The predetermined angle is an angle at which an image on the transparent display panel has the maximum image quality when a user views the image. In addition, the support member 340 may include an angle adjustment unit to adjust the angle at which the frame 320 and the transparent display panel 310 are supported.

The support member 340 has a terminal unit 341. The terminal unit 341 includes various components and digital terminals. The terminals are concentrated on a predetermined region to provide an aesthetically pleasing appearance and to achieve easy connection with various devices.

The fixing member 350 is provided at the rear of the main body 110 to fix the support member 340.

FIG. 22 is a control block diagram of the television. The television includes a second power supply unit 361, a signal detection unit 362, an input unit 363, a controller 364, a storage unit 365, a display drive unit 366, a sound drive unit 367 and a communication unit 368. These components may be provided in the drive module 360.

The second power supply unit 361 is connected to a first power supply unit, such as an adaptor, provided at a cable connected to a set top box or a commercial power source to receive power from the first power supply unit, to covert the received power into drive power to be used by components and to supply the converted power to the respective components.

In addition, the second power supply unit 361 may be connected to the commercial power source to receive power from the commercial power source, to covert the received power into drive power to be used by components and to supply the converted power to the respective components.

The signal detection unit 362 detects a signal transmitted from the remote control and transmits the detected signal to the controller 3364. The signal transmitted from the remote control may include a broadcast channel signal, a volume control signal, a mode selection signal, a letter signal for Internet connection, image communication and schedule input, a picture frame design selection signal (if the television is used as a picture frame) and a content selection signal.

The input unit 363 includes an image input unit and/or a sound input unit.

When an image signal captured by a camera is received, the image input unit processes the received image signal and transmits the processed image signal to the controller 364. The sound input unit transmits a sound signal collected by a microphone to the controller 364.

When a power off signal is input by the power button 331, the controller 364 controls driving of the display drive unit to be stopped so that the transparent display panel is transparent.

When a transparency selection signal is input by the transparency adjustment button 325, the controller 364 controls driving of the display drive unit to be stopped so that the transparency of the transparent display panel is adjusted.

The controller 364 controls driving of at least one selected from a group the camera 323, the microphone 324, the speaker 326 and the transparent display panel 310 in response to a mode selection signal transmitted from the signal detection unit 362.

The mode may include a broadcast mode, an Internet mode, an image communication mode, a picture frame mode, a schedule mode and a calendar mode, which will be described in more detail.

When a broadcast mode selection mode is transmitted from the signal detection unit 362, the controller 364 controls the communication unit 368 to receive a broadcast signal. Also, the controller 364 controls the display drive unit 366 and the sound drive unit 367 to output an image through the transparent display panel and sound through the speaker.

When an Internet mode selection signal is transmitted from the signal detection unit 362, the controller 364 controls the communication unit 368 to be connected to the Internet. When the communication unit 368 is connected to the Internet, the controller 364 controls the display drive unit 366 to display an Internet image on the transparent display panel 310. Based on a letter signal transmitted from the signal detection unit 362, the controller 364 controls the communication unit to be connected to a site corresponding to the letter.

The controller 364 controls the display drive unit 366 to display an image corresponding to the connected site on the transparent display panel. Also, the controller 364 controls the sound drive unit 367 to output sound through the speaker.

When an image communication mode selection signal is transmitted from the signal detection unit 362, the controller 364 controls driving of the communication unit 369 so that the communication unit is connected to the Internet. Based on a signal transmitted from the signal detection unit 362, the controller 364 controls communication connection with a terminal owned by a person who wishes to perform image communication. Also, the controller 364 controls the camera and the microphones to acquire user image and sound.

When user image and sound signal are input from the camera 323 and the microphone 324 in the image communication mode, the controller 364 controls the communication unit 368 to transmit the user image and sound signals to the terminal of the other party through the Internet so that the user image and sound signals are output to the terminal of the other party. When other party image and sound are transmitted, the controller 364 controls the display control unit 366 to display the other party image on the transparent display panel and the sound drive unit 367 to output the other party sound through the speaker.

At this time, the controller 364 may control the display drive unit 366 to display the other party image on the transparent display panel 310.

That is, during image communication, both the user image and the other party image may be displayed on the transparent display panel 310.

When a picture frame mode selection signal is transmitted from the signal detection unit 362, the controller 364 controls a display mode of the transparent display panel 310 to be changed into a picture frame mode. When a picture frame design selection signal and a picture selection signal are transmitted from the signal detection unit 362, the controller 364 controls a picture frame design and a picture to be displayed so that the television is utilized as interior decoration.

In addition, picture frame designs may be displayed in order stored in the storage unit 365 in response to a direction key signal of the remote control and one of the picture frame designs may be selected in response to a confirmation key signal of the remote control. Alternatively, all picture frame designs stored in the storage unit 365 may be displayed and one of the picture frame designs may be selected in response to a direction key signal of the remote control. The picture is selected in the same manner as the picture frame design.

When a schedule mode selection signal is transmitted from the signal detection unit 362, the controller 364 controls a display mode of the transparent display panel 310 to be changed into a schedule mode and controls the display drive unit 366 to display a schedule stored in the storage unit 365 on the transparent display panel 310.

When schedule information is input from the signal detection unit 362 in the schedule mode, the controller 364 controls the storage unit 365 to store the input schedule information into the storage unit 365.

The controller 365 controls the sound drive unit 367 to output the schedule information as sound. At this time, sound may be output a predetermined time before the scheduled time.

When a calendar mode selection signal is transmitted from the signal detection unit 362, the controller 364 controls a calendar showing this month to be output.

At this time, calendar designs may also be selected. Also, a calendar showing twelve months or this month and the next month may be displayed according to user selection.

The storage unit 365 stores calendar information, calendar design information, picture frame design information, picture information, telephone number information and schedule information.

The display drive unit 366 drives the liquid crystal cells of the transparent display panel 310 to display an image on the transparent display panel 310 in response to a command from the controller 364.

The display drive unit 366 drives the liquid crystal cells of the transparent display panel 310 to adjust the transparency of the transparent display panel 310 in response to a command from the controller 364.

The sound drive unit 367 outputs sound through the speaker according to a command from the controller 364.

In the broadcast mode, the communication unit 368 is connected to an over-the-air broadcasting station or a cable broadcasting station to receive a broadcast signal. In the Internet mode, the communication unit 368 is connected to the Internet to communicate with the Internet through two-way communication.

The communication unit 368 may communicate with the user terminal to receive images, such as pictures, from the user terminal.

Figure 23:
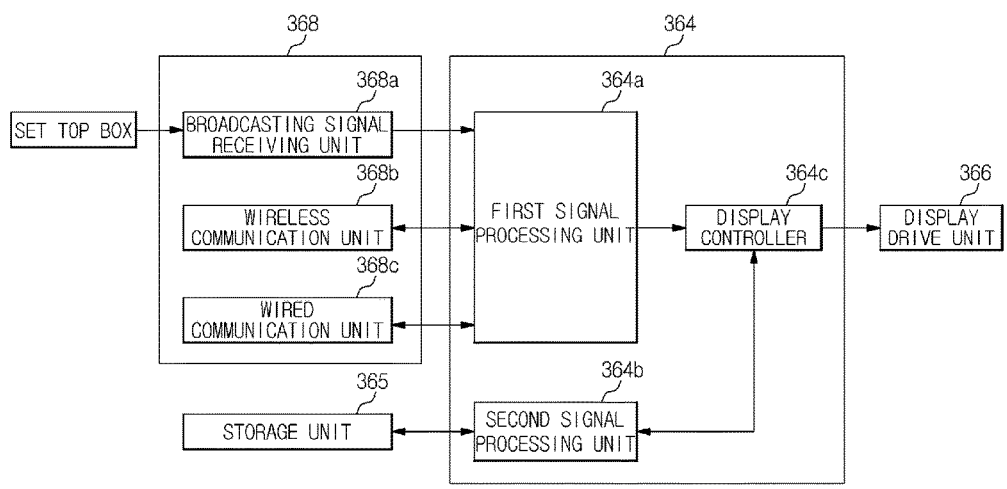
FIG. 23 is a detailed control block diagram of the television according to the exemplary embodiment of the present invention.

As shown in FIG. 23, the communication unit 368 includes a broadcast signal receiving unit 368a to receive broadcast data, a wireless communication unit 368b to transmit and receive data through wireless communication and a wired communication unit 368c to transmit and receive data through wired communication. The respective communication units 368a, 368b and 368c transmit data to a first signal processing unit 364a of the controller 364.

The controller 364 includes a first signal processing unit 364a, a second signal processing unit 364b and a display controller 364c.

The first signal processing unit 364a process data transmitted from the communication unit 364, the second signal processing unit 364b process data transmitted from the storage unit 365, and the display controller 364c creates a drive command corresponding to the processed data and outputs the created drive command to the display drive unit.

The first signal processing unit 364a may includes a signal processing unit to process broadcast data, a signal processing unit to process wireless data and a signal processing unit to process wired data.

If a transparent touch display panel is provided in the television 300, the drive module 360 includes a touch drive unit 369. The touch drive unit 369 includes a light drive part and a position detection part.

The transparent touch display panel is a combination of a touch panel to allow a user to input a command and a display panel to provide an image to the user. The touch panel is included as the input unit in addition to the remote control.

In the same manner as the remote control, position signals, such as a plurality of mode buttons, a key display button, character keys and special character keys, are input to the touch panel.

The touch drive unit 369 drives the light emitting element arrays and the light receiving element arrays to acquire the point of a touch point on the touch panel.

The light drive part drives the light emitting element arrays to emit light in response to a command from the controller 364.

The position detection part recognizes light receiving elements having transmitted a light detection signal as 1 and a light receiving element having transmitted a light non-detection signal as 0. The position detection part confirms the position of the light receiving element recognized as 0, detects the position of a touch point and transmits the position of the detected touch point to the controller 364.

The controller 364 controls driving of the display drive unit 366 based on the position of a touch point detected by the position detection part.

More specifically, when position information of the touch point is transmitted, the controller 364 confirms the currently displayed image information, confirms a key present at the position of the touch point among keys included in the confirmed image, and controls an image corresponding to the confirmed key to be displayed or performs a function corresponding to the confirmed key.

For example, when the position of the touch point coincides with the position of the broadcast mode button in a state in which the broadcast mode button, the Internet mode button, the image communication button, the picture frame mode button, the schedule mode button, the calendar mode button are displayed on the transparent touch display panel 310, the controller 364 controls the broadcast mode.

When an arbitrary region is touched irrespective of a mode to be performed, the controller 364 controls the mode buttons to be displayed.

When the key display button is touched by a user, the controller 364 confirms the current mode. When the current mode is the broadcast mode or the calendar mode, the controller 364 controls numeric keys and direction keys to be displayed. When the current mode is the Internet mode, the image communication mode or the schedule mode, the controller 364 controls English alphabet keys, Korean alphabet keys, numeric keys and special character keys to be displayed.

The storage unit 365 stores position information regarding the mode buttons, position information regarding the key display button, position information regarding the character keys for each mode, position information regarding the special character keys for each mode and position information regarding the direction keys for each mode.

Also, the storage unit 365 stores positions of the light receiving elements of the light receiving element arrays.

Figure 24:
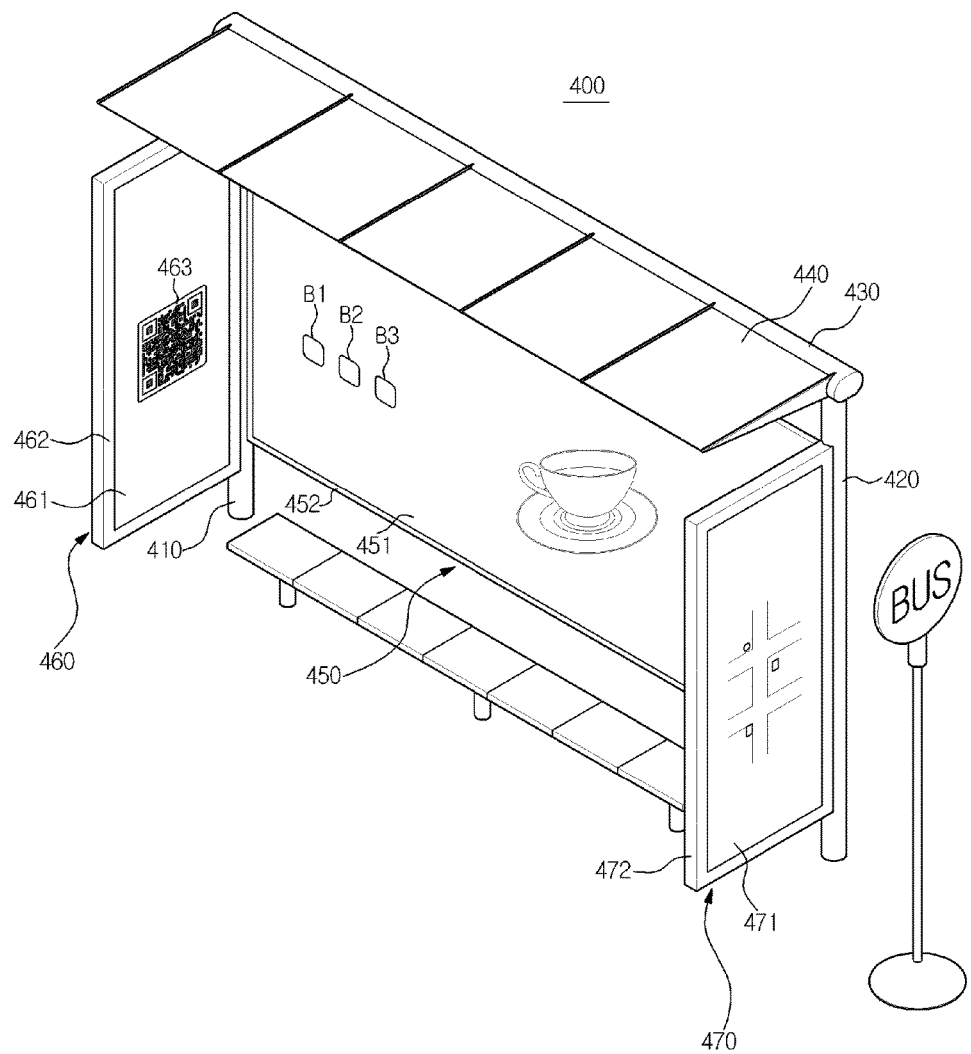
FIG. 24 is a view illustrating a bus shelter, as a display module, according to another exemplary embodiment of the present invention.

FIG. 24 is a view illustrating a bus shelter, as a display module, according to another exemplary embodiment of the present invention.

The bus shelter is provided at a bus stop to provide a place where bus users may shelter themselves from rain or snow.

The bus shelter provides information regarding buses stopped at the bus stop, an advertisement image and map information related to the surroundings of the bus shelter.

The bus shelter 400 includes a plurality of supports 410, 420 and 430, a cover member 440 and a plurality of display modules 450, 460 and 470.

The display modules include transparent display panels 451, 461 and 471 and frames 452, 462 and 472 to fix the respective transparent display panels 451, 461 and 471.

The first support 410 fixedly supports the first display module 450 and the second display module 460. The second support 420 fixedly supports the first display module 450 and the third display module 470. The third support 430 fixes the first support 410 and the second support 420 and fixedly supports the cover member 440.

The cover member 440 is fixed to the third support 430 to prevent the display modules 450, 460 and 470 from being exposed to rain and snow.

Each of the display modules 450, 460 and 470 includes a drive module to control driving of the transparent display panel.

A frame may be provided at only one side of each of the first, second and third display modules 450, 460 and 470, and blocking members 451, 461 and 471 may be provided at the other sides of the display modules 450, 460 and 470.

Each of the blocking members fixes a first polarizing plate, a light guide plate, a liquid crystal panel and a second polarizing plate constituting the transparent display panel 310 and prevents light in the transparent display panel 310 from scattering to the outside.

The transparent display panels of the first, second and third display modules 450, 460 and 470 may be transparent touch display panels. Alternatively, only the transparent display panel of one of the first, second and third display modules 450, 460 and 470 may be a transparent touch display panel.

Figure 25:
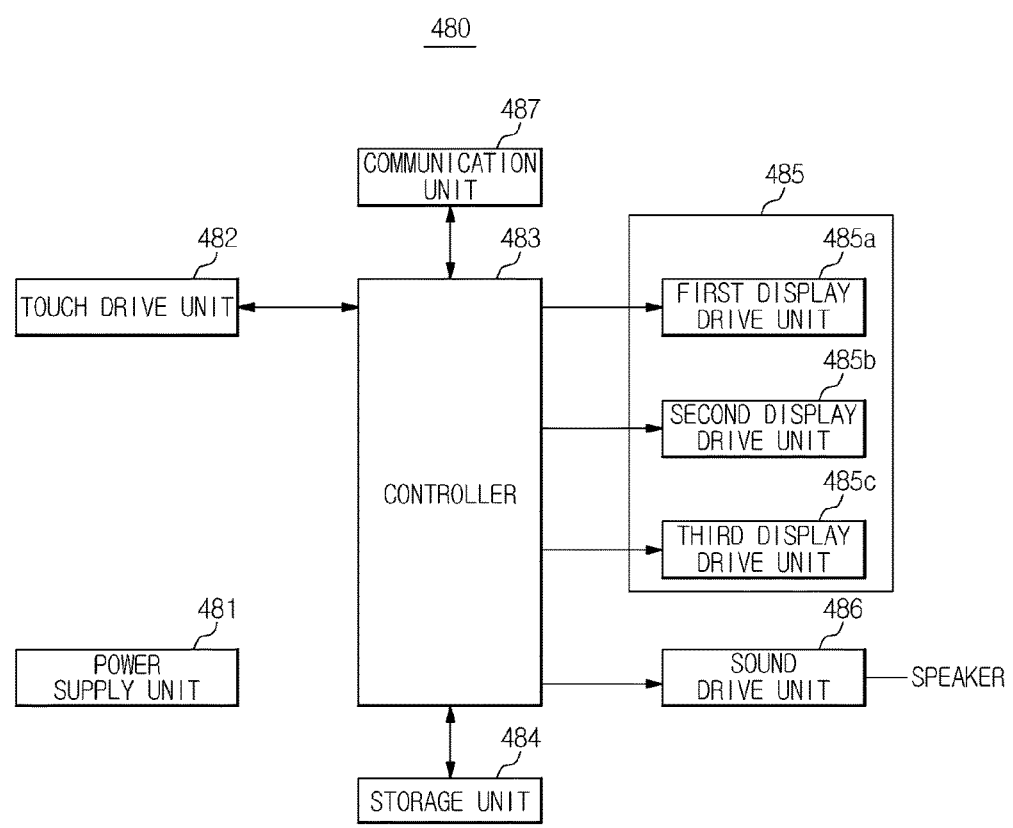
FIG. 25 is a control block diagram of the bus shelter according to the exemplary embodiment of the present invention.

FIG. 25 is a control block diagram to control driving the display modules provided in the bus shelter according to the exemplary embodiment of the present invention, which will be described with reference to FIGS. 26 and 27.

A drive module 480 includes a power supply unit 481, a touch drive unit 482, a controller 483, a storage unit 484, a display drive unit 485, a sound drive unit 486 and a communication unit 487. Hereinafter, a case in which only the first transparent display panel is a transparent touch display panel will be described as an example.

The power supply unit 481 receives power from an adaptor provided at a cable connected to a commercial power source, coverts the received power into drive power to be used by components and supplies the converted power to the respective components.

In addition, the power supply unit 481 may be connected to the commercial power source to receive power from the commercial power source, to covert the received power into drive power to be used by components and to supply the converted power to the respective components.

A light drive part of the touch drive unit 482 drives light emitting element arrays provided in the touch panel of the first transparent touch display panel to emit light.

The position detection part of the touch drive unit 482 recognizes light receiving elements having transmitted a light detection signal as 1 and a light receiving element having transmitted a light non-detection signal as 0. The position detection part confirms the position of the light receiving element recognized as 0, detects the position of a touch point and transmits the position of the detected touch point to the controller 483.

The controller 483 controls driving of the display drive unit 485 based on the position of a touch point detected by the position detection part.

More specifically, when position information of the touch point is transmitted, the controller 483 confirms the currently displayed image information, confirms a button present at the position of the touch point among buttons included in the confirmed image, and controls an image corresponding to the confirmed button to be displayed or performs a function corresponding to the confirmed button.

The buttons include an advertisement mode button B1, a bus mode button B2 and a nature mode button B3. The buttons B1, B2 and B3 are present in an image displayed on the first transparent display panel 450.

The buttons are selected by bus users. The buttons are displayed on only the first transparent display panel including the touch panel.

More specifically, when the position of the touch point coincides with the position of the advertisement mode button B1, the controller 483 controls first, second and third display drive units 485a, 485b and 485c to display an advertisement image on the first, second and third transparent display panels 451, 461 and 471.

At this time, the images may be displayed on the first, second and third transparent display panels 451, 461 and 471 in the multi display performance mode. Also, the images may be displayed as video when the images are displayed in the multi display performance mode.

Also, the image may be displayed on the first, second and third transparent display panels 451, 461 and 471 in a single display performance mode. At this time, a primary advertisement image is displayed on the first transparent display panel 451 and secondary advertisement images is displayed on the second and third transparent display panels 461 and 471.

In the advertisement mode, the controller 483 controls an additional information button to be displayed. When the additional information button is touched by a user, the controller 483 controls a store which sells the advertising object, a route map of the store, price information of the advertising object, event information and a discount coupon image to be displayed.

Figure 26:
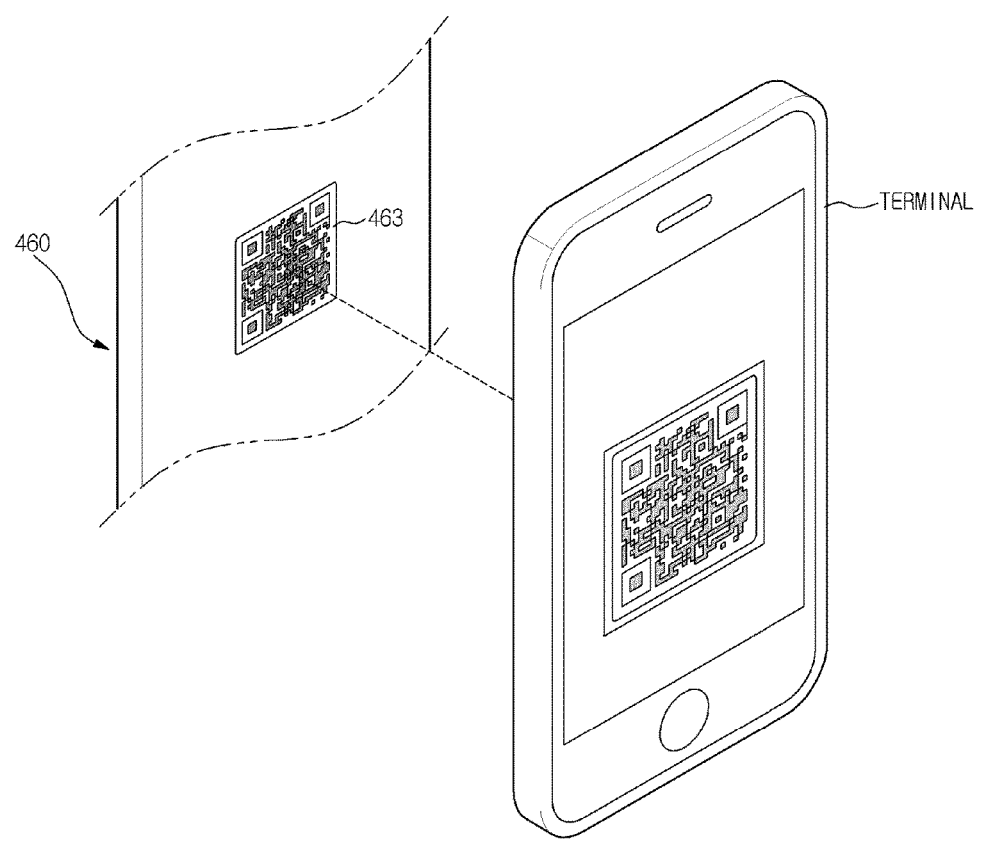
FIG. 26 is a view illustrating application of the bus shelter according to the exemplary embodiment of the present invention.

FIG. 26 is a view illustrating application of the bus shelter. When a discount coupon image 463 of an advertising object is displayed on the second transparent display panel 462, a bus user may acquire and store the discount coupon image using his/her terminal and may show the coupon stored in the terminal to a salesperson to get a discount with respect to a corresponding article.

At this time, the bus user may visit the store based on the route map of the store displayed on the third transparent display panel 471.

When the position of the touch point coincides with the position of the bus mode button B2, the controller 483 controls the first, second and third display drive units 485a, 485b and 485c to display bus information on the first, second and third transparent display panels 451, 461 and 471.

The bus information includes bus numbers stopped at this bus stop, route information for each bus number, information regarding arriving buses and bus waiting time information.

In the bus mode, the controller 483 controls the character keys and the numeric keys to be displayed, confirms a character corresponding to the position of the touch point touched by the user and controls the bus information to be displayed based on the confirmed character.

For example, bus numbers stopped at destination input in a destination column may be displayed, and the route of a bus corresponding to the number input in the bus number column may be displayed. At this time, a map showing the surroundings of the bus stop may be also displayed.

Figure 27:
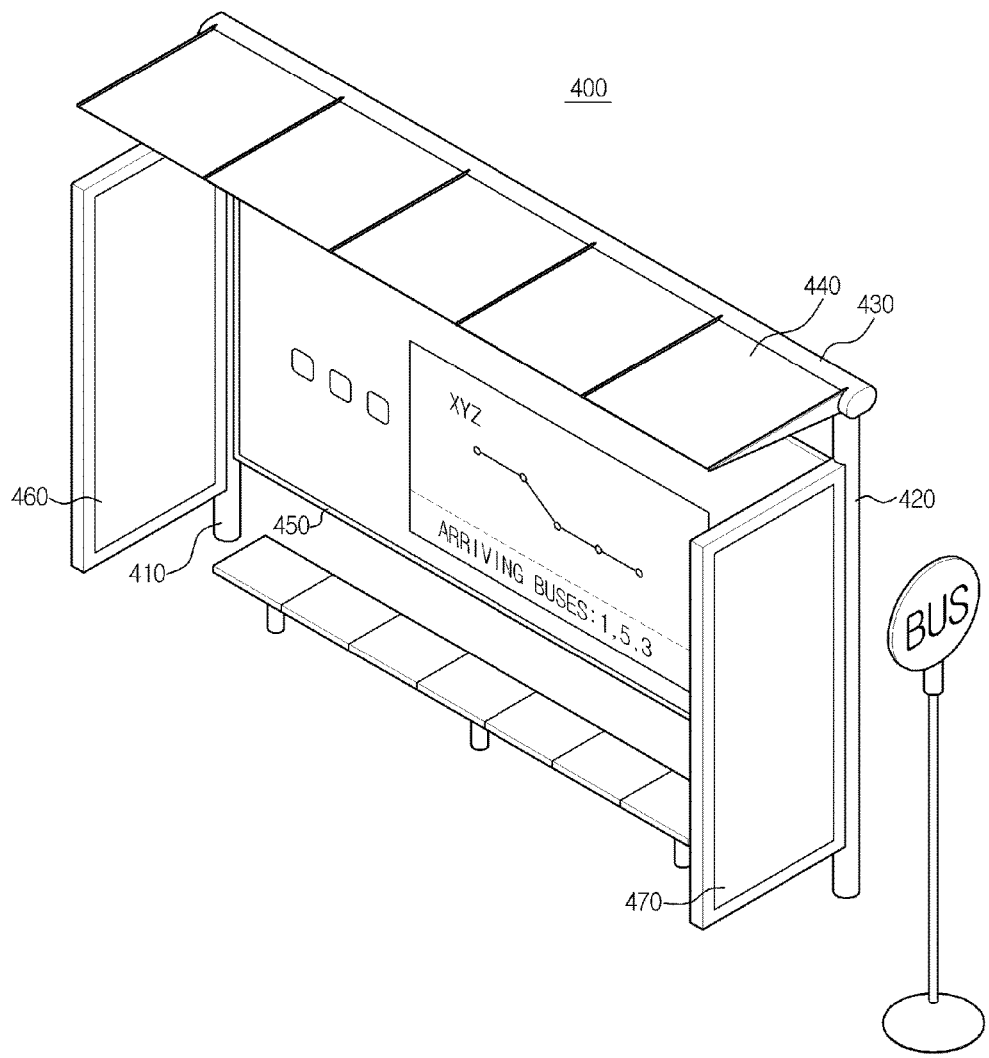
FIG. 27 is a view illustrating the bus shelter according to the exemplary embodiment of the present invention.

As shown in FIG. 27, a small amount of information is displayed in the bus mode. Consequently, the controller 483 may control at least one transparent display panel of the second and third display modules 460 and 470 not to be driven. The transparent display panel, which is not driven, remains transparent.

When the position of the touch point coincides with the position of the nature mode button B3, the controller 483 controls the first, second and third display drive units 485a, 485b and 485c to display an image of nature on the first, second and third transparent display panels 451, 461 and 471.

At this time, the image of nature displayed on the first, second and third transparent display panels 451, 461 and 471 may be displayed in a multi display performance mode. The image may be displayed as video in the multi display performance mode.

The image of nature includes an image of the sea, an image of forest, an image of four seasons, an image of cultural assets and an image of specialty products and sightseeing places in an area in which a corresponding bus stop is located.

In the nature mode, the controller 483 controls driving of the first display drive unit 485a to display an image selection button so that a bus user may select a desired image.

The storage unit 484 stores advertisement image information, information regarding stores that sell the advertising object, route map information, discount coupon information, bus number information, route information for each bus number, an image of cultural assets and an image of specialty products and sightseeing places in an area in which a corresponding bus stop is located.

The storage unit 484 further stores sound information to explain cultural assets, sound information to explain sightseeing places and sound information to explain specialty products.

The display drive unit 485 includes the first display drive unit 485a to drive the first transparent display panel 451, the second display drive unit 485b to drive the second transparent display panel 461 and the third display drive unit 485c to drive the third transparent display panel 471. The respective first display drive unit 485a, 485b and 485c display images on the respective transparent display panel in response to commands from the controller 483.

In the bus mode, the sound drive unit 486 outputs the number of an arriving bus as sound in response to a command from the controller 483. In the advertisement mode, the sound drive unit 486 outputs advertisement sound. In the nature mode, the sound drive unit 486 outputs sound to explain a displayed image.

The communication unit 487 communicates with a bus arrival notifying server (not shown) to receive information regarding arriving buses and waiting time information for each bus.

The communication unit 487 communicates with the terminal through wired and/or wireless communication to receive update information to update image information and bus information stored in the storage unit 484.

Figure 28A:
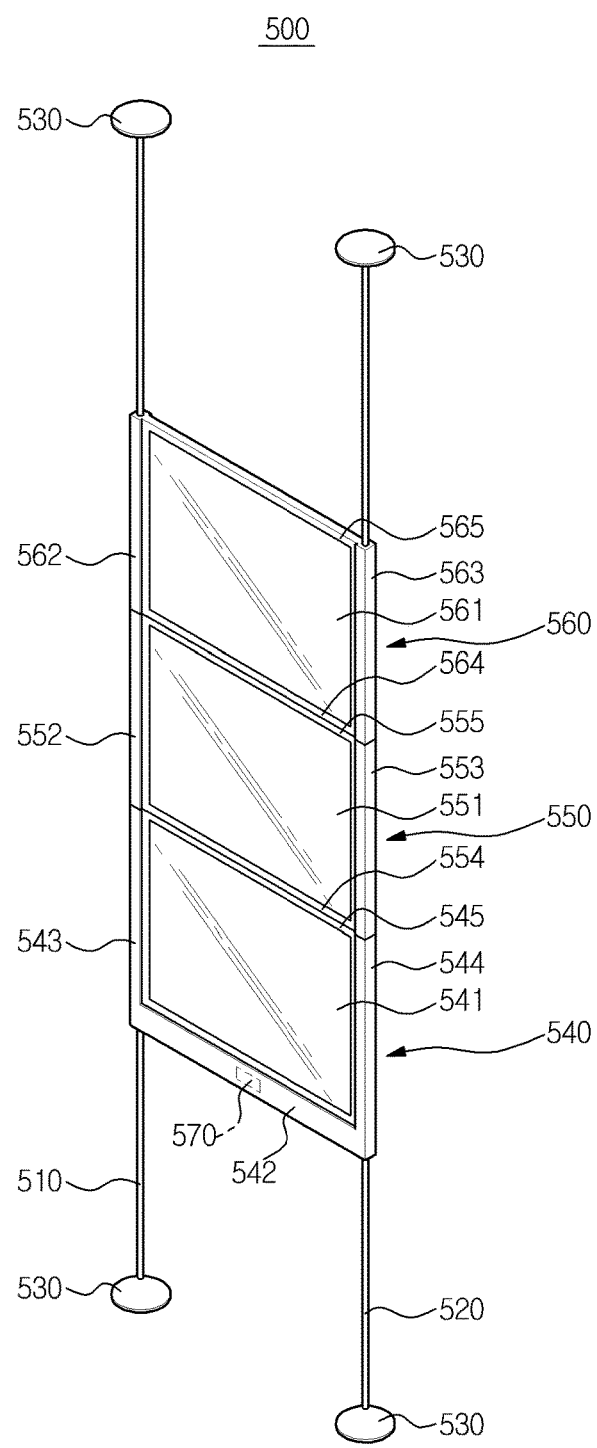
FIGS. 28A and 28B are perspective views of a information board, as a display module, according to another exemplary embodiment of the present invention.
Figure 28B:
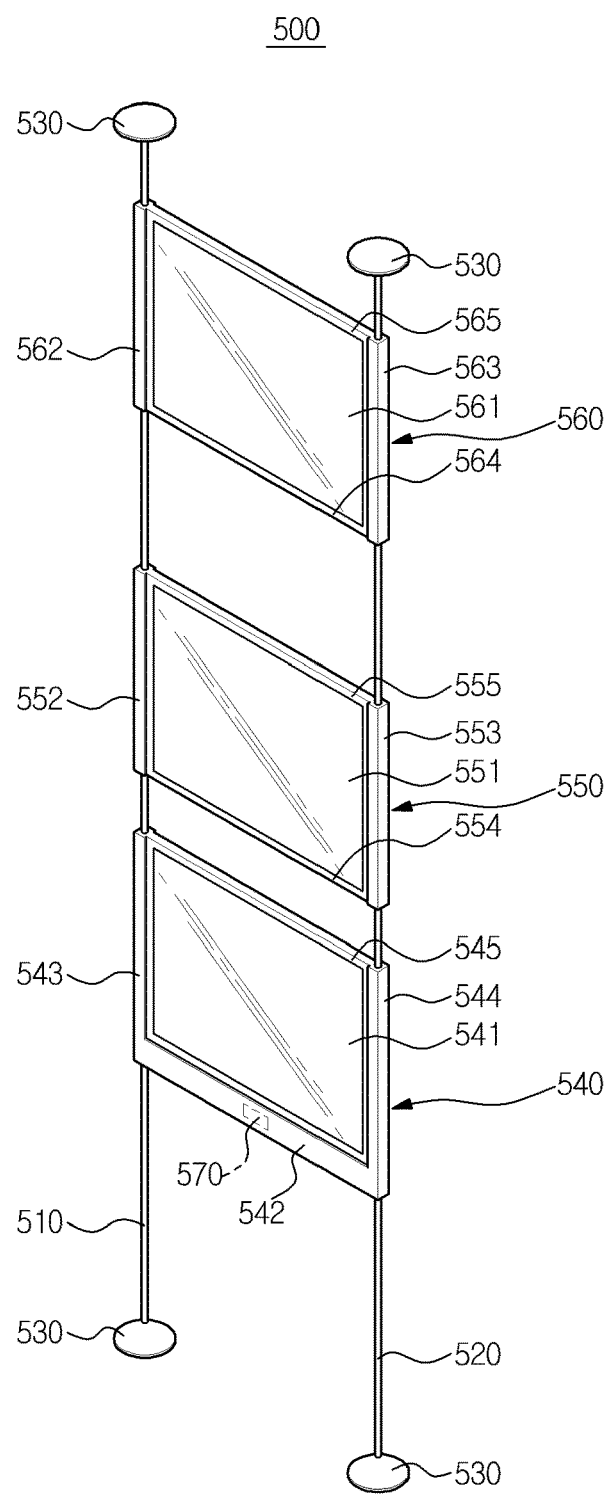

FIGS. 28A and 28B are perspective views of an information board, as a display module, according to another exemplary embodiment of the present invention. FIG. 29 is a view illustrating application of the information board.

The information board 500 is installed in a sightseeing place, a museum, a large-scale supermarket or a hotel to display the position of a restroom, suggestions, the position of an elevator, an information map and a greeting message.

The information board 500 includes supports 510 and 520, support rests 530 and first, second and third display modules 540, 550 and 560.

The supports 510 and 520 are formed in the shape of a rod. The display modules 540, 550 and 560 are fitted on the supports 510 and 520. At this time, the first parent display module is fixedly mounted to the supports 510 and 520. Also, a cable to transmit a drive signal to the second and third transparent display modules 550 and 560 is disposed in the supports 510 and 520.

In addition, each of the supports 510 and 520 may include a fixing unit (not shown) to adjust heights of transparent display panels and fix the transparent display panels at the adjusted heights.

The support rests 530 are provided at the upper and lower ends of the respective supports 510 and 520 to safely fix the supports 510 and 520 to the floor and the ceiling.

The first, second and third display modules 540, 550 and 560 are disposed in a stacked structure.

A first frame 542 is provided at the lower end of a first transparent display panel 541 of the lowermost one of the first, second and third display modules, i.e. the first display module 540. A blocking member 545 is provided at the upper end of the first transparent display panel 541. Blocking members 554, 555, 564 and 565 are provided at the upper and lower ends of second and third transparent display panels 551 and 561.

The blocking members 554, 555, 564 and 565 fix a first polarizing plate, a light guide plate, a liquid crystal panel and a second polarizing plate constituting each transparent display panel and to prevent light in the transparent display panel from scattering to the outside.

Each of the first, second and third display modules 540, 550 and 560 includes a drive module to control driving of a corresponding transparent display panel. The respective drive modules perform communications.

Alternatively, a drive module 570 to control driving of the first, second and third display modules 540, 550 and 560 may be disposed in the first frame 542. At this time, the drive module 570 in the first frame 542 may transmit drive signals to the second and third display modules 550 and 560 via cables disposed in the first and second supports 510 and 520.

The first transparent display module 541 is fitted in the first frame 542. The first, second and third transparent display panels 541, 551 and 561 are fitted in side frames 543, 544, 552, 553, 562 and 563.

That is, the lower end of the first transparent display module 541 is fixed by the first frame 542. Opposite sides of the first, second and third transparent display panels 541, 551 and 561 are fixed by the side frames 543, 544, 552, 553, 562 and 563.

Consequently, the thickness of the first, second and third transparent display panels 541, 551 and 561 of the display modules is less than the thickness D4 of the respective frames 542, 543, 544, 552, 553, 562 and 563.

The surface area of the first transparent display panel 541 is greater than that of the frames 542, 543 and 544. The surface area of the second transparent display panel 551 is greater than that of the frames 552 and 553. The surface area of the third transparent display panel 561 is greater than that of the frames 562 and 563.

The first frame 542 and the side frames 543 and 544 may be integrally manufactured.

The first, second and third transparent display panels 541, 551 and 561 displays images in a multi display performance mode in response to a command from the controller in the drive module 570.

In the side frames 543, 544, 552, 553, 562 and 563 are formed holes, through which the supports 510 and 520 extend. Consequently, the first, second and third display modules 540, 550 and 560 may move along the supports 510 and 520.

As shown in FIG. 28B, the first, second and third display modules 540, 550 and 560 may be separated from each other. In a separated state, the first, second and third display modules 540, 550 and 560 display images in a single display performance mode.

As shown in FIG. 29, the first, second and third transparent display panels 541, 551 and 561 of the first, second and third display modules 540, 550 and 560 display at least one selected from a group consisting of the position of a restroom, suggestions, the position of an elevator, an information map, a greeting message, open time and close time.

For example, one of the first, second and third transparent display panels 541, 551 and 561 may display close time a predetermined time before the close time in response to a command from the drive module 570.

The drive module 570 of the information board 500 communicates with a terminal through wired and/or wireless communication to update images to be displayed on the first, second and third transparent display panels.

The information board may display only necessary information as an image so that people or things behind the information board may be viewed through the information board. In a sightseeing place, the information drive module may be prevented from destroying the scenic beauty.

Figure 30:
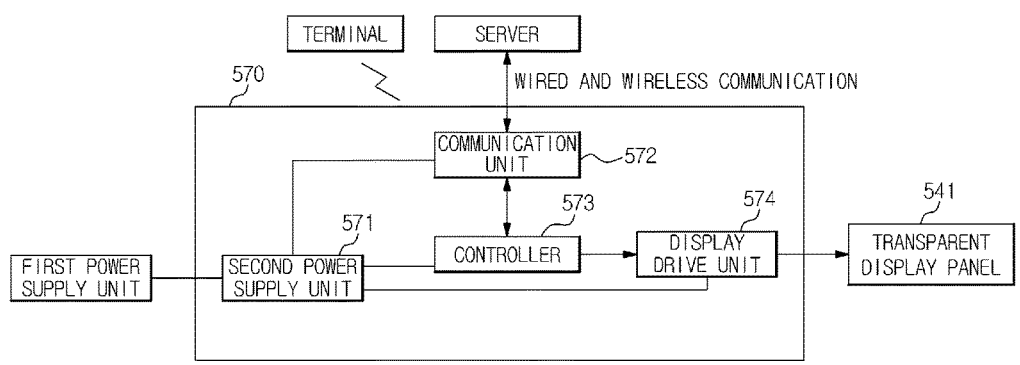
FIG. 30 is a control block diagram of the information board according to the exemplary embodiment of the present invention.

FIG. 30 is a control block diagram of the display module according to the exemplary embodiment of the present invention. Control configuration of one of the display modules, i.e. the first display module 540, will be described as an example.

The drive module 570 to control the first display module 540 includes a second power supply unit 571, a communication unit 572, a controller 573 and a display drive unit 574.

The second power supply unit 571, the communication unit 572, the controller 573 and the display drive unit 574 are provided in the drive module 570 disposed in the frame 542 of the first display module 540.

The second power supply unit 571 receives power from an external first power supply unit, converts the received power into drive power of the communication unit, drive power of the controller and drive power of the display drive unit, and supplies the converted power to the communication unit 572, the controller 573 and the display drive unit 574.

The communication unit 572 receives data from a server or a terminal and transmits the received data to the controller 573. The communication unit 572 performs wired and/or wireless communication.

In addition, the server communicates with the communication unit 572 through wired and/or wireless communication. The terminal communicates with the communication unit 572 through wireless communication, such as WiFi or Bluetooth.

Also, the terminal may be an administrator terminal which directly controls driving of the transparent display panel 540.

The communication unit 572 may communicate with the second and third display modules through wireless communication to display images in a multi display performance mode.

The controller 573 processes the received data and outputs a drive command corresponding to the processed data to the display drive unit 574. At this time, the controller 573 receives data in a predetermined format and decodes the received data.

The display drive unit 574 drives the transparent display panel in response to a command from the controller so that data are displayed on the transparent display panel.

The display drive unit 574 drives liquid crystal cells of the liquid crystal panel in response to the command from the controller 573 so that an image is displayed on the transparent display panel 541 and the transparency of the transparent display panel is adjusted.

The display module may further include a storage unit to store data and an input unit to allow data received by the communication unit or stored in the storage unit to be selected.

At this time, the controller confirms the data selected through the input unit, processes the confirmed data, and transmits a drive command corresponding to the processed data to the display drive unit 574.

In a case in which a plurality of data is stored in the storage unit, the controller 573 may control one of the data to be displayed or the data to be sequentially displayed at a predetermined interval.

The data stored in the storage unit are transmitted from the server and/or the terminal. The data may be stored in a compressed file format.

The drive module 570 includes a reading unit to read a tag owned by a user. The drive module 570 confirms name and ID of a customer based on data of the tag read by the reading unit and controls the display drive unit 574 to display information regarding the customer.

More specifically, the drive module 570 confirms the name and ID of the customer in the tag and controls an image, such as a welcome message or a farewell message, as well as the name or nickname of the customer to be displayed on the transparent display panel, For example, when the information board 500 is installed at the entrance of a shopping center, such as a department store or a large-scale supermarket, a tag of a person entering the shopping center is read and a message 'Welcome' together with the name of the person entering the shopping center is displayed on the information drive module. Also, a tag of a person exiting the shopping center is read and a message 'Good bye' together with the name of the person exiting the shopping center is displayed on the information drive module. At this time, the drive module may consider a customer having paid the bills as a person exiting the shopping center through communication with an administrator terminal.

Figure 31:
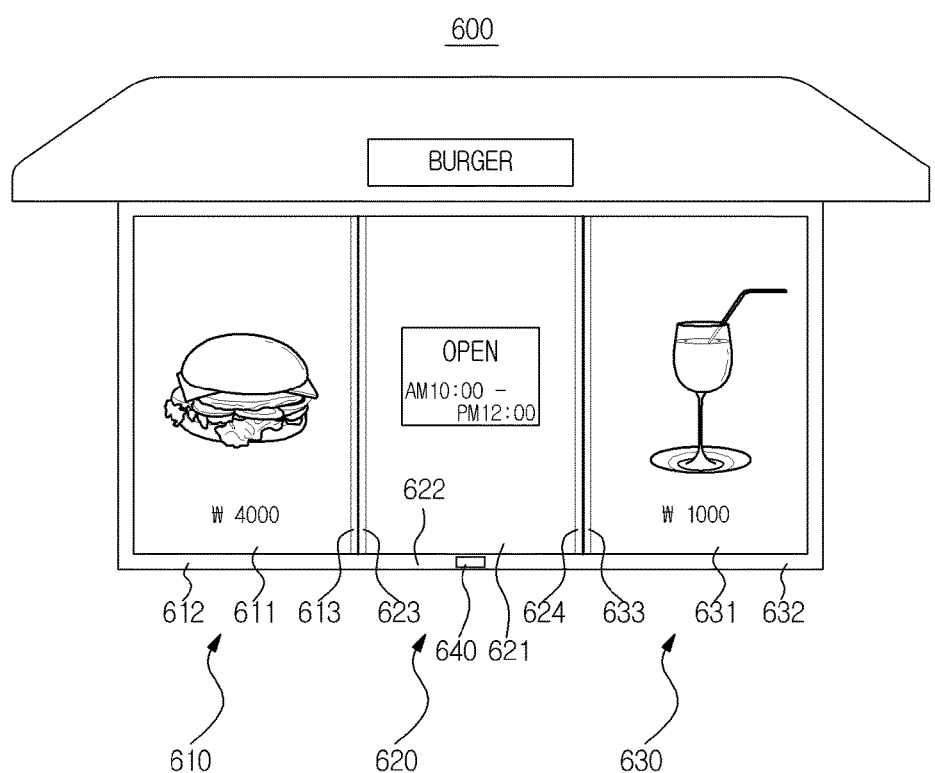
FIG. 31 is a view illustrating a show window, as a display module, according to another exemplary embodiment of the present invention.

FIG. 31 is a view illustrating a show window, as a display module, according to another exemplary embodiment of the present invention.

The show window 600 is installed at a restaurant, a fast-food restaurant, a clothing store, a department store, a café to display new merchandise or popular merchandise and thus to draw person's attention so that customers are guided into the store.

The show window 600 is installed at a wall or a glass window. The show window 600 includes a plurality of display modules 610, 620 and 630.

The first display module 610 includes a first transparent display panel 611, a first frame 612 and a blocking member 613. The second display module 620 includes a second transparent display panel 621, a second frame 622 and blocking members 623 and 624. The third display module 630 includes a third transparent display panel 631, a third frame 632 and a blocking member 633.

Each of the display modules 610, 620 and 630 includes a drive module to control driving a corresponding transparent display panel. The drive modules are disposed in the respective frames.

Alternatively, a drive module may be disposed in a frame to control driving the display modules.

The first, second and third frames 612, 622 and 632 fix the transparent display panels 611, 621 and 631, respectively.

The first, second and third transparent display panels 611, 621 and 631 of the transparent display panels form a row. That is, the first, second and third transparent display panels 611, 621 and 631 are disposed adjacent to each other in the horizontal direction.

Consequently, the first, second and third transparent display panels 611, 621 and 631 are fixed by a single frame, and the blocking members 613, 623 and 633 are provided at interfaces between the first, second and third transparent display panels.

Each of the blocking members 613, 623 and 633 fixes a first polarizing plate, a light guide plate, a liquid crystal panel and a second polarizing plate constituting the transparent display panel and prevents light in the transparent display panel from scattering to the outside.

The first, second and third display modules 610, 620 and 630 display merchandise, popular merchandise and new merchandise sold at a corresponding store, price information and size information.

If the store is a fast-food restaurant, as shown in FIG. 31, an image and price of a new menu, i.e. a hamburger, sold at the fast-food restraint are displayed on the first transparent display panel, an image and price of another new menu, i.e. a beverage, are displayed on the third transparent display panel, and open time is displayed on the second transparent display panel.

The first, second and third transparent display panels 611, 621 and 631 display images in a multi display performance mode in response to a command from the drive module 650.

In addition, the first, second and third transparent display panels 611, 621 and 631 may display a image in a single display performance mode. Also, some of the first, second and third transparent display panels 611, 621 and 631 may be driven, and the remainder of the first, second and third transparent display panels 611, 621 and 631 may not be driven.

When the first, second and third transparent display panels 611, 621 and 631 are not be driven, the first, second and third transparent display panels 611, 621 and 631 remain transparent so that people may see the interior of the restaurant through the transparent display panels.

The drive module 640 of the show window 600 communicates with a terminal through wired and/or wireless communication to update images to be displayed on the first, second and third transparent display panels.

In this way, the show window is configured using the transparent display panels, thereby potentially increasing an advertisement effect, improving the image of a company, reducing printing cost of advertising bills and lowering troubles in attaching and detaching the advertising bills.

Figure 32:
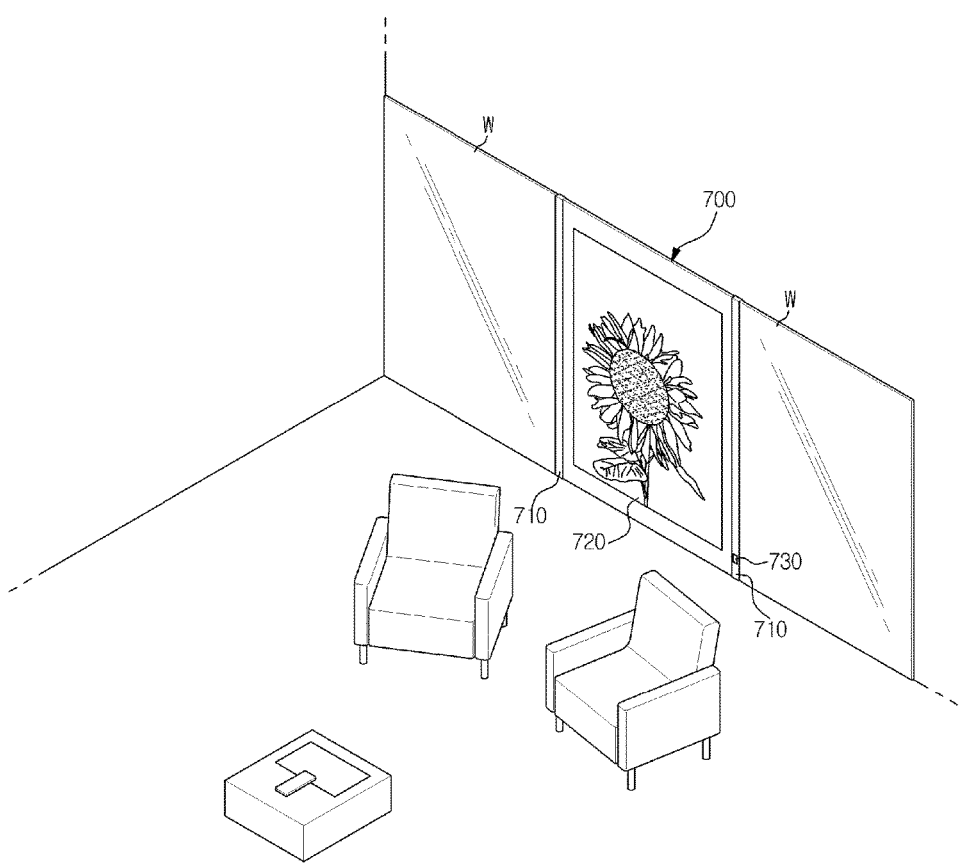
FIG. 32 is a view illustrating a window, as a display module, according to another exemplary embodiment of the present invention.

FIG. 32 is a view illustrating a window according to another exemplary embodiment of the present invention.

The window 700 is formed at a wall to receive air or sunlight and to enable a person to look out therethrough. The window 700 is configured using a transparent display panel.

A display module mounted at the window 700 includes a frame 710 and a transparent display panel 720.

The frame 710 fixes the transparent display panel 720. In the frame 710 is provided a drive module to control driving of the transparent display panel 720.

The frame 710 fixes a first polarizing plate, a light guide plate, a liquid crystal panel and a second polarizing plate constituting the transparent display panel and prevents light in the transparent display panel from scattering to the outside.

The transparent display panel 720 displays a blind image, a beautiful painting image or a nature image in response to a command from the drive module 730.

The image displayed on the transparent display panel 720 of the window may be changed using a terminal.

In addition, the frame of the window further includes a mode change button, which may be manipulated to change an image displayed on the transparent display panel 720.

When not driven, the transparent display panel 720 remains transparent so that a user may look out of the window.

The drive module 730 of the window 700 communicates with a terminal through wired and/or wireless communication to update an image to be displayed on the transparent display panel 720.

In this way, the window is configured using the transparent display panel, thereby potentially maximizing an interior effect in a house.

Figure 33:
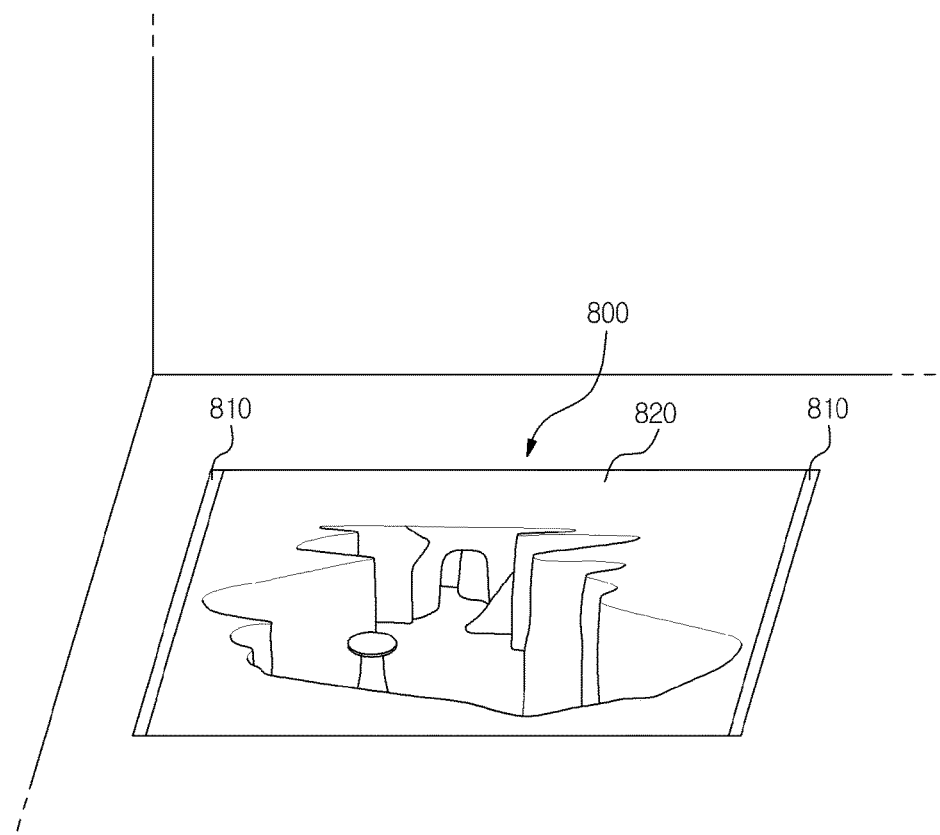
FIG. 33 is a view illustrating a floor mat, as a display module, according to yet another exemplary embodiment of the present invention.
Figure 34:
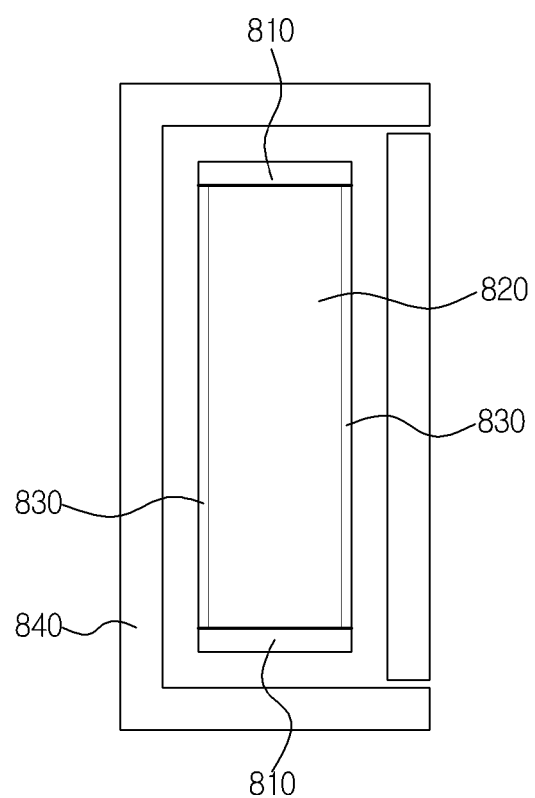
FIG. 34 is a view illustrating the structure of the floor mat according to the exemplary embodiment of the present invention.

FIG. 33 is a view illustrating a floor mat, as a display module, according to yet another exemplary embodiment of the present invention. FIG. 34 is a view illustrating the structure of the floor mat.

The floor mat 800 is installed in a public place, such as a park or an amusement park, or a house. The floor mat 800 is configured using a transparent display panel.

The floor mat 800 includes a frame 810 and a transparent display panel 820.

The frame 810 fixes the transparent display panel 820. In the frame 810 is provided a drive module 830 to control driving of the transparent display panel 820.

The frame 810 fixes a first polarizing plate, a light guide plate, a liquid crystal panel and a second polarizing plate constituting the transparent display panel 820 and prevents light in the transparent display panel from scattering to the outside.

The transparent display panel 820 displays a trick art image, a floor material image or a nature image in response to a command from the drive module 830.

The trick art image includes a plurality of realistic images having various concepts. The floor material image includes an floor image of a space where the floor mat is installed. The nature image includes an aquarium image and a garden image. The floor material image is captured and transmitted by a terminal.

The image displayed on the transparent display panel 820 of the floor mat 800 may be changed using the terminal.

The drive module 830 of the floor mat 800 communicates with the terminal through wired and/or wireless communication to update an image to be displayed on the transparent display panel 820.

Since the transparent display panel 820 is installed at the floor where people walk as shown in FIG. 33, the transparent display panel 820 may be broken. For this reason, the transparent display panel 820 is covered by a reinforced member 840, such as tempered glass, as shown in FIG. 34.

In this way, the floor mat is configured using the transparent display panel, thereby potentially maximizing an interior effect in a house and creating a special procurement boom in tourism.

As is apparent from the above description, an image is displayed using a transparent display module, thereby potentially improving spatial efficiency and providing an aesthetically pleasing space.

Also, image information received from the outside through wired and/or wireless communication or data stored in a storage unit is selectively displayed on a transparent display module, thereby providing for the potential easy management of the displayed image.

A transparent display module is installed in a showcase, as a display system, and an image is displayed, thereby providing for the potential simultaneously viewing of articles in the showcase and an image.

Also, an advertisement image is displayed on a transparent display panel, thereby potentially reducing manufacturing and managing cost of advertising bills, and the advertisement image is variously displayed, thereby potentially maximizing an advertisement effect and improving the image of a company.

Also, if the display system is a showcase, article information is displayed on a transparent display module, thereby potentially eliminating trouble in drawing articles from the showcase to confirm article information and reducing door opening and closing frequency.

In addition, if the display system is a refrigerating showcase, leakage of cool air due to opening of a door is prevented, thereby potentially improving a cooling effect and reducing power consumption due to a refrigeration cycle operation.

Also, if the display system is a showcase, an image displayed on a door, as a display module, is reversed according to a door opening angle, and therefore, an image displayed on the door is correctly viewed at any position, thereby potentially improving a degree of image recognition.

Also, if a plurality of display modules is provided, images are displayed in a multi display performance mode, thereby potentially improving beauty and effectively drawing customer attention.

Also, the brightness or transparency of a transparent display module is adjusted in response to determination as to whether a human body is detected, thereby potentially reducing power consumption.

Also, a power supply unit to convert power is disposed in a frame, thereby potentially permitting the manufacturing of a display module in a slim structure and improving utilization thereof.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. An electric device comprising:
    a main body comprising a storage chamber with an opening;
    a door including a transparent display module configured to be movably coupled to the main body, wherein the transparent display module includes a frame and a transparent display panel installed in the frame;
    a detector configured to detect existence of a shuman adjacent to the electric device;
    a movement detector configured to detect a movement of the door and output a movement detection signal corresponding to the movement; and
    a controller configured to:
        change a transparency of the transparent display module based on a signal output by the detector,
        identify a position of the transparent display panel on the movement detection signal, and
        control the transparent display module to reverse an image displayed on the transparent display panel based on the position of the transparent display module being changed from a closed position to an open position.

2. The electric device according to claim 1, wherein the controller is further configured to identify a period of time during which the transparent display module remains at the open position based on the movement detection signal and control the transparent display module to change the reversed image based on the period of time.

3. The electric device according to claim 1, wherein the controller is further configured to identify an opening angle of the transparent display panel with respect to the main body based on the movement detection signal, and identify the open position of the transparent display module based on the opening angle.

4. The electric device according to claim 1,
    wherein the controller is further configured to adjust a brightness of the transparent display module based on the signal output by the detector.

5. The electric device according to claim 1,
    wherein the controller is further configured to change a still image displayed on a front side of the transparent display module to a moving image based on the signal output by the detector.

6. The electric device according to claim 1, wherein the transparent display panel comprises a transparent touch display panel configured to generate a touch signal in response to detecting a touch input, and
    wherein the controller is further configured to control the transparent display module to change the image displayed on the transparent display module based on receiving the touch signal.

7. The electric device according to claim 1, wherein the frame comprises:
    a communication interface configured to perform communication with the controller; and
    a storage configured to store data,
    wherein the controller comprises a first signal processor configured to process data received by the communication interface, and a second signal processor configured to process the data stored in the storage.

8. The electric device according to claim 1, wherein the frame comprises:
    a communication interface configured to perform communication with a terminal; and
    a storage configured to store data,
wherein the controller is further configured to control the transparent display module to display information regarding the terminal in response to receiving data of the terminal.

9. The electric device according to claim 1, wherein the transparent display panel is fixedly supported by the frame.

10. The electric device according to claim 1, wherein the frame is fixed to one or more edges of the transparent display panel, and
    wherein the transparent display panel further comprises:
    a light blocking member disposed on remaining edges of the transparent display panel, other than the one or more edges to which the frame is fixed, to block light from entering or exiting the transparent display panel through the remaining edges of the transparent display panel.

11. The electric device according to claim 10, further comprising:
a communication interface configured to receive data; and
a display drive unit configured to drive the transparent display panel in response to a drive command from the controller,
wherein the controller is further configured to process the received data and output the drive command based on the processed data.

12. The electric device according to claim 11, wherein the communication interface, the controller, and the display drive unit are provided in the frame.

13. The electric device according to claim 10, wherein the transparent display panel comprises at least one polarizing plate, a light guide plate, and a liquid crystal panel, and
wherein the light blocking member is configured to fix the at least one polarizing plate, the light guide plate, and the liquid crystal panel.

14. The electric device according to claim 11, wherein the frame comprises a power supply unit configured to supply power to the controller, the communication interface and the display drive unit, and
wherein the power supply unit comprises a rechargeable battery.

15. The electric device according to claim 14, wherein the main body comprises a first charging terminal connected to a power source,
wherein the power supply unit further comprises a second charging terminal connected to the rechargeable battery, and
wherein the rechargeable battery is charged by the power source when the first charging terminal and the second charging terminal are in contact with each other.

16. An electric device comprising:
a main body comprising a storage chamber with an opening;
a door including a transparent display module configured to be movably coupled to the main body, wherein the transparent display module includes a frame and a transparent display panel installed in the frame;
a movement detector configured to detect a movement of the door and output a movement detection signal corresponding to the movement; and
a controller configured to:
control the transparent display module to reverse an image displayed on the transparent display panel based on a position of the transparent display module being changed from a closed position to an open position;
wherein the main body comprises a first charging terminal connected to a power source,
wherein the transparent display module comprises a rechargeable battery and a second charging terminal connected to the rechargeable battery such that the rechargeable battery is charged by the power source when the first charging terminal and the second charging terminal are in contact with each other,
wherein the first charging terminal and the second charging terminal are separated from each other when the door is open, and
wherein the first charging terminal and the second charging terminal come in contact with each other when the door is closed.

17. The electric device according to claim 16, wherein the transparent display panel is fixedly supported by the frame.

* * * * *